(12) United States Patent
Alshina

(10) Patent No.: US 10,469,853 B2
(45) Date of Patent: Nov. 5, 2019

(54) SCALABLE VIDEO ENCODING/DECODING METHOD AND APPARATUS

(71) Applicant: SAMSUNG ELECTRONICS CO., LTD., Suwon-si (KR)

(72) Inventor: Elena Alshina, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 209 days.

(21) Appl. No.: 15/110,439

(22) PCT Filed: Jan. 9, 2015

(86) PCT No.: PCT/KR2015/000260
§ 371 (c)(1),
(2) Date: Jul. 8, 2016

(87) PCT Pub. No.: WO2015/105385
PCT Pub. Date: Jul. 16, 2015

(65) Prior Publication Data
US 2016/0337651 A1    Nov. 17, 2016

Related U.S. Application Data

(60) Provisional application No. 61/925,294, filed on Jan. 9, 2014.

(51) Int. Cl.
*H04N 19/187* (2014.01)
*H04N 19/33* (2014.01)
(Continued)

(52) U.S. Cl.
CPC ......... *H04N 19/187* (2014.11); *H04N 19/132* (2014.11); *H04N 19/182* (2014.11);
(Continued)

(58) Field of Classification Search
CPC .... H04N 19/70; H04N 19/187; H04N 19/172; H04N 19/30; H04N 19/167; H04N 19/46
See application file for complete search history.

(56) References Cited

U.S. PATENT DOCUMENTS

| | | | |
|---|---|---|---|
| 9,031,338 B2 | 5/2015 | Shimizu et al. |
| 2006/0165303 A1 | 7/2006 | Cha et al. |

(Continued)

FOREIGN PATENT DOCUMENTS

| | | | |
|---|---|---|---|
| CN | 101395922 A | 3/2009 |
| CN | 103098475 A | 5/2013 |

(Continued)

OTHER PUBLICATIONS

Chen et al., High efficiency video coding (HEVC) scalable extensions Draft 5, Joint Collaborative Team on Video Coding (JCT-VC) of ITU-T SG 16 WP 3 and ISO/IEC JTC 1/SC 29/WG 11 16th Meeting: San José, US, Jan. 9-17, 2014, JCTVC-P1008_v4, entire document (Year: 2014).*

(Continued)

*Primary Examiner* — Alison Slater
(74) *Attorney, Agent, or Firm* — Sughrue Mion, PLLC

(57) ABSTRACT

Provided is a video decoding apparatus including an encoding information obtainer configured to obtain, from a bitstream, reference layer size information, reference layer offset information, current layer size information, and current layer offset information, a scale ratio determiner configured to determine a scale ratio indicating a difference between a size of a reference area and a size of an expanded reference area, according to the size of the reference area which is determined from the reference layer size information and the reference layer offset information and the size of the expanded reference area which is determined from the current layer size information and the current layer offset information, and an up-sampling unit configured to determine (Continued)

mine the expanded reference area by up-sampling the reference area according to the reference layer offset information, the current layer offset information, and the scale ratio.

11 Claims, 30 Drawing Sheets

(51) Int. Cl.
  *H04N 19/44* (2014.01)
  *H04N 19/103* (2014.01)
  *H04N 19/117* (2014.01)
  *H04N 19/70* (2014.01)
  *H04N 19/132* (2014.01)
  *H04N 19/182* (2014.01)
  *H04N 19/59* (2014.01)

(52) U.S. Cl.
  CPC ............. *H04N 19/33* (2014.11); *H04N 19/59* (2014.11); *H04N 19/70* (2014.11)

(56) References Cited

U.S. PATENT DOCUMENTS

| | | | |
|---|---|---|---|
| 2009/0010331 A1* | 1/2009 | Jeon ................... | H04N 19/105 375/240.12 |
| 2009/0010332 A1 | 1/2009 | Jeon et al. | |
| 2010/0329344 A1 | 12/2010 | Hayase et al. | |
| 2013/0039428 A1 | 2/2013 | Lakshman et al. | |
| 2015/0103896 A1* | 4/2015 | Kim ..................... | H04N 19/52 375/240.12 |
| 2015/0195573 A1* | 7/2015 | Aflaki Beni ......... | H04N 19/597 375/240.16 |
| 2015/0201204 A1* | 7/2015 | Chen ................... | H04N 19/33 375/240.02 |
| 2015/0264404 A1* | 9/2015 | Hannuksela .......... | H04N 19/70 375/240.16 |
| 2015/0341661 A1 | 11/2015 | Alshina et al. | |
| 2015/0350662 A1* | 12/2015 | Minoo ................. | H04N 19/36 375/240.02 |
| 2016/0249056 A1* | 8/2016 | Tsukuba ............... | H04N 19/70 |
| 2016/0255354 A1* | 9/2016 | Yamamoto ............ | H04N 19/70 375/240.12 |

FOREIGN PATENT DOCUMENTS

| | | |
|---|---|---|
| EP | 2 624 566 A1 | 8/2013 |
| KR | 10-2006-0085146 A | 7/2006 |
| KR | 10-2010-0022073 A | 2/2010 |
| KR | 10-2014-0089487 A | 7/2014 |
| WO | 2013/147455 A1 | 3/2013 |

OTHER PUBLICATIONS

Yamamoto et al., AHG 13: Scale and reference position derivation for sub-region extraction, Joint Collaborative Team on Video Coding (JCT-VC) of ITU-T SG 16 WP 3 and ISO/IEC JTC 1/SC 29/WG 11 16th Meeting: San José, US, Jan. 9-17, 2014; Document: JCTVC-P0049; uploaded Dec. 30, 2013 (Year: 2013).*

Yamamoto et al., "AHG 13: Scale and reference position derivation for sub-region extraction", Joint Collaborative Team on Video Coding (JCT-VC) of ITU-T SG 16 WP 3 and ISO/IEC JTC 1/SC 29/WG 11, 16th Meeting: San Jose, US, Jan. 9, 2014-Jan. 17, 2014, Document: JCTVC-P0049, XP030115511, 4 pages total.

Anonymous, "Information technology—Coding of audio-visual objects—Part 10: Advanced Video Coding", International Standard, ISO/IEC 14496-10:201X(E) (7th edition), MPEG Meeting, Nov. 28, 2011-Dec. 2, 2011, Geneva, (Motion Picture Expert Group or ISO/IEC JTC1/SC29/WG11), No. N12363, Feb. 2, 2012, XP030018858, 721 pages total.

Kwon et al., "Reference-layer cropping offsets signaling in SHVC", Joint Collaborative Team on Video Coding (JCT-VC) of ITU-T SG 16 WP 3 and ISO/IEC JTC 1/SC 29/WG 11, 13th Meeting: Incheon, KR, Apr. 18, 2013-Apr. 26, 2013, Document: JCTVC-M0219, XP030057209, 5 pages total.

Communication issued Jul. 13, 2017 by the European Patent Office in counterpart European Patent Application No. 15735471.3.

Tomoyuki Yamamoto, et al. "AHG 13: Scale and reference position derivation for sub-region extraction", Joint Collaborative Team on Video Coding (JCT-VC) of ITU-T SG 16 WP 3 and ISO/IEC JTC 1/SC 29/WG 11m 16th Meeting: San José, US, Jan. 9-17, 2014, Document: JCTVC-P0049, total 6 pages.

International Search Report for PCT/KR2015/000260 dated Mar. 26, 2015 [PCT/ISA/210].

Written Opinion for PCT/KR2015/000260 dated Mar. 26, 2015 [PCT/ISA/237].

Communication dated Sep. 5, 2018 issued by the State Intellectual Property Office of P.R. China in counterpart Chinese Application No. 201580013161.7.

Communication dated Jun. 28, 2019 issued by the State Intellectual Property Office of P.R. China in counterpart Chinese Application No. 201580013161.7.

* cited by examiner

FIG. 5

| sps_multilayer_extension ( ) { | Descriptor |
|---|---|
|    inter_view_ mv_vert_constraint_flag | u(1) |
|    num_scaled_ref_layer_offsets | ue(v) |
|    for( i = 0; i < num_scaled_ref_layer_offsets; i++) { | |
|       scaled_ref_layer_id [ i ] | u(6) |
|       scaled_ref_layer_left_offset [ scaled_ref_layer_id [ i ] ] | se(v) |
|       scaled_ref_layer_top_offset [ scaled_ref_layer_id[ i ] ] | se(v) |
|       scaled_ref_layer_right_offset [ scaled_ref_layer_id[ i ] ] | se(v) |
|       scaled_ref_layer_bottom_offset [ scaled_ref_layer_id[ i ] ] | se(v) |
|    } | |
|    num_ref_layer_offsets | ue (v) |
|    for( i = 0; i < num_ref_layer_offsets; i++) { | |
|       ref_layer_id [ i ] | u(6) |
|       ref_layer_left_offset [ ref_layer_id i ] ][ | ue (v) |
|       ref_layer_top_offset [ ref_layer_id[ i ] ] | ue (v) |
|       ref_layer_right_offset [ ref_layer_id[ i ] ] | ue (v) |
|       ref_layer_bottom_offset [ ref_layer_id[ i ] ] | ue (v) |
|    } | |
| } | |

FIG. 13
PARTITION TYPE (1300)
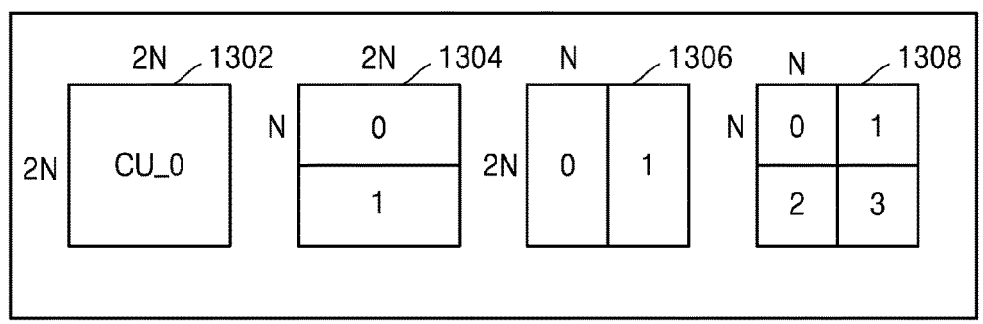
PREDICTION MODE (1310)
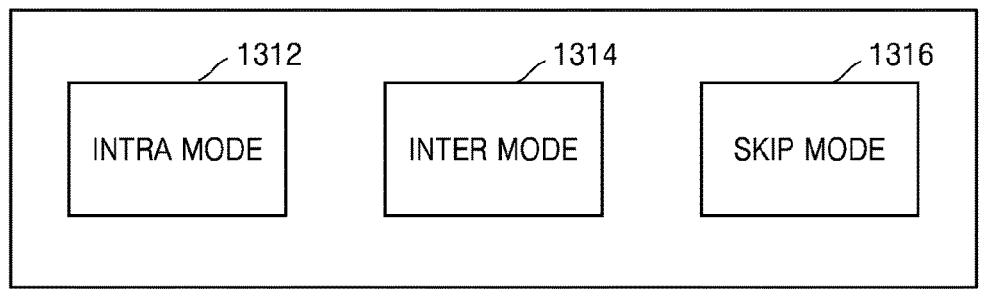
SIZE OF TRANSFORMATION UNIT (1320)
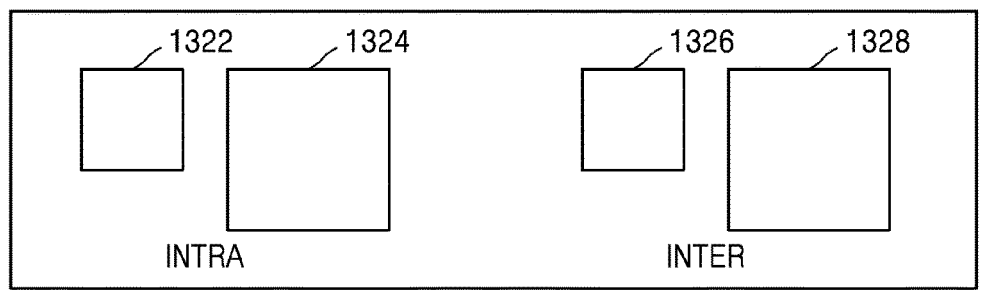

CODING UNIT (1510)

SCALABLE VIDEO ENCODING/DECODING METHOD AND APPARATUS

CROSS-REFERENCE TO RELATED APPLICATION

This is a National Stage Entry of International Application No. PCT/KR2015/000260 filed Jan. 9, 2015, claiming priority based on U.S. Provisional Application No. 61/925,294 filed Jan. 9, 2014, the contents of all of which are incorporated herein by reference in their entirety.

TECHNICAL FIELD

The present invention relates to video encoding and decoding methods and apparatuses using image up-sampling.

BACKGROUND ART

Conventional image encoding and decoding methods split one picture into macroblocks so as to encode an image. Thereafter, inter prediction or intra prediction is used to prediction encode each of the macroblocks.

Inter prediction is a method of compressing an image by removing a temporal redundancy between pictures, and has motion estimation encoding as a representative example. Motion estimation encoding predicts each block of a current picture by using at least one reference region. A predetermined evaluation function is used to search for a reference block that is most similar to a current block within a predetermined search range.

The current block is predicted based on the reference block, and a residual block generated by subtracting a prediction block generated as a result of prediction from the current block is encoded. In this regard, in order to further accurately perform prediction, interpolation is performed on the search range of the reference region, sub-pixels of a pixel unit that is smaller than an integer pixel unit are generated, and inter prediction is performed based on the generated sub-pixels.

DETAILED DESCRIPTION OF THE INVENTION

Technical Problem

The present invention provides a method of determining a reference area from a reference layer picture by using reference layer offset information. The present invention also provides a method of determining an expanded reference area from a current layer picture by using current layer offset information. The present invention also provides a method of determining sample values of the expanded reference area from by up-sampling the reference area. The present invention also provides a method of determining a prediction value of the current layer picture according to the sample values of the expanded reference area.

Accordingly, the current layer picture may be predicted by using the reference area of the reference layer picture.

Technical Solution

According to various embodiments, there is provided a video decoding apparatus including an encoding information obtainer configured to obtain, from a bitstream, reference layer size information indicating a height and width of a reference layer picture, reference layer offset information to define a reference area used in inter-layer prediction from the reference layer picture, current layer size information indicating a height and width of a current layer picture, and current layer offset information to define, from the current layer picture, an expanded reference area corresponding to the reference area; a scale ratio determiner configured to determine a scale ratio indicating a difference between a size of the reference area and a size of the expanded reference area, according to the size of the reference area which is determined from the reference layer size information and the reference layer offset information and the size of the expanded reference area which is determined from the current layer size information and the current layer offset information; and an up-sampling unit configured to determine the expanded reference area by up-sampling the reference area according to the reference layer offset information, the current layer offset information, and the scale ratio.

The reference layer offset information may include a reference layer left offset, a reference layer right offset, a reference layer top offset, and a reference layer bottom offset, and the current layer offset information may include a current layer left offset, a current layer right offset, a current layer top offset, and a current layer bottom offset.

The reference layer left offset may be a horizontal offset between a luma sample in an upper left area of the reference layer picture and a luma sample in an upper left area of the reference area, the reference layer top offset may be a vertical offset between the luma sample in the upper left area of the reference layer picture and the luma sample in the upper left area of the reference area, the reference layer right offset may be a horizontal offset between a luma sample in a lower right area of the reference layer picture and a luma sample in a lower right area of the reference area, the reference layer bottom offset may be a vertical offset between the luma sample in the lower right area of the reference layer picture and the luma sample in the lower right area of the reference area, and the reference layer left offset, the reference layer right offset, the reference layer top offset, and the reference layer bottom offset may be each expressed as a luma sample unit.

The scale ratio determiner may be further configured to determine a height of the reference area by subtracting the reference layer top offset and the reference layer bottom offset from the height of the reference layer picture, to determine a width of the reference area by subtracting the reference layer right offset and the reference layer left offset from the width of the reference layer picture, to determine a height of the expanded reference area by subtracting the current layer top offset and the current layer bottom offset from the height of the current layer picture, and to determine a width of the expanded reference area by subtracting the current layer right offset and the current layer left offset from the width of the current layer picture.

The video decoding apparatus may further include a prediction image generator configured to generate a prediction image with respect to the current layer picture based on the expanded reference area.

According to various embodiments, there is provided a video decoding method including obtaining, from a bitstream, reference layer size information indicating a height and width of a reference layer picture, reference layer offset information to define a reference area used in inter-layer prediction from the reference layer picture, current layer size information indicating a height and width of a current layer picture, and current layer offset information to define, from the current layer picture, an expanded reference area corresponding to the reference area; determining a size of the reference area from the reference layer size information and the reference layer offset information; determining a size of the expanded reference area from the current layer size information and the current layer offset information; determining a scale ratio indicating a difference between the size of the reference area and the size of the expanded reference area, according to the size of the reference area and the size of the expanded reference area; and determining the expanded reference area by up-sampling the reference area according to the reference layer offset information, the current layer offset information, and the scale ratio.

The reference layer offset information may include a reference layer left offset, a reference layer right offset, a reference layer top offset, and a reference layer bottom offset, and the current layer offset information may include a current layer left offset, a current layer right offset, a current layer top offset, and a current layer bottom offset.

The reference layer left offset may be a horizontal offset between a luma sample in an upper left area of the reference layer picture and a luma sample in an upper left area of the reference area, the reference layer top offset may be a vertical offset between the luma sample in the upper left area of the reference layer picture and the luma sample in the upper left area of the reference area, the reference layer right offset may be a horizontal offset between a luma sample in a lower right area of the reference layer picture and a luma sample in a lower right area of the reference area, the reference layer bottom offset may be a vertical offset between the luma sample in the lower right area of the reference layer picture and the luma sample in the lower right area of the reference area, and the reference layer left offset, the reference layer right offset, the reference layer top offset, and the reference layer bottom offset may be each expressed as a luma sample unit.

The determining of the size of the reference area may include determining a height of the reference area by subtracting the reference layer top offset and the reference layer bottom offset from the height of the reference layer picture, and determining a width of the reference area by subtracting the reference layer right offset and the reference layer left offset from the width of the reference layer picture, and the determining of the size of the expanded reference area may include determining a height of the expanded reference area by subtracting the current layer top offset and the current layer bottom offset from the height of the current layer picture, and determining a width of the expanded reference area by subtracting the current layer right offset and the current layer left offset from the width of the current layer picture.

The video decoding method may further include generating a prediction image with respect to the current layer picture based on the expanded reference area.

According to various embodiments, there is provided a video encoding apparatus including an encoder configured to generate a reference layer picture by down-sampling a current layer picture, to determine, from the reference layer picture, a reference area used in inter-layer prediction with respect to the current layer picture, and to generate an expanded reference area by up-sampling the reference area; an encoding information determiner configured to determine, from the reference layer picture and the reference area, reference layer size information indicating a height and width of the reference layer picture and a reference layer offset to define, from the reference layer picture, an area of the reference area used in inter-layer prediction, and to determine, from the current layer picture and the expanded reference area, current layer size information indicating a height and width of the current layer picture and a current layer offset to define, from the current layer picture, an expanded reference area corresponding to the reference area; and a bitstream transmitter configured to transmit a bitstream comprising the reference layer size information, the reference layer offset information, the current layer size information, and the current layer offset information.

According to various embodiments, there is provided a video encoding method including generating a reference layer picture by down-sampling a current layer picture; determining, from the reference layer picture, a reference area used in inter-layer prediction with respect to the current layer picture; generating an expanded reference area by up-sampling the reference area; determining, from the reference layer picture and the reference area, reference layer size information indicating a height and width of the reference layer picture and a reference layer offset to define, from the reference layer picture, an area of the reference area used in inter-layer prediction; determining, from the current layer picture and the expanded reference area, current layer size information indicating a height and width of the current layer picture and a current layer offset to define, from the current layer picture, an expanded reference area corresponding to the reference area; and transmitting a bitstream comprising the reference layer size information, the reference layer offset information, the current layer size information, and the current layer offset information.

According to various embodiments, there is provided a computer-readable recording medium having recorded thereon a program for executing the video decoding method.

According to various embodiments, there is provided a computer-readable recording medium having recorded thereon a program for executing the video encoding method.

Advantageous Effects

By using tree-structured encoding/decoding methods, encoding/decoding operations are performed on a picture, based on a coding unit. Since a smallest coding unit is 8×8, if a resolution of a reference layer picture and a resolution of a current layer picture are not a multiple of 8, up-sampling cannot be rapidly performed. Therefore, if the resolution of the reference layer picture is not a multiple of 8, a reference area of the reference layer picture whose resolution is a multiple of 8 may be set. Equally, if the resolution of the current layer picture is not a multiple of 8, a reference area of the current layer picture whose resolution is a multiple of 8 may be set.

Therefore, there is a demand for a method of determining a reference area of the reference layer picture by taking into account a size of the smallest coding unit, the reference area being used in prediction with respect to the current layer picture. Accordingly, a reference area offset may be used to determine the reference area.

BRIEF DESCRIPTION OF THE DRAWINGS

FIG. 5 illustrates syntax for describing a procedure of obtaining encoding information, according to an embodiment.

FIG. 13 illustrates a plurality of pieces of encoding information corresponding to a coded depth, according to an embodiment.

BEST MODE

Figure 1A:
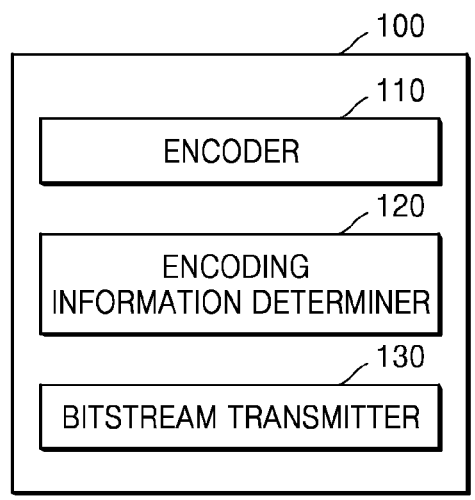
FIG. 1A illustrates a block diagram of a scalable video encoding apparatus, according to an embodiment.

According to various embodiments, there is provided a video decoding apparatus including an encoding information obtainer configured to obtain, from a bitstream, reference layer size information indicating a height and width of a reference layer picture, reference layer offset information to define a reference area used in inter-layer prediction from the reference layer picture, current layer size information indicating a height and width of a current layer picture, and current layer offset information to define, from the current layer picture, an expanded reference area corresponding to the reference area; a scale ratio determiner configured to determine a scale ratio indicating a difference between a size of the reference area and a size of the expanded reference area, according to the size of the reference area which is determined from the reference layer size information and the reference layer offset information and the size of the expanded reference area which is determined from the current layer size information and the current layer offset information; and an up-sampling unit configured to determine the expanded reference area by up-sampling the reference area according to the reference layer offset information, the current layer offset information, and the scale ratio.

According to various embodiments, there is provided a video decoding method including obtaining, from a bitstream, reference layer size information indicating a height and width of a reference layer picture, reference layer offset information to define a reference area used in inter-layer prediction from the reference layer picture, current layer size information indicating a height and width of a current layer picture, and current layer offset information to define, from the current layer picture, an expanded reference area corresponding to the reference area; determining, a size of the reference area from the reference layer size information and the reference layer offset information; determining a size of the expanded reference area from the current layer size information and the current layer offset information; determining a scale ratio indicating a difference between the size of the reference area and the size of the expanded reference area, according to the size of the reference area and the size of the expanded reference area; and determining the expanded reference area by up-sampling the reference area according to the reference layer offset information, the current layer offset information, and the scale ratio.

According to various embodiments, there is provided a video encoding apparatus including an encoder configured to generate a reference layer picture by down-sampling a current layer picture, to determine, from the reference layer picture, a reference area used in inter-layer prediction with respect to the current layer picture, and to generate an expanded reference area by up-sampling the reference area; an encoding information determiner configured to determine, from the reference layer picture and the reference area, reference layer size information indicating a height and width of the reference layer picture and a reference layer offset to define, from the reference layer picture, an area of the reference area used in inter-layer prediction, and to determine, from the current layer picture and the expanded reference area, current layer size information indicating a height and width of the current layer picture and a current layer offset to define, from the current layer picture, an expanded reference area corresponding to the reference area; and a bitstream transmitter configured to transmit a bitstream comprising the reference layer size information, the reference layer offset information, the current layer size information, and the current layer offset information.

According to various embodiments, there is provided a video encoding method including generating a reference layer picture by down-sampling a current layer picture; determining, from the reference layer picture, a reference area used in inter-layer prediction with respect to the current layer picture; generating an expanded reference area by up-sampling the reference area; determining, from the reference layer picture and the reference area, reference layer size information indicating a height and width of the reference layer picture and a reference layer offset to define, from the reference layer picture, an area of the reference area used in inter-layer prediction; determining, from the current layer picture and the expanded reference area, current layer size information indicating a height and width of the current layer picture and a current layer offset to define, from the current layer picture, an expanded reference area corresponding to the reference area; and transmitting a bitstream comprising the reference layer size information, the reference layer offset information, the current layer size information, and the current layer offset information.

MODE OF THE INVENTION

Hereinafter, in various embodiments described in the present specification, the term 'image' may collectively refer to not only a still image but also refer to a moving picture such as a video. In addition, the term 'picture' described in the present specification means a still image to be encoded or decoded.

A scalable coding scheme indicates a method of hierarchically coding one image to make the image be eligible for various resolutions, frame rates, image qualities, or the like. Since one bitstream includes the image having various resolutions, frame rates, image qualities, or the like, a content consumer may extract a part of the bitstream and may reproduce an image satisfying a user-desired resolution, frame rate, image quality, or the like.

The image coded according to the scalable coding scheme has at least two layers. Each layer has at least one of an upper layer and a lower layer. In some embodiments, each layer may have two or more upper layers and lower layers.

A layer may be classified into a current layer and a reference layer. The current layer indicates an upper layer of the reference layer, the upper layer being encoded/decoded by referring to pictures of the reference layer. The reference layer indicates a lower layer of the current layer, the lower layer providing the pictures required in encoding/decoding of the current layer. In general, a resolution, a frame rate, and an image quality of the pictures of the reference layer are inferior to those of pictures of the current layer.

The current layer and the reference layer are a relative concept. For example, when a first layer, a second layer, and a third layer are present in an order starting from an upper layer, the second layer may become a reference layer with respect to the first layer. Conversely, the second layer may become a current layer with respect to the third layer.

In general, the current layer is used along with a term 'enhancement layer'. The reference layer is used along with a term 'base layer'. Therefore, the enhancement layer used in the present specification has the same meaning as the current layer. Equally, the base layer used in the present specification has the same meaning as the reference layer.

In the present specification, an aspect in which pictures of a reference layer are up-sampled with respect to a resolution and are used in predicting a picture of a current layer is described.

In the present specification, an offset means displacement between pixels or displacement between samples. A horizontal offset indicates horizontal-direction displacement between pixels or between samples. A vertical offset indicates vertical-direction displacement between pixels or between samples. For example, when a pixel B is 4 pixels to the right and 2 pixels down from a pixel A, a horizontal offset of the pixel B with respect to the pixel A is 4, and a vertical offset of the pixel B is 2.

According to tree-structured encoding/decoding methods, encoding/decoding operations are performed on a picture, based on a coding unit. Since a smallest coding unit is 8×8, if a resolution of a picture of a reference layer (hereinafter, referred to as 'the reference layer picture') and a resolution of a picture of a current layer (hereinafter, referred to as 'the current layer picture') are not a multiple of 8, up-sampling cannot be rapidly performed. Therefore, if the resolution of the reference layer picture is not a multiple of 8, a reference area of the reference layer picture whose resolution is a multiple of 8 may be set. Equally, if the resolution of the current layer picture is not a multiple of 8, a reference area of the current layer picture whose resolution is a multiple of 8 may be set.

Various embodiments of the present specification provide method and apparatus for allocating an offset to a picture of a reference layer (hereinafter, referred to as 'the reference layer picture') and thus determining a reference area of the reference layer picture, the reference area being used in prediction of a current layer picture. Also, various embodiments of the present specification provide a method and apparatus for allocating an offset to a picture of a current layer (hereinafter, referred to as 'the current layer picture') and thus determining an expanded reference area that is an up-sampled reference area.

Hereinafter, with reference to FIGS. 1A through 5, up-sampling of an image which is performed by taking into account an offset of a reference layer and current layer is proposed below. Also, with reference to FIGS. 6A through 7B, scalable video encoding and decoding using up-sampling in consideration of an offset of a reference layer and current layer is proposed below. Hereinafter, with reference to FIGS. 8 through 18, video encoding and decoding based on coding units according to a tree structure, which are performed in each layer of a scalable video system, are proposed.

Hereinafter, with reference to FIGS. 1A through 5, image up-sampling performed by taking into account an offset of a reference layer and current layer according to various embodiments is described in detail.

FIG. 1A illustrates a block diagram of a scalable video encoding apparatus 100, according to an embodiment.

The scalable video encoding apparatus 100 may include an encoder 110, an encoding information determiner 120, and a bitstream transmitter 130. Referring to FIG. 1A, the encoder 110, the encoding information determiner 120, and the bitstream transmitter 130 are illustrated as separate elements, but in another embodiment, the encoder 110 and the encoding information determiner 120 may be combined and thus may be implemented as one element. Equally, the bitstream transmitter 130 may be combined with at least one of the encoder 110 and the encoding information determiner 120.

Referring to FIG. 1A, the encoder 110, the encoding information determiner 120, and the bitstream transmitter 130 are illustrated as elements positioned in one apparatus, but apparatuses respectively performing functions of the encoder 110, the encoding information determiner 120, and the bitstream transmitter 130 may not be physically adjacent to each other. Therefore, in another embodiment, the encoder 110, the encoding information determiner 120, and the bitstream transmitter 130 may be dispersed.

The encoder 110, the encoding information determiner 120, and the bitstream transmitter 130 of FIG. 1A may be implemented by one processor in an embodiment. In another embodiment, they may be implemented by a plurality of processors.

The scalable video encoding apparatus 100 may include a storage (not shown) to store data generated in the encoder 110, the encoding information determiner 120, and the bitstream transmitter 130. In addition, the encoder 110, the encoding information determiner 120, and the bitstream transmitter 130 may extract stored data from the storage (not shown) and may use the data.

The scalable video encoding apparatus 100 of FIG. 1A is not limited to a physical apparatus. For example, some function among functions of the scalable video encoding apparatus 100 may not be implemented as hardware but may be implemented as software.

The encoder 110 encodes an image input to the scalable video encoding apparatus 100. In more detail, the encoder 110 generates a reference layer picture by down-sampling a current layer picture of the input image In the present specification, the current layer picture indicates an encoded/decoded picture of a current layer, and a reference layer picture indicates an encoded/decoded picture of a reference layer.

In the present specification, down-sampling means a procedure of decreasing the number of pixels that configure a picture. For example, when the number of the pixels configuring the picture is 32×32, a down-sampled picture whose number of pixels is 16×16 may be obtained by using down-sampling. A ratio of pixels that are decreased due to the down-sampling may vary according to embodiments.

Since the reference layer picture is generated by down-sampling a current layer picture, the number of pixels of the reference layer picture is less than the number of pixels of the current layer picture.

The encoder 110 may determine, from the reference layer picture, a reference area used in inter-layer prediction with respect to the current layer picture, may up-sample the reference area, and thus may generate an expanded reference area.

In the present specification, the reference area indicates an area of the reference layer picture, the area being used in inter-layer prediction. An entire area of the reference layer picture may be determined as the reference area. Alternatively, only a portion of the reference layer picture may be determined as the reference area.

In the present specification, up-sampling means a procedure of increasing the number of pixels that configure a picture. For example, when the number of the pixels configuring the picture is 32×32, an up-sampled picture whose number of pixels is 64×64 may be obtained by using up-sampling. A ratio of pixels that are increased due to the up-sampling may vary according to embodiments.

In the present specification, an expanded reference area indicates a picture generated by up-sampling a reference area. As described above, since a resolution of the current layer picture is higher than a resolution of the reference layer picture, the resolution of the current layer picture is higher than a resolution of the reference area that is a portion of the reference layer picture. Therefore, it is difficult to predict the high-resolution current layer picture by using the low-resolution reference area. Therefore, the current layer picture is predicted by using the expanded reference area having an increased resolution by up-sampling the reference area.

The encoder 110 may encode the reference layer picture independently from the current layer picture. In addition, the encoder 110 may encode the reference layer picture by using a method of encoding a single layer picture based on a tree structure.

The encoder 110 may encode the current layer picture by using the reference area. In an embodiment, the encoder 110 may encode the current layer picture independently from the reference area, without using the reference area.

The inter-layer prediction performed by the encoder 110 will be described in detail with reference to FIGS. 6A and 6B. Encoding based on a tree structure will be described in detail with reference to FIGS. 8 through 17.

The encoding information determiner 120 may determine reference layer size information and reference layer offset information from the reference layer picture and the reference area.

In the present specification, the reference layer size information indicates information regarding a height and width of the reference layer picture. In the present specification, the reference layer offset information indicates an offset between the reference layer picture and the reference area.

The reference layer offset information may include a reference layer left offset, a reference layer right offset, a reference layer top offset, and a reference layer bottom offset.

The reference layer left offset is a horizontal offset between a luma sample in an upper left area of the reference layer picture and a luma sample in an upper left area of the reference area. The reference layer top offset is a vertical offset between the luma sample in the upper left area of the reference layer picture and the luma sample in the upper left area of the reference area.

The reference layer right offset is a horizontal offset between a luma sample in a lower right area of the reference layer picture and a luma sample in a lower right area of the reference area, and the reference layer bottom offset is a vertical offset between the luma sample in the lower right area of the reference layer picture and the luma sample in the lower right area of the reference area.

The reference layer offset may be used to define the reference area of the reference layer picture.

The encoding information determiner 120 may determine, from the current layer picture and the expanded reference area, current layer size information indicating a height and width of the current layer picture and a current layer offset to define, from the current layer picture, the expanded reference area corresponding to the reference area.

In the present specification, the current layer size information indicates information regarding the height and width of the current layer picture. In the present specification, the current layer offset indicates an offset between the current layer picture and the expanded reference area.

Information regarding the current layer offset may include a current layer left offset, a current layer right offset, a current layer top offset, and a current layer bottom offset.

The current layer left offset is a horizontal offset between a luma sample in an upper left area of the current layer picture and a luma sample in an upper left area of the expanded reference area. The current layer top offset is a vertical offset between the luma sample in the upper left area of the current layer picture and the luma sample in the upper left area of the expanded reference area.

The current layer right offset is a horizontal offset between a luma sample in a lower right area of the current layer picture and a luma sample in a lower right area of the expanded reference area, and the current layer bottom offset is a vertical offset between the luma sample in the lower right area of the current layer picture and the luma sample in the lower right area of the expanded reference area.

The current layer offset information may be used to define the expanded reference area used in prediction of a current layer image.

The reference layer offset information and the current layer offset information may be expressed as luma sample units. For example, when the reference layer left offset is 4 and the reference layer top offset is 2, a luma sample that is 4 samples to the right and 2 samples down from the luma sample in the upper left area of the reference layer picture becomes the luma sample in the upper left area of the reference area.

According to the present embodiment, the reference layer offset information and the current layer offset information are expressed as luma sample units, but in another embodiment, the reference layer offset information and the current layer offset information may be expressed as chroma sample units.

In addition, according to a color format of the current layer picture and the reference layer picture, values of the reference layer offset information and the current layer offset information expressed as the luma sample units may be different from values of the reference layer offset information and the current layer offset information expressed as the chroma sample units.

For example, when the color format of the current layer picture and the reference layer picture is 4:2:0, only one chroma sample corresponds to one luma sample 2×2 block. Therefore, values of the vertical offset and the horizontal offset expressed as luma sample units and included in the reference layer offset information and the current layer offset information may be twice as large as values of the vertical offset and the horizontal offset expressed as chroma sample units.

On the other hand, when the color format of the current layer picture and the reference layer picture is 4:4:4, a luma sample and a chroma sample correspond to each other. Therefore, all offsets of the reference layer offset information and the current layer offset information have same values in a luma sample unit and a chroma sample unit.

The reference layer offset information and the current layer offset information will be described in detail with reference to FIGS. 3 and 4.

The bitstream transmitter 130 transmits a bitstream including the reference layer size information, the reference layer offset information, the current layer size information, and the current layer offset information which are determined by the encoding information determiner 120.

Figure 1B:
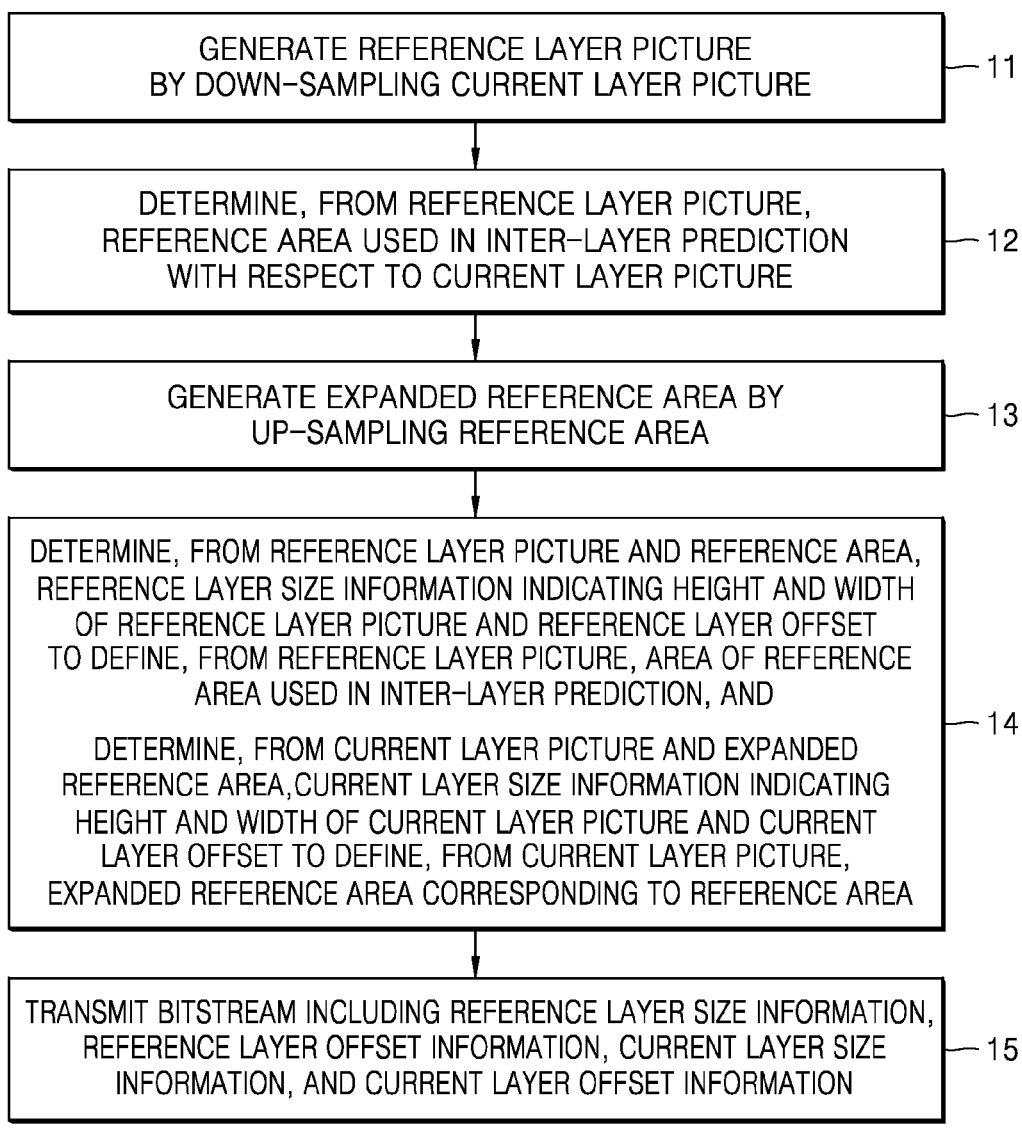
FIG. 1B illustrates a flowchart of a scalable video encoding method, according to an embodiment.

FIG. 1B illustrates a flowchart of a scalable video encoding method 10 performed by the scalable video encoding apparatus 100, according to an embodiment.

In operation 11, a reference layer picture is generated by down-sampling a current layer picture.

In operation 12, a reference area used in inter-layer prediction with respect to the current layer picture is determined from the reference layer picture.

In operation 13, an expanded reference area is generated by up-sampling the reference area.

Operations 11 through 13 are performed by the encoder 110.

In operation 14, reference layer size information indicating a height and width of the reference layer picture and a reference layer offset to define, from the reference layer picture, an area of the reference area used in the inter-layer prediction are determined from the reference layer picture and the reference area.

Afterward, current layer size information indicating a height and width of the current layer picture and a current layer offset to define, from the current layer picture, the expanded reference area corresponding to the reference area are determined from the current layer picture and the expanded reference area.

The operation 14 is performed by the encoding information determiner 120.

In operation 15, a bitstream including the reference layer size information, the reference layer offset information, the current layer size information, and the current layer offset information is transmitted.

The operation 15 is performed by the bitstream transmitter 130.

Figure 2A:
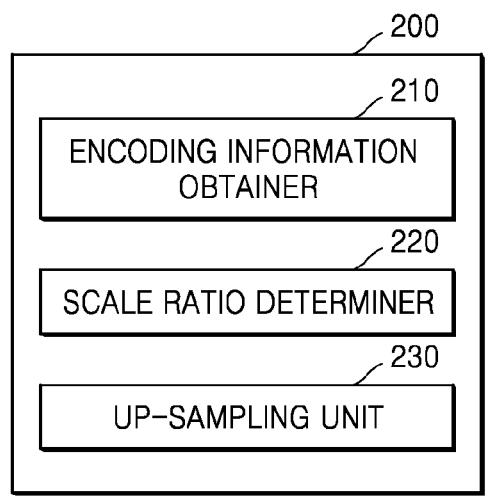
FIG. 2A illustrates a block diagram of a scalable video decoding apparatus, according to an embodiment

FIG. 2A illustrates a block diagram of a scalable video decoding apparatus 200, according to an embodiment.

The scalable video decoding apparatus 200 may include an encoding information obtainer 210, a scale ratio determiner 220, and an up-sampling unit 230. Referring to FIG. 2A, the encoding information obtainer 210, the scale ratio determiner 220, and the up-sampling unit 230 are illustrated as separate elements, but in another embodiment, the encoding information obtainer 210 and the scale ratio determiner 220 may be combined and thus may be implemented as one element. Equally, the up-sampling unit 230 may be combined with at least one of the encoding information obtainer 210 and the scale ratio determiner 220.

Referring to FIG. 2A, the encoding information obtainer 210, the scale ratio determiner 220, and the up-sampling unit 230 are illustrated as elements positioned in one apparatus, but apparatuses respectively performing functions of the encoding information obtainer 210, the scale ratio determiner 220, and the up-sampling unit 230 may not be physically adjacent to each other. Therefore, in another embodiment, the encoding information obtainer 210, the scale ratio determiner 220, and the up-sampling unit 230 may be dispersed.

The encoding information obtainer 210, the scale ratio determiner 220, and the up-sampling unit 230 of FIG. 2A may be implemented by one processor in an embodiment. In another embodiment, they may be implemented by a plurality of processors.

The scalable video decoding apparatus 200 may include a storage (not shown) to store data generated in the encoding information obtainer 210, the scale ratio determiner 220, and the up-sampling unit 230. In addition, the encoding information obtainer 210, the scale ratio determiner 220, and the up-sampling unit 230 may extract stored data from the storage (not shown) and may use the data.

The scalable video decoding apparatus 200 of FIG. 2A is not limited to a physical apparatus. For example, some function among functions of the scalable video decoding apparatus 200 may not be implemented as hardware but may be implemented as software.

The encoding information obtainer 210 obtains, from a bitstream, reference layer size information, reference layer offset information to define a reference area used in inter-layer prediction from a reference layer picture, current layer size information, and current layer offset information to define, from a current layer picture, an expanded reference area corresponding to the reference area.

As described above with reference to FIG. 1A, the reference layer size information indicates a height and width of the reference layer picture. The current layer size information indicates a height and width of the current layer picture.

The reference layer offset information indicates an offset between the reference layer picture and the reference area. The current layer offset information indicates an offset between the current layer picture and the expanded reference area. The reference layer offset information may be used to define the reference area used in inter-layer prediction from the reference layer picture. The current layer offset information may be used to define, from the current layer picture, the expanded reference area used in prediction of the current layer picture.

As described above with reference to FIG. 1A, the reference layer offset information may include a reference layer left offset, a reference layer right offset, a reference layer top offset, and a reference layer bottom offset, and the current layer offset information may include a current layer left offset, a current layer right offset, a current layer top offset, and a current layer bottom offset.

As described above with reference to FIG. 1A, the reference layer offset information and the current layer offset information may be expressed as a luma sample unit. In another embodiment, the reference layer offset information and the current layer offset information may be expressed as chroma sample units.

According to an embodiment, the bitstream obtained by the encoding information obtainer 210 may be the bitstream transmitted from the bitstream transmitter 130.

The scale ratio determiner 220 determines a scale ratio according to encoding information obtained by the encoding information obtainer 210. The scale ratio indicates a ratio of the reference area to the expanded reference area. The scale ratio includes a horizontal scale ratio indicating a ratio of a width of the reference area to a width of the expanded reference area, and a vertical scale ratio indicating a ratio of a height of the reference area to a height of the expanded reference area. For example, when the vertical scale ratio and the horizontal scale ratio are all 1:2, and the number of luma samples of the reference area is 16×16, the number of luma samples of the expanded reference area may be 32×32.

The scale ratio determiner 220 determines a size of the reference area from the reference layer size information and the reference layer offset information.

According to an embodiment, the scale ratio determiner 220 determines the height of the reference area by subtracting the reference layer top offset and the reference layer bottom offset from the height of the reference layer picture. The scale ratio determiner 220 determines the width of the reference area by subtracting the reference layer right offset and the reference layer left offset from the width of the reference layer picture.

The scale ratio determiner 220 determines a size of the expanded reference area from the current layer size information and the current layer offset information.

According to an embodiment, the scale ratio determiner 220 determines the height of the expanded reference area by subtracting the current layer top offset and the current layer bottom offset from the height of the current layer picture. The scale ratio determiner 220 determines the width of the expanded reference area by subtracting the current layer right offset and the current layer left offset from the width of the current layer picture.

The scale ratio determiner 220 determines the scale ratio from the size of the reference area and the size of the expanded reference area. According to an embodiment, the scale ratio determiner 220 may determine the horizontal scale ratio by comparing the width of the reference area with the width of the expanded reference area. In addition, the scale ratio determiner 220 may determine the vertical scale ratio by comparing the height of the reference area with the height of the expanded reference area.

The scale ratio determiner 220 determines the expanded reference area by up-sampling the reference area according to the reference layer offset information, the current layer offset information, and the scale ratio.

According to an embodiment, the up-sampling unit 230 matches a pixel of the expanded reference area with a pixel of the reference area by taking into account the reference layer offset information, the current layer offset information, and the scale ratio. A sample value of the pixel of the expanded reference area is determined as a sample value of the pixel of the reference area which corresponds to the pixel of the expanded reference area. Therefore, each of all pixels of the expanded reference area is matched with one of pixels of the reference area, so that sample values of all pixels included in the expanded reference area are determined.

An embodiment of a matching method performed by the up-sampling unit 230 will be described in detail with reference to FIG. 5.

The scalable video decoding apparatus 200 may include a prediction value generator (not shown) to generate a prediction value with respect to the current layer picture, based on the expanded reference area. The prediction value generator (not shown) determines prediction values of the current layer picture, based on the sample values of the pixels of the expanded reference area. The prediction value generator (not shown) may determine the prediction values of the current layer picture by using at least one method among padding, cropping, up-sampling, down-sampling methods, and the like.

By determining all sample values of pixels included in an area other than the expanded reference area, sample values of pixels included in a prediction picture for prediction of the current layer picture are all determined.

Figure 2B:
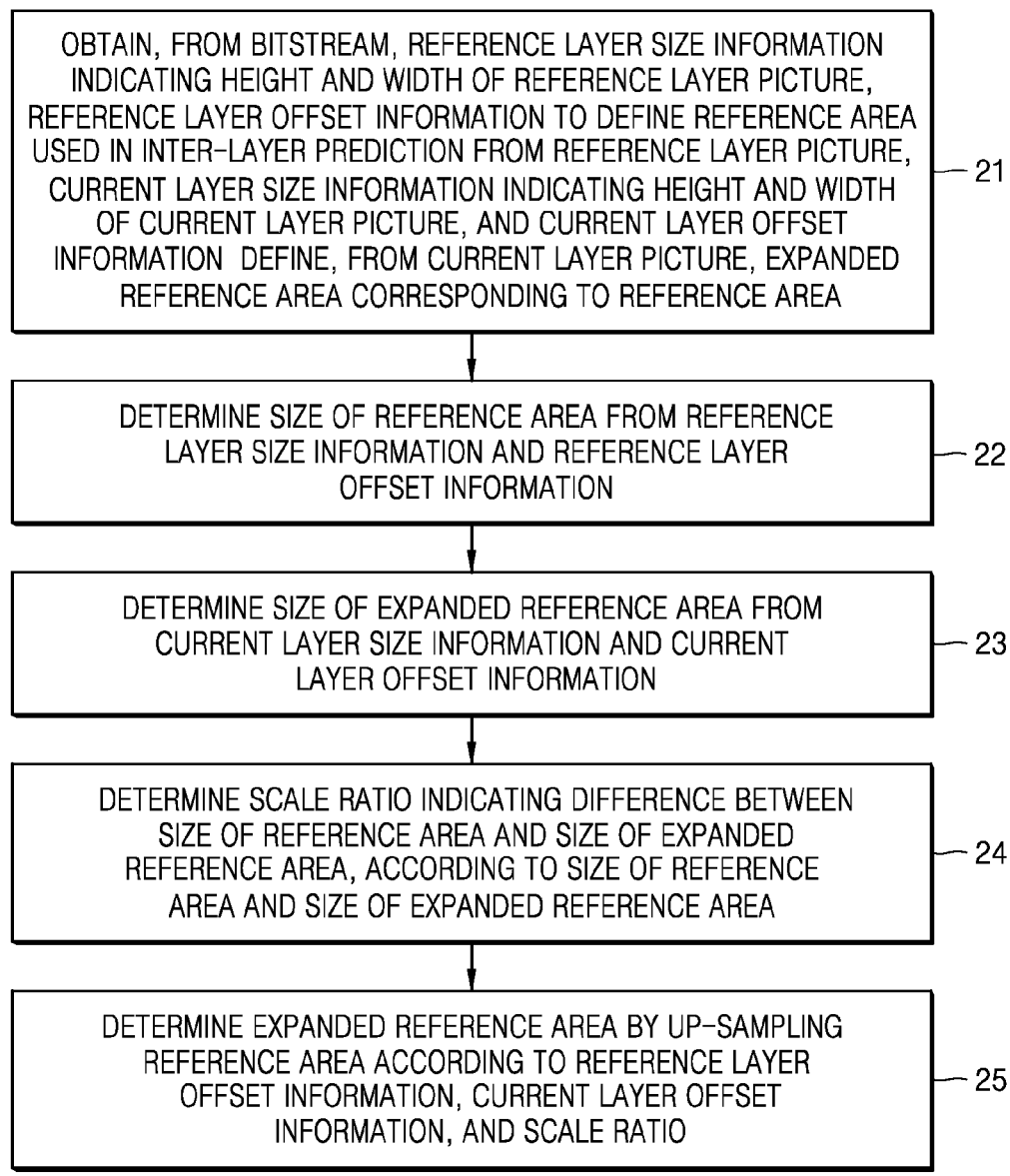
FIG. 2B illustrates a flowchart of a scalable video decoding method, according to an embodiment.

FIG. 2B illustrates a flowchart of a scalable video decoding method 20 performed by the scalable video decoding apparatus 200, according to an embodiment.

In operation 21, the reference layer size information, the reference layer offset information, the current layer size information, and the current layer offset information are obtained from the bitstream.

The reference layer size information indicates the height and width of the reference layer picture. The current layer size information indicates the height and width of the current layer picture.

The reference layer offset information indicates an offset between the reference layer picture and the reference area. The current layer offset information indicates an offset between the current layer picture and the expanded reference area. The reference layer offset information may be used to define the reference area used in inter-layer prediction from the reference layer picture. The current layer offset information may be used to define, from the current layer picture, the expanded reference area used in prediction of the current layer picture.

The reference layer offset information may include the reference layer left offset, the reference layer right offset, the reference layer top offset, and the reference layer bottom offset, and the current layer offset information may include the current layer left offset, the current layer right offset, the current layer top offset, and the current layer bottom offset.

The reference layer offset information and the current layer offset information may be expressed as luma sample units. In another embodiment, the reference layer offset information and the current layer offset information may be expressed as chroma sample units.

The operation 21 may be performed by the encoding information obtainer 210.

In operation 22, a size of the reference area is determined from the reference layer size information and the reference layer offset information.

The height of the reference area is determined by subtracting the reference layer top offset and the reference layer bottom offset from the height of the reference layer picture. The width of the reference area is determined by subtracting the reference layer right offset and the reference layer left offset from the width of the reference layer picture.

In operation 23, a size of the expanded reference area is determined from the current layer size information and the current layer offset information.

The height of the expanded reference area is determined by subtracting the current layer top offset and the current layer bottom offset from the height of the current layer picture. The width of the expanded reference area is determined by subtracting the current layer right offset and the current layer left offset from the width of the current layer picture.

In operation 24, according to the size of the reference area and the size of the expanded reference area, a scale ratio indicating a difference between the size of the reference area and the size of the expanded reference area is determined.

The scale ratio includes the horizontal scale ratio and the vertical scale ratio. The horizontal scale ratio may be determined by comparing the width of the reference area with the width of the expanded reference area. The vertical scale ratio may be determined by comparing the height of the reference area with the height of the expanded reference area.

The operations 22 through 24 may be performed by the scale ratio determiner 220.

In operation 25, the expanded reference area is determined by up-sampling the reference area according to the reference layer offset information, the current layer offset information, and the scale ratio.

A pixel of the expanded reference area is matched with a pixel of the reference area by taking into account the reference layer offset information, the current layer offset information, and the scale ratio. A sample value of the pixel of the expanded reference area is determined as a sample value of the pixel of the reference area which corresponds to the pixel of the expanded reference area. Therefore, each of all pixels of the expanded reference area is matched with one of pixels of the reference area, so that sample values of all pixels included in the expanded reference area are determined.

The operation 25 may be performed by the up-sampling unit 230.

When the sample values of the pixels of the expanded reference area are determined in operation 25, sample values of pixels in an area other than the expanded reference area may be determined by a prediction image determiner (not shown). The sample values of the pixels in the area other than the expanded reference area may be determined based on the sample values of the pixels of the expanded reference area.

Figure 3:
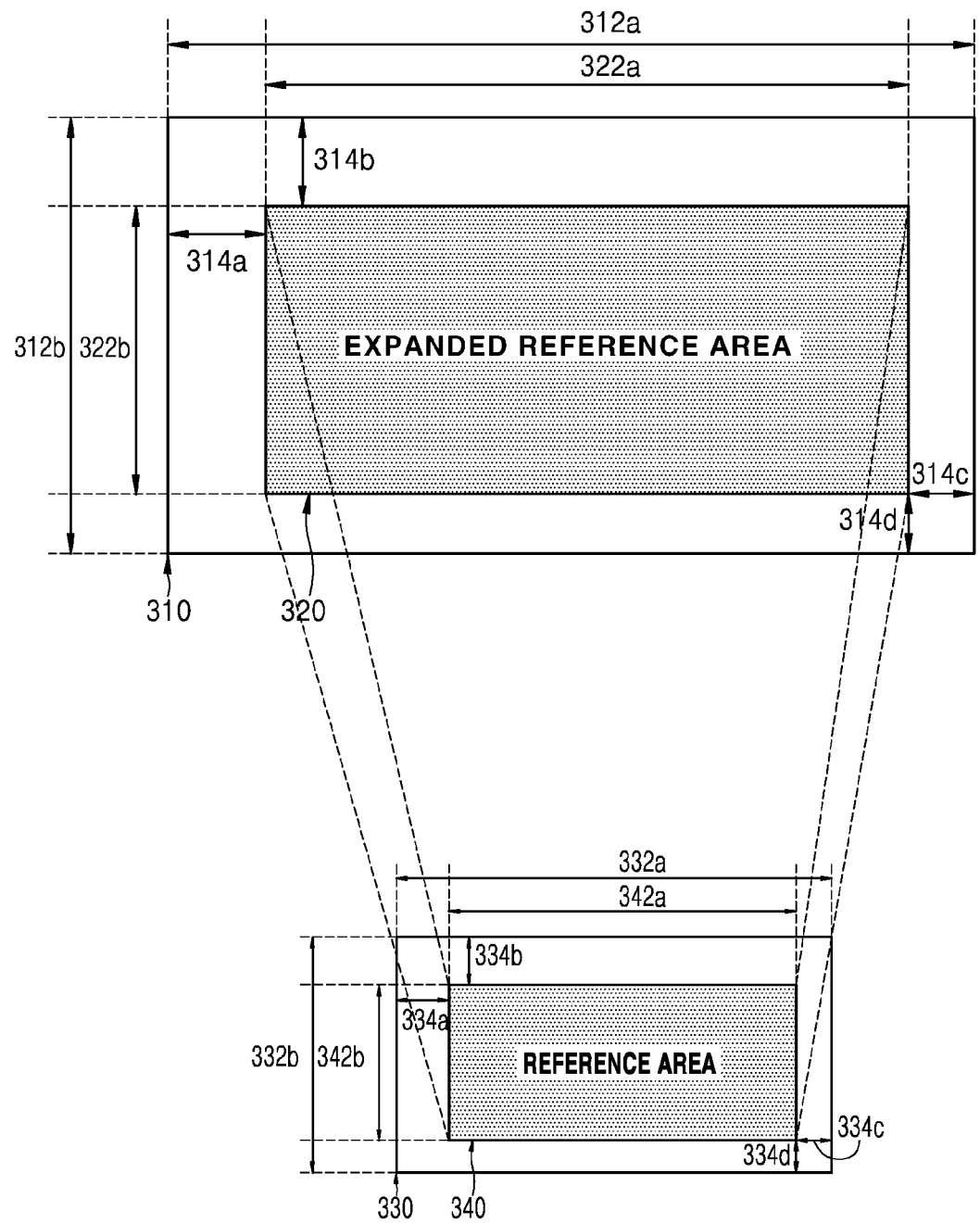
FIG. 3 illustrates a reference layer offset and a current layer offset, according to an embodiment.
Figure 4:
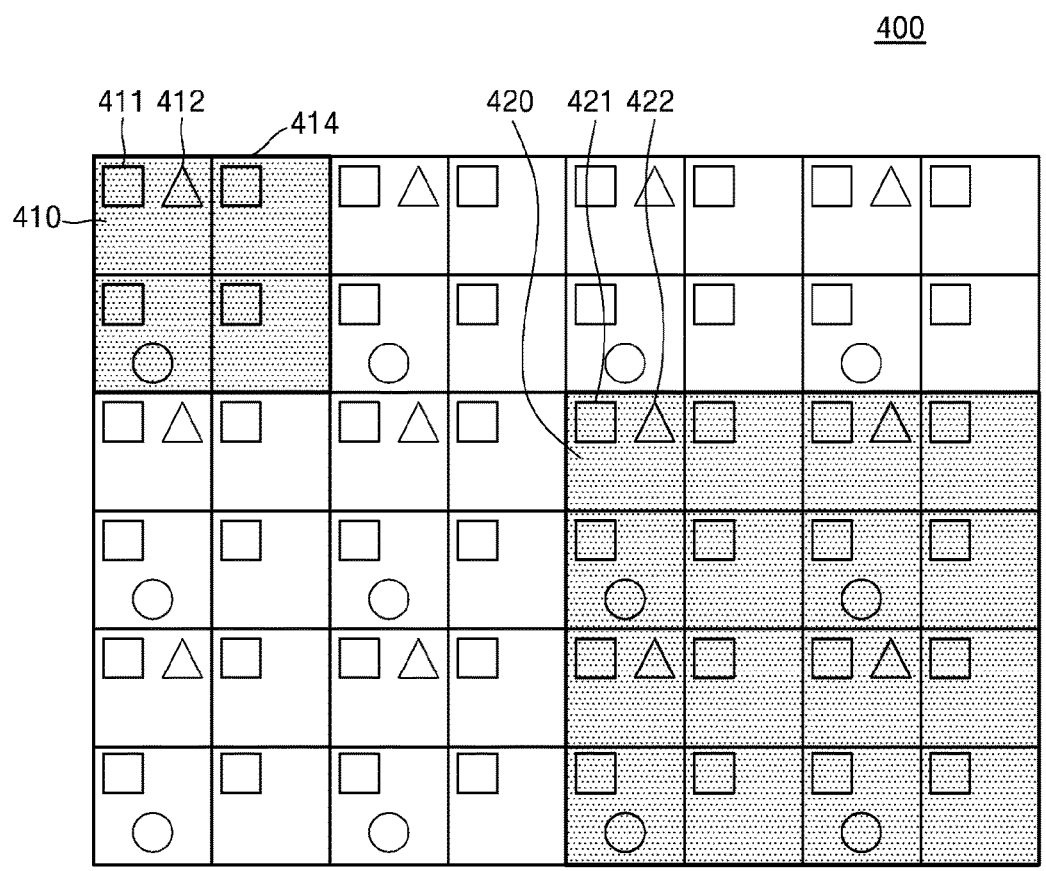
FIG. 4 illustrates a reference layer offset and a current layer offset, according to an embodiment.

FIGS. 3 and 4 illustrate an up-sampling procedure using the reference layer offset information and the current layer offset information, according to an embodiment.

FIG. 3 illustrates a current layer picture 310 and a reference layer picture 330. An expanded reference area 320 is defined in the current layer picture 310, and a reference area 340 is defined in the reference layer picture 330.

A width 322a and height 322b of the expanded reference area 320 may be determined based on a width 312a and height 312b of the current layer picture 310 and current layer offset information 314a, 314b, 314c, and 314d.

The current layer offset information 314a, 314b, 314c, and 314d may include a current layer left offset 314a, a current layer top offset 314b, a current layer right offset 314c, and a current layer bottom offset 314d.

The width 322a of the expanded reference area 320 may be determined by subtracting the current layer left offset 314a and the current layer right offset 314c from the width 312a of the current layer picture 310.

The height 322b of the expanded reference area 320 may be determined by subtracting the current layer top offset 314b and the current layer bottom offset 314d from the height 312b of the current layer picture 310.

A width 342a and height 342b of the reference area 340 may be determined based on a width 332a and height 332b of the reference layer picture 330, and reference layer offset information 334a, 334b, 334c, and 334d.

The reference layer offset information 334a, 334b, 334c, and 334d may include a reference layer left offset 334a, a reference layer top offset 334b, a reference layer right offset 334c, and a reference layer bottom offset 334d.

The width 322a of the expanded reference area 320 may be determined by subtracting the current layer left offset 314a and the current layer right offset 314c from the width 312a of the current layer picture 310.

The height 342b of the reference area 340 may be determined by subtracting the reference layer top offset 334b and the reference layer bottom offset 334d from the height 332b of the reference layer picture 330.

The horizontal scale ratio may be determined by comparing the width 342a of the reference area 340 with the width 322a of the expanded reference area 320. In more detail, a value obtained by dividing the width 322a of the expanded reference area 320 by the width 342a of the reference area 340 may be determined as the horizontal scale ratio.

The vertical scale ratio may be determined by comparing the height 342b of the reference area 340 with the height 322b of the expanded reference area 320. In more detail, a value obtained by dividing the height 322b of the expanded reference area 320 by the height 342b of the reference area 340 may be determined as the vertical scale ratio.

FIG. 4 illustrates a reference layer offset and a current layer offset in a luma sample unit, according to an embodiment.

FIG. 4 illustrates a reference layer picture 400 whose color format is 4:2:0. FIG. 4 also illustrates a pixel 410 in an upper left area of the reference layer picture 400, and a pixel in an upper left area of a reference area 420 included in the reference layer picture 400.

A square symbol in each pixel indicates a luma sample, and a triangular symbol and a round symbol indicate a Cb chroma sample and a Cr chroma sample, respectively. The pixel 410 and the pixel 430 include respective luma samples 411 and 421, and respective Cb chroma samples 412 and 422.

A 2×2 pixel block 414 may include 4 luma samples. In this regard, the number of chroma samples included in the 2×2 pixel block 414 may be determined according to a color format. For example, when the color format is 4:2:0 as in FIG. 4, the 2×2 pixel block 414 includes one Cb chroma sample in an upper left pixel, and one Cr chroma sample in a lower left pixel. When the color format is 4:2:2, the 2×2 pixel block 414 includes one Cb chroma sample and one Cr chroma sample in the upper left pixel, and includes one Cb chroma sample and one Cr chroma sample in the lower left pixel. When the color format is 4:4:4, the 2×2 pixel block 414 includes one Cb chroma sample and one Cr chroma sample in each of all pixels.

Equally, another 2×2 pixel block of the reference layer picture 400 includes luma samples and chroma samples according to the color format, as in the 2×2 pixel block 414.

Hereinafter, regarding descriptions about reference layer offset information and current layer offset information, the reference layer offset information is based on a chroma sample unit that is a Cb chroma sample.

When the reference layer offset information is based on a luma sample unit, a horizontal offset between the luma sample 411 in an upper left area of the reference layer picture 400 and the luma sample 421 in the upper left area of the reference area 420 is a reference layer left offset. According to the embodiment illustrated in FIG. 4, the reference layer left offset is 4.

When the reference layer offset information is based on the chroma sample unit, a horizontal offset between the Cb chroma sample 412 in an upper left area of the reference layer picture 400 and the Cb chroma sample 422 in the upper left area of the reference area 420 is a reference layer left offset. According to the embodiment illustrated in FIG. 4, the reference layer left offset is 2.

Equally, a reference layer top offset may be determined.

When the reference layer offset information is based on the luma sample unit, a vertical offset between the luma sample 411 in the upper left area of the reference layer picture 400 and the luma sample 421 in the upper left area of the reference area 420 is the reference layer top offset. According to the embodiment illustrated in FIG. 4, the reference layer top offset is 2.

When the reference layer offset information is based on the chroma sample unit, a vertical offset between the Cb chroma sample 412 in the upper left area of the reference layer picture 400 and the Cb chroma sample 422 in the upper left area of the reference area 420 is the reference layer top offset. According to the embodiment illustrated in FIG. 4, the reference layer top offset is 1.

When the color format is 4:2:0 as in FIG. 4, one Cb chroma sample is positioned per two luma samples in a horizontal direction. Thus, values of the reference layer left offset and the reference layer right offset according to the chroma sample unit are a half of values of the reference layer left offset and the reference layer right offset according to the luma sample unit.

In addition, when the color format is 4:2:0, one Cb chroma sample is positioned per two luma samples in a vertical direction. Thus, values of a reference layer top offset and a reference layer bottom offset according to the chroma sample unit are a half of values of the reference layer top offset and the reference layer bottom offset according to the luma sample unit.

When the color format is 4:2:2, one Cb chroma sample is positioned per two luma samples in a horizontal direction. Thus, values of the reference layer left offset and the reference layer right offset according to the chroma sample unit are a half of values of the reference layer left offset and the reference layer right offset according to the luma sample unit.

However, since one Cb chroma sample is positioned per one luma sample in a vertical direction, values of the reference layer top offset and the reference layer bottom offset according to the chroma sample unit are equal to values of the reference layer top offset and the reference layer bottom offset according to the luma sample unit.

When the color format is 4:4:4, a luma sample and a Cb chroma sample correspond to each other in all pixels. Thus, reference layer offset information based on the luma sample unit and reference layer offset information based on a Cb chroma sample unit have the same value.

FIG. 5 illustrates syntax for describing a procedure of obtaining encoding information, according to an embodiment.

num_scaled_ref_layer_offsets of FIG. 5 specifies the number of layers having current layer offset information. According to the scalable coding scheme, an image may be encoded into at least two layers. In this regard, all layers have at least one of an upper layer and a lower layer. Since the lower layer provides a reference area used in encoding/decoding with respect to the upper layer, the lower layer becomes a reference layer with respect to the upper layer. Conversely, since the upper layer is encoded/decoded by using the reference area of the lower layer, the upper layer becomes a current layer with respect to the lower layer. Therefore, all layers except for a lowermost layer may have current layer offset information. Therefore, when an image is encoded into n layers, the scalable video decoding apparatus 200 parses num_scaled_ref_layer_offsets so as to determine whether current layer offset information is present with respect to n−1 layers except for a lowermost layer.

For example, when an image is encoded into eight layers and num_scaled_ref_layer_offsets indicates 5, only five layers from among seven layers except for a lowermost layer may have current layer offset information. In this regard, since residual two layers do not have the current layer offset information, a size of an expanded reference area is determined to be equal to a size of a current layer picture.

The scalable video decoding apparatus 200 obtains num_scaled_ref_layer_offsets from a bitstream. The scalable video decoding apparatus 200 may determine the number of layers having the current layer offset information by parsing num_scaled_ref_layer_offsets.

```
for(i=0; i<num_scaled_ref_layer_offsets; i++){
scaled_ref_layer_id[i]
scaled_ref_layer_left_offset[scaled_ref_layer_id[i]]
scaled_ref_layer_top_offset[scaled_ref_layer_id[i]]
scaled_ref_layer_right_offset[scaled_ref_layer_id[i]]
scaled_ref_layer_bottom_offset[scaled_ref_layer_id[i]]
}
```

The above syntax means a procedure of obtaining the current layer offset information with respect to a current layer corresponding to i, when i is 0, 1, . . . , (num_scaled_ref_layer_offsets−1).

scaled_ref_layer_id[i] indicates an identification number of a current layer having a current layer offset. For example, when an image is encoded into four layers where the first layer and the third layer among the first layer, the second layer, the third layer, and the fourth layer have current layer offset information, num_scaled_ref_layer_offsets may indicate 2, scaled_ref_layer_id[0] may indicate the first layer, and scaled_ref_layer_id[1] may indicate the third layer.

scaled_ref_layer_left_offset[scaled_ref_layer_id[i]] indicates a current layer left offset corresponding to scaled_ref_layer_id[i]. For example, when scaled_ref_layer_id[0] indicates the first layer, and a current layer left offset of the first layer is 2, scaled_ref_layer_left_offset[scaled_ref_layer_id[0]] indicates 2.

scaled_ref_layer_top_offset[scaled_ref_layer_id[i]] indicates a current layer top offset corresponding to scaled_ref_layer_id[i]. For example, when ref_layer_id[0] indicates the first layer, and a current layer top offset of the first layer is 1, scaled_ref_layer_top_offset[scaled_ref_layer_id[0]] indicates 1.

scaled_ref_layer_right_offset[scaled_ref_layer_id[i]] indicates a current layer right offset corresponding to scaled_ref_layer_id[i]. For example, when ref_layer_id[0] indicates the first layer, and a current layer right offset of the first layer is 2, scaled_ref_layer_right_offset[scaled_ref_layer_id[0]] indicates 2.

scaled_ref_layer_bottom_offset[scaled_ref_layer_id[i]] indicates a current layer bottom offset corresponding to scaled_ref_layer_id[i]. For example, when ref_layer_id[0] indicates the first layer, and a current layer bottom offset of the first layer is 1, scaled_ref_layer_bottom_offset[scaled_ref_layer_id[0]] indicates 1.

The scalable video decoding apparatus 200 may obtain, from a bitstream, scaled_ref_layer_id[i], ref_layer_left_offset[scaled_ref_layer_id[i]], scaled_ref_layer_top_offset[scaled_ref_layer_id[i]], scaled_ref_layer_right_offset[scaled_ref_layer_id[i]], and scaled_ref_layer_bottom_offset[scaled_ref_layer_id[i]].

If scaled_ref_layer_left_offset[scaled_ref_layer_id[i]] is not present in the bitstream, the scalable video decoding apparatus 200 determines scaled_ref_layer_left_offset[scaled_ref_layer_id[i]] as 0.

If scaled_ref_layer_top_offset[scaled_ref_layer_id[i]] is not present in the bitstream, the scalable video decoding apparatus 200 determines scaled_ref_layer_top_offset[ref_layer_id[i]] as 0.

If scaled_ref_layer_right_offset[ref_layer_id[i]] is not present in the bitstream, the scalable video decoding apparatus 200 determines scaled_ref_layer_right_offset[ref_layer_id[i]] as 0.

If scaled_ref_layer_bottom_offset[ref_layer_id[i]] is not present in the bitstream, the scalable video decoding apparatus 200 determines scaled_ref_layer_bottom_offset[ref_layer_id[i]] as 0.

num_ref_layer_offsets of FIG. 5 specifies the number of layers having reference layer offset information. When the image is encoded into n layers, the scalable video decoding apparatus 200 parses num_scaled_ref_layer_offsets so as to determine whether reference layer offset information is present with respect to n−1 layers except for an uppermost layer.

For example, when the image is encoded into eight layers and num_ref_layer_offsets indicates 5, only five layers among seven layers except for an uppermost layer may have reference layer offset information. In this regard, since residual two layers do not have reference layer offset information, an entire reference layer picture is determined as a reference area.

The scalable video decoding apparatus 200 obtains num_ref_layer_offsets from the bitstream. The scalable video decoding apparatus 200 may determine the number of layers having the reference layer offset information by parsing num_ref_layer_offsets.

```
for( i = 0; i < num_ref_layer_offsets; i++){
ref_layer_id[i]
ref_layer_left_offset[ ref_layer_id[ i ] ]
ref_layer_top_offset[ ref_layer_id[ i ] ]
ref_layer_right_offset[ ref_layer_id[ i ] ]
ref_layer_bottom_offset[ ref_layer_id[ i ] ]
}
```

The above syntax means a procedure of obtaining the reference layer offset information with respect to a reference layer corresponding to i, when i is 0, 1, . . . , (num_ref_layer_offsets−1).

ref_layer_id[i] indicates an identification number of a reference layer having a reference layer offset. For example, when an image is encoded into four layers where the second layer and the fourth layer among the first layer, the second layer, the third layer, and the fourth layer have reference layer offset information, num_ref_layer_offsets may indicate 2, ref_layer_id[0] may indicate the second layer, and ref_layer_id[1] may indicate the fourth layer.

ref_layer_left_offset[ref_layer_id[i]] indicates a reference layer left offset corresponding to ref_layer_id[i]. For example, when ref_layer_id[0] indicates the second layer, and a reference layer left offset of the second layer is 2, ref_layer_left_offset[ref_layer_id[0]] indicates 2.

ref_layer_top_offset[ref_layer_id[i]] indicates a reference layer top offset corresponding to ref_layer_id[i]. For example, when ref_layer_id[0] indicates the second layer, and a reference layer top offset of the second layer is 1, ref_layer_top_offset[ref_layer_id[0]] indicates 1.

ref_layer_right_offset[ref_layer_id[i]] indicates a reference layer right offset corresponding to ref_layer_id[i]. For example, when ref_layer_id[0] indicates the second layer, and a reference layer right offset of the second layer is 2, ref_layer_right_offset[ref_layer_id[0]] indicates 2.

ref_layer_bottom_offset[ref_layer_id[i]] indicates a reference layer bottom offset corresponding to ref_layer_id[i]. For example, when ref_layer_id[0] indicates the second layer, and a reference layer bottom offset of the second layer is 1, ref_layer_bottom_offset[ref_layer_id[0]] indicates 1.

The scalable video decoding apparatus 200 may obtain, from a bitstream, ref_layer_id[i], ref_layer_left_offset[ref_layer_id[i]], ref_layer_top_offset[ref_layer_id[i]], ref_layer_right_offset[ref_layer_id[i]], and ref_layer_bottom_offset[ref_layer_id[i]].

If ref_layer_left_offset[ref_layer_id[i]] is not present in the bitstream, the scalable video decoding apparatus 200 determines ref_layer_left_offset[ref_layer_id[i]] as 0.

If ref_layer_top_offset[ref_layer_id[i]] is not present in the bitstream, the scalable video decoding apparatus 200 determines ref_layer_top_offset[ref_layer_id[i]] as 0.

If ref_layer_right_offset[ref_layer_id[i]] is not present in the bitstream, the scalable video decoding apparatus 200 determines ref_layer_right_offset[ref_layer_id[i]] as 0.

If ref_layer_bottom_offset[ref_layer_id[i]] is not present in the bitstream, the scalable video decoding apparatus 200 determines ref_layer_bottom_offset[ref_layer_id[i]] as 0.

scaled_ref_layer_left_offset[scaled_ref_layer_id[i]], scaled_ref_layer_top_offset[scaled_ref_layer_id[i]], scaled_ref_layer_right_offset[scaled_ref_layer_id[i]], scaled_ref_layer_bottom_offset[scaled_ref_layer_id[i]], ref_layer_left_offset[ref_layer_id[i]], ref_layer_top_offset[ref_layer_id[i]], ref_layer_right_offset[ref_layer_id[i]] and ref_layer_bottom_offset[ref_layer_id[i]] which are described above may be values each expressed as a luma sample unit. When the offsets are each expressed as a chroma sample unit, the scalable video decoding apparatus 200 may convert the offsets to luma sample unit according to a color format.

The scalable video decoding apparatus 200 may determine a height and width of a current layer picture by using obtained scaled_ref_layer_left_offset[scaled_ref_layer_id[i]], scaled_ref_layer_top_offset[scaled_ref_layer_id[i]], scaled_ref_layer_right_offset[scaled_ref_layer_id[i]] and scaled_ref_layer_bottom_offset[scaled_ref_layer_id[i]]. A height and width of an expanded reference area may be determined according to Equation 1 and Equation 2.

$$ScaledRefLayerRegionWidthInSamplesY = PicWidthInSamplesCurrY - ScaledRefLayerRegionLeftOffset - ScaledRefLayerRegionRightOffset \quad \text{[Equation 1]}$$

$$ScaledRefLayerRegionHeightInSamplesY = PicHeightInSamplesCurrY - ScaledRefLayerRegionTopOffset - ScaledRefLayerRegionBottomOffset \quad \text{[Equation 2]}$$

In Equation 1 and Equation 2, ScaledRefLayerRegionWidthInSamplesY indicates a width of an expanded reference area, and ScaledRefLayerRegionHeightInSamplesY indicates a height of the expanded reference area. PicWidthInSamplesCurrY indicates a width of a current layer picture, and PicHeightInSamplesCurrY indicates a height of the current layer picture.

ScaledRefLayerRegionLeftOffset, ScaledRefLayerRegionRightOffset, ScaledRefLayerRegionTopOffset, and ScaledRefLayerRegionBottomOffset indicate a current layer left offset, a current layer top offset, a current layer right offset, and a current layer bottom offset that the scalable video decoding apparatus 200 obtains from a bitstream.

According to Equation 1, ScaledRefLayerRegionWidthInSamplesY is determined by subtracting ScaledRefLayerRegionLeftOffset and ScaledRefLayerRegionRightOffset from PicWidthInSamplesCurrY.

According to Equation 2, ScaledRefLayerRegionHeightInSamplesY is determined by subtracting ScaledRefLayerRegionTopOffset and ScaledRefLayerRegionBottomOffset from PicHeightInSamplesCurrY.

The scalable video decoding apparatus 200 may determine a height and width of a reference area by using the obtained ref_layer_left_offset[ref_layer_id[i]], ref_layer_top_offset[ref_layer_id[i]], ref_layer_right_offset[ref_layer_id[i]] and ref_layer_bottom_offset[ref_layer_id[i]]. The height and width of the reference area may be determined according to Equation 3 and Equation 4.

$$\text{RefLayerRegionWidthInSamples}Y = \text{PicWidthInSamplesRefLayer}Y\text{?RefLayerRegionLeftOffset?RefLayerRegionRightOffset} \quad \text{[Equation 3]}$$

$$\text{RefLayerRegionHeightInSamples}Y = \text{PicHeightInSamplesRefLayer}Y\text{?RefLayerRegionTopOffset?RefLayerRegionBottomOffset} \quad \text{[Equation 4]}$$

In Equation 3 and Equation 4, RefLayerRegionWidthInSamplesY indicates the width of the reference area, and RefLayerRegionHeightInSamplesY indicates the height of the reference area. PicWidthInSamplesRefLayerY indicates a width of a reference layer picture, and PicHeightInSamplesRefLayerY indicates a height of the reference layer picture.

RefLayerRegionLeftOffset, RefLayerRegionRightOffset, RefLayerRegionTopOffset, and RefLayerRegionBottomOffset mean a reference layer left offset, a reference layer top offset, a reference layer right offset, and a reference layer bottom offset that the scalable video decoding apparatus 200 obtains from the bitstream.

According to Equation 1, RefLayerRegionWidthInSamplesY is determined by subtracting RefLayerRegionLeftOffset and RefLayerRegionRightOffset from PicWidthInSamplesRefLayerY.

According to Equation 2, RefLayerRegionHeightInSamplesY is determined by subtracting RefLayerRegionTopOffset and RefLayerRegionBottomOffset from PicHeightInSamplesRefLayerY.

The scalable video decoding apparatus 200 may determine a horizontal scale ratio and a vertical scale ratio by using the height and width of the reference area and the height and width of the expanded reference area. The horizontal scale ratio and the vertical scale ratio may be determined according to Equation 5 and Equation 6.

$$\text{SpatialScaleFactorHor}Y = ((\text{RefLayerRegionWidthInSamples}Y \ll 16) + (\text{ScaledRefRegionWidthInSamples}Y \gg 1)) / \text{ScaledRefRegionWidthInSamples}Y \quad \text{[Equation 5]}$$

$$\text{SpatialScaleFactorVer}Y = ((\text{RefLayerRegionHeightInSamples}Y \ll 16) + (\text{ScaledRefRegionHeightInSamples}Y \gg 1)) / \text{ScaledRefRegionHeightInSamples}Y \quad \text{[Equation 6]}$$

In Equation 5 and Equation 6, SpatialScaleFactorHorY and SpatialScaleFactorVerY indicate a horizontal scale ratio and a vertical scale ratio, respectively. A<<B and A>>B are a left shift operator and a right shift operator, respectively. The left shift operator means that 0 is inserted to a right side of a bit sequence. Therefore, a value of A<<B is A×2^B. For example, 010010<<2 means 01001000. The right shift operator means that a bit at a right side of a bit sequence is removed. For example, 01001000>>2 means 010010.

According to Equation 5, SpatialScaleFactorHorY is equal to a value obtained by dividing another value by ScaledRefRegionWidthInSamplesY, the other value being obtained by shifting RefLayerRegionWidthInSamplesY to the right by 16 pixels. Therefore, in order to allow the horizontal scale ratio to be determined as an integer greater than 1, RefLayerRegionWidthInSamplesY is multiplied by 2^16 that is a maximal value of a ratio of an expanded reference area to the reference area.

According to Equation 5, in order to round off a result value of (RefLayerRegionWidthInSamplesY<<16)/ScaledRefRegionWidthInSamplesY, ScaledRefRegionWidthInSamplesY>>1 is added to RefLayerRegionWidthInSamplesY<<16.

According to Equation 6, SpatialScaleFactorVerY is equal to a value obtained by dividing another value by ScaledRefRegionHeightInSamplesY, the other value being obtained by shifting RefLayerRegionHeightInSamplesY to the right by 16 pixels. In Equation 5, ScaledRefRegionHeightInSamplesY is greater than RefLayerRegionHeightInSamplesY. Therefore, in order to allow the vertical scale ratio to be determined as a value greater than 1, RefLayerRegionHeightInSamplesY is multiplied by 2^16 that is the maximal value of the ratio of the expanded reference area to the reference area.

According to Equation 5, in order to round off a result value of (RefLayerRegionHeightInSamplesY<<16)/ScaledRefRegionHeightInSamplesY, ScaledRefRegionHeightInSamplesY>>1 is added to RefLayerRegionHeightInSamplesY<<16.

Consequently, according to Equation 5 and Equation 6, a value obtained by dividing SpatialScaleFactorHorY by 2^16 is an actual horizontal scale ratio, and a value obtained by dividing SpatialScaleFactorVerY by 2^16 is an actual vertical scale ratio.

The scalable video decoding apparatus 200 may determine a sample value of pixels of the expanded reference area by mapping a pixel of the expanded reference area to a pixel of the reference area. With reference to Equation 7 and Equation 8, a method of mapping the pixel of the expanded reference area to the pixel of the reference area is described.

$$x\text{Refl}6 = (((xP?\text{ScaledRefLayerLeftOffset})*\text{SpatialScaleFactorHor}Y + \text{add}X + (1 \ll 11)) \gg 12) + (\text{RefLayerRegionLeftOffset} \ll 4) \quad \text{[Equation 7]}$$

$$y\text{Refl}6 = (((yP?\text{ScaledRefLayerTopOffset})*\text{SpatialScaleFactorVer}Y + \text{add}Y + (1 \ll 11)) \gg 12) + (\text{RefLayerRegionTopOffset} \ll 4) \quad \text{[Equation 8]}$$

In Equation 7 and Equation 8, xP and yP are coordinates values indicating a location of the pixel of the expanded reference area with respect to a current layer picture. xP indicates a horizontal distance from an upper left pixel of the current layer picture to the pixel of the expanded reference area. yP indicates a vertical distance from the upper left pixel of the current layer picture to the pixel of the expanded reference area.

xRef16 and yRef16 are coordinates values indicating a location of the pixel of the reference area with respect to a reference layer picture. xRef16 and yRef16 indicate the location of the pixel of the reference area in a luma sample unit. xRef16 indicates a horizontal distance from an upper left pixel of the reference layer picture to the pixel of the reference area. yRef16 indicates a vertical distance from the upper left pixel of the reference layer picture to the pixel of the reference area.

addX indicates multiplication of the horizontal scale ratio and a horizontal phase difference. The horizontal phase difference means a phase difference in a horizontal direction, the phase difference occurring while the reference area is up-sampled to the expanded reference area. addY indicates multiplication of the vertical scale ratio and a vertical phase difference. The vertical phase difference means a phase difference in a vertical direction, the phase difference occurring while the reference area is up-sampled to the expanded reference area. In order to easily describe Equation 7 and Equation 8, it is assumed that addX are addY are 0.

In order to obtain xRef16, the scalable video decoding apparatus 200 multiplies SpatialScaleFactorHorY indicating the horizontal scale ratio by a value obtained by subtracting xP from ScaledRefLayerLeftOffset indicating a current layer left offset. The scalable video decoding apparatus 200 shifts a result value of (xP ? ScaledRefLayerLeftOffset)*SpatialScaleFactorHorY to the right by 12 pixels, and adds (RefLayerRegionLeftOffset<<4) indicating a reference layer left offset to a result value of a shifting operation.

Equation 7 is determined by taking into account a factor that SpatialScaleFactorHorY is a value greater than the actual horizontal scale ratio by 2^16 and a factor that xRef16 expressed as a luma sample unit has to be an integer value greater than 1. Therefore, in Equation 7, the result value of (xP ? ScaledRefLayerLeftOffset)*SpatialScaleFactorHorY is shifted to the right by 12 pixels, and RefLayerRegionLeftOffset is shifted to the left by 4 pixels. Therefore, a value obtained by dividing xRef16 by 16 pixels (the same as 2^4) is an actual location of the pixel of the reference area.

yRef16 is determined by using Equation 8, in a same manner as xRef16.

The sample values of the expanded reference area which correspond to xP and yP may be determined by interpolating samples of the reference area according to xRef16 and yRef16 determined by using Equation 7 and Equation 8.

The syntax described with reference to FIG. 5 is an embodiment, and various embodiments of the present specification may be implemented by syntax having configuration different from that of the syntax of FIG. 5.

Figure 6A:
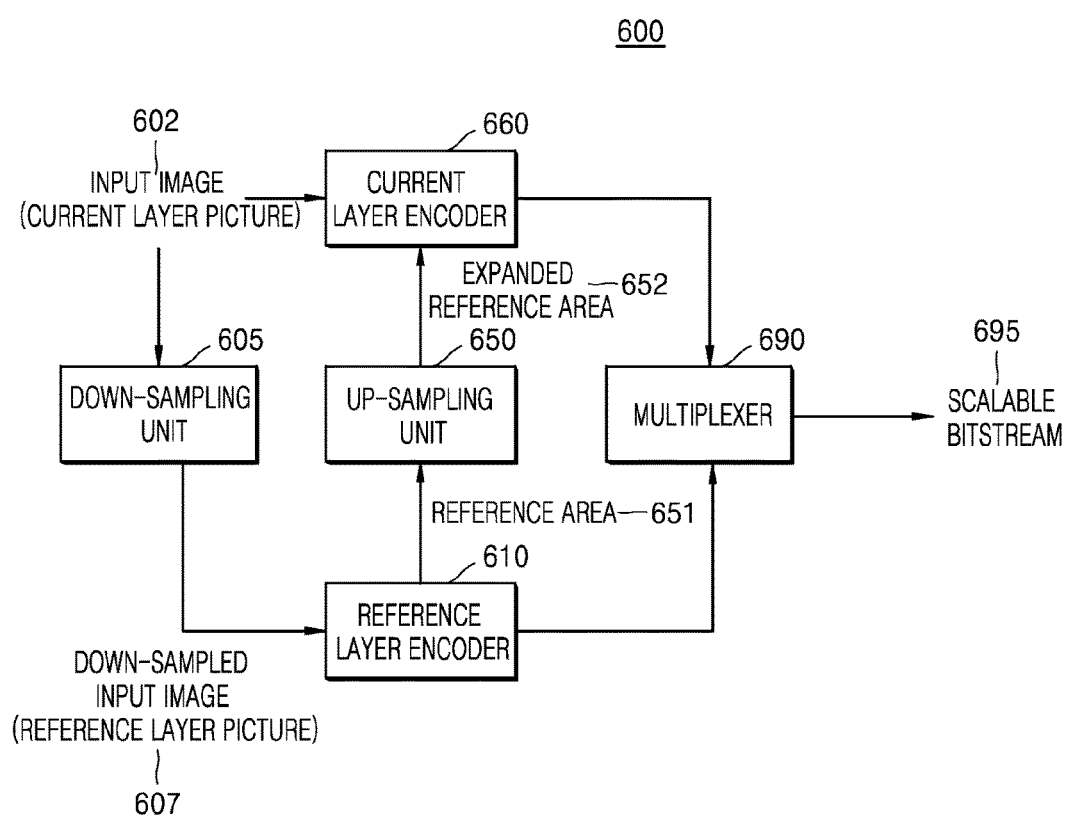
FIGS. 6A and 6B illustrate block diagrams of a scalable video encoding apparatus 600, according to an embodiment.

FIG. 6A illustrates a block diagram of a scalable video encoding apparatus 600, according to an embodiment.

The scalable video encoding apparatus 600 may include a down-sampling unit 605, a reference layer encoder 610, an up-sampling unit 650, a current layer encoder 660, and a multiplexer 690.

The down-sampling unit 605 receives an input of a current layer picture 602. The down-sampling unit 605 generates a reference layer picture 607 by down-sampling the input current layer picture 602.

The reference layer encoder 610 receives an input of a reference layer picture 607. The reference layer encoder 610 encodes the reference layer picture 607. The reference layer encoder 610 may encode the reference layer picture 607 according to a single layer encoding scheme. The reference layer encoder 610 may reconstruct the reference layer picture 607 by encoding and then decoding the reference layer picture 607, and may store the reconstructed reference layer picture 607 in a storage (not shown). In addition, the reference layer encoder 610 may determine a reference area 651 from the reference layer picture 607.

The up-sampling unit 650 receives an input of the reference area 651 from the reference layer encoder 610. The up-sampling unit 650 determines an expanded reference area 652 by up-sampling the reference area 651.

The current layer encoder 660 receives an input of a current layer picture 602 and the expanded reference area 652. The current layer encoder 660 may encode the current layer picture 602 according to the single layer encoding scheme. Also, the current layer encoder 660 may encode the current layer picture 602 by generating a prediction picture of the current layer picture 602 according to the expanded reference area 652.

The reference layer encoder 610 transmits a bitstream including encoding information of the reference layer picture 607 to the multiplexer 690. The current layer encoder 660 transmits a bitstream including encoding information of the current layer picture 602 to the multiplexer 690.

The multiplexer 690 generates a scalable bitstream 695 by combining the bitstreams transmitted from the reference layer encoder 610 and the current layer encoder 660.

Figure 6B:
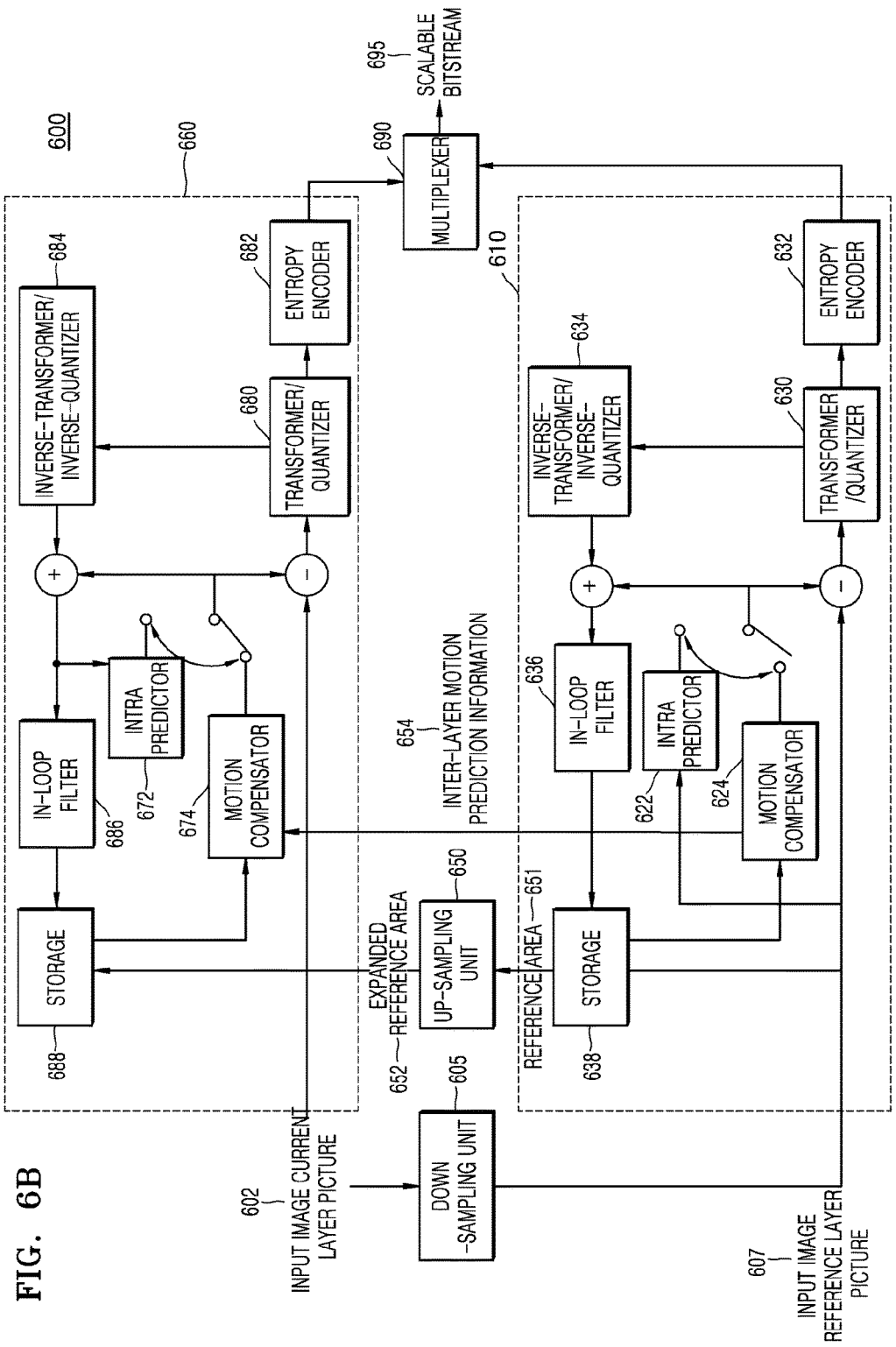

FIG. 6B illustrates a block diagram of the scalable video encoding apparatus 600, according to the embodiment. FIG. 6B particularly illustrates an encoding procedure by the reference layer encoder 610 and the current layer encoder 660.

The reference layer encoder 610 may encode the reference layer pictures 607 by splitting the reference layer pictures 607 according to a largest coding unit, a coding unit, a prediction unit, a transformation unit, or the like. An intra predictor 622 may predict the reference layer picture 607 by determining an optimal encoding mode according to an intra mode and a coded depth. A motion compensator 624 may predict the reference layer picture 607 by referring to a reference picture list stored in the storage. The reference picture list may include reference layer pictures input to the reference layer encoder 610. Residual data may be generated for each prediction unit according to intra prediction or inter prediction.

A transformer/quantizer 630 generates a quantized transformation coefficient by performing frequency transformation and quantization on the residual data. Then, an entropy encoder 632 entropy encodes the quantized transformation coefficient. The entropy encoded quantized transformation coefficient and a plurality of pieces of encoding information generated in an encoding procedure are transmitted to the multiplexer 690.

An inverse-transformer/inverse-quantizer 634 reconstructs the residual data by inverse quantizing and inverse transforming the quantized transformation coefficient. The intra predictor 622 or the motion compensator 624 reconstructs the reference layer picture 607 by using the residual data and the encoding information.

When the reference layer picture 607 is predicted according to an inter prediction mode, an encoding error of the reconstructed reference layer picture 607 may be compensated for by an in-loop filter 636. The in-loop filter 636 may include at least one of a deblocking filter and a Sample Adaptive Offset (SAO) filter.

The reconstructed reference layer picture 607 may be stored in a storage 638. In addition, the reconstructed reference layer picture 607 may be transmitted to the motion compensator 624 and may be used in prediction with respect to another reference layer picture.

The reference area 651 of the reference layer picture 607 stored in the storage 638 may be up-sampled by the up-sampling unit 650. The up-sampling unit 650 may transmit an expanded reference area which is the up-sampled reference area 651 to a storage 688 of the current layer encoder 660.

In addition, the motion compensator 624 may generate inter-layer motion prediction information 654 obtained by scaling motion prediction information according to a scale ratio of a current layer picture to a reference layer picture, the motion prediction information having been used in inter-prediction. The motion compensator 624 may transmit the inter-layer motion prediction information 654 to a motion compensator 674 of the current layer encoder 660.

According to the aforementioned scheme, an encoding operation with respect to reference layer pictures may be repeated.

The current layer encoder 660 may encode the current layer picture 602 by splitting the current layer picture 602 according to a largest coding unit, a coding unit, a prediction unit, a transformation unit, or the like. An intra predictor 672 may predict the current layer picture 602 by determining an optimal encoding mode according to an intra mode and a coded depth. A motion compensator 674 may predict the current layer picture 602 by referring to a reference picture list stored in the storage. In addition, for the inter-prediction, the motion compensator 674 may use the inter-layer motion prediction information 654 that is generated by the motion compensator 624 of the reference layer encoder 610. The reference picture list may include current layer pictures input to the current layer encoder 660, and the expanded reference area 652 up-sampled by the up-sampling unit 650. Residual data may be generated for each prediction unit according to the intra prediction or inter prediction.

A transformer/quantizer 680 generates a quantized transformation coefficient by performing frequency transformation and quantization on the residual data. Then, an entropy encoder 682 entropy encodes the quantized transformation coefficient. The entropy encoded quantized transformation coefficient and a plurality of pieces of encoding information generated in an encoding procedure are transmitted to the multiplexer 690.

An inverse-transformer/inverse-quantizer 684 reconstructs the residual data by inverse quantizing and inverse transforming the quantized transformation coefficient. The intra predictor 672 or the motion compensator 674 reconstructs the current layer picture 602 by using the residual data and the encoding information.

When the current layer picture 602 is predicted according to the inter prediction mode, an encoding error of the reconstructed current layer picture 602 may be compensated for by an in-loop filter 686. The in-loop filter 686 may include at least one of a deblocking filter and a Sample Adaptive Offset (SAO) filter.

The reconstructed current layer picture 602 may be stored in the storage 688. In addition, the reconstructed current layer picture 602 may be transmitted to the motion compensator 624 and may be used in prediction with respect to another reference layer picture.

According to the aforementioned scheme, an encoding operation with respect to current layer pictures may be repeated.

Figure 7A:
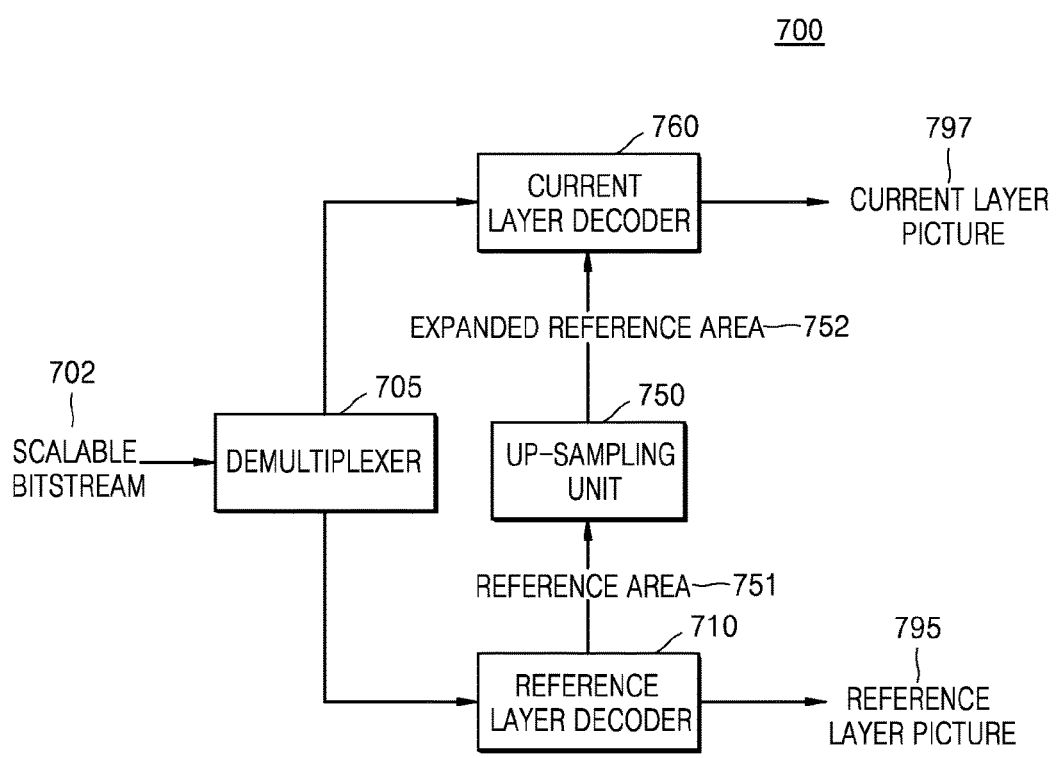
FIGS. 7A and 7B illustrate block diagrams of a scalable video decoding apparatus 700, according to an embodiment.

FIG. 7A illustrates a block diagram of a scalable video decoding apparatus 700, according to an embodiment.

The scalable video decoding apparatus 700 may include a demultiplexer 705, a reference layer decoder 710, an up-sampling unit 750, and a current layer decoder 760.

The demultiplexer 705 receives an input of a scalable bitstream 702. Then, the demultiplexer 705 parses the scalable bitstream 702 and splits the scalable bitstream 702 into a bitstream regarding a current layer picture 797 and a bitstream regarding a reference layer picture 795. The bitstream regarding the current layer picture 797 is transmitted to the current layer decoder 760. The bitstream regarding the reference layer picture 795 is transmitted to the reference layer decoder 710.

The reference layer decoder 710 decodes the input bitstream regarding the reference layer picture 795. The reference layer decoder 710 may decode the reference layer picture 795 according to a single layer decoding scheme. The reference layer decoder 710 may store the decoded reference layer picture 795 in a storage (not shown). In addition, the reference layer decoder 710 may determine a reference area 751 from the decoded reference layer picture 795. The reference layer picture 795 may be output via a decoding procedure by the reference layer decoder 710.

The up-sampling unit 750 receives an input of a reference area 751 from the reference layer decoder 710. Then, the sampling unit 750 up-samples the reference area 751 and determines an expanded reference area 752.

The current layer decoder 760 receives an input of the bitstream regarding the current layer picture 797 and the expanded reference area 752. The current layer decoder 760 may decode the current layer picture 797 according to the single layer decoding scheme. In addition, the current layer decoder 760 may generate a prediction picture of the current layer picture 797 according to the expanded reference area 752 and may decode the current layer picture 797. The current layer picture 797 may be output via a decoding procedure by the current layer decoder 760.

Figure 7B:
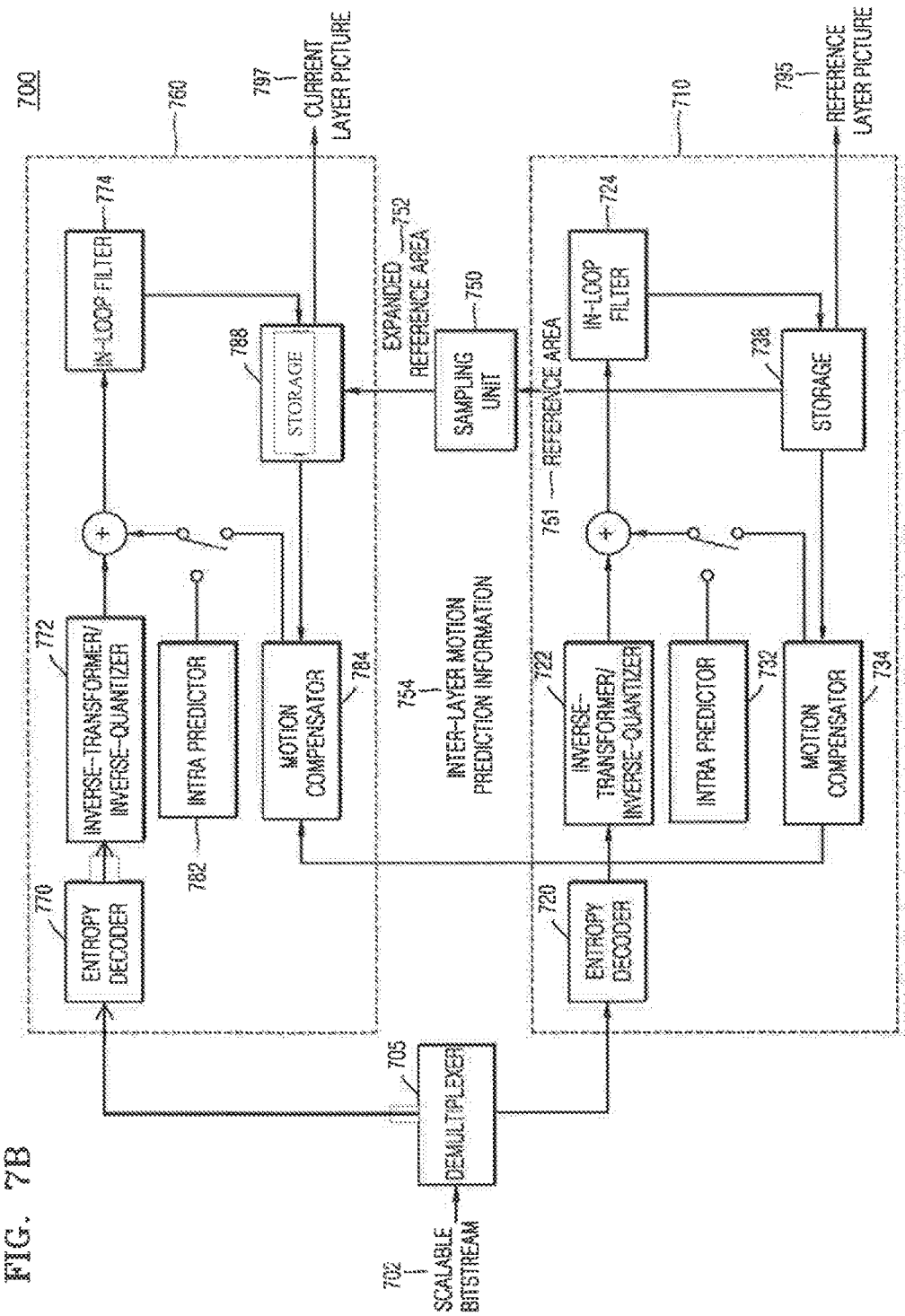

FIG. 7B illustrates a block diagram of the scalable video decoding apparatus 700, according to the embodiment. FIG. 7B particularly illustrates a decoding procedure by the reference layer decoder 710 and the current layer decoder 760.

An entropy decoder 720 generates a quantized transformation coefficient by entropy decoding the bitstream regarding the reference layer picture 795. Then, an inverse-transformer/inverse-quantizer 722 reconstructs the residual data by inverse quantizing and inverse transforming the quantized transformation coefficient.

An intra predictor 732 may predict the reference layer picture 795 according to the residual data and the encoding information. A motion compensator 734 may predict the reference layer picture 795 by referring to the residual data and a reference picture list stored in a storage. The reference picture list includes reference layer pictures reconstructed by the reference layer decoder 710.

When the reference layer picture 795 is predicted according to an inter prediction mode, an encoding error of the reconstructed reference layer picture 795 may be compensated for by an in-loop filter 724. The in-loop filter 724 may include at least one of a deblocking filter and a Sample Adaptive Offset (SAO) filter.

The reconstructed reference layer picture 795 may be stored in a storage 738. The reconstructed reference layer picture 795 may be transmitted to the motion compensator 734 and may be used in prediction with respect to another reference layer picture.

The reference area 751 of the reference layer picture 795 stored in the storage 738 may be up-sampled by the sampling unit 750. The sampling unit 750 may transmit an expanded reference area that is the up-sampled reference area 751 to a storage 788 of the current layer decoder 760.

The in-loop filter 724 may generate inter-layer motion prediction information 754 obtained by scaling motion prediction information according to a scale ratio of a current layer picture to a reference layer picture, the motion prediction information having been used in inter-prediction. The motion compensator 734 may transmit the inter-layer motion prediction information 754 to a motion compensator 784 of the current layer decoder.

According to the aforementioned scheme, a decoding operation with respect to reference layer pictures may be repeated.

An entropy decoder 770 generates a quantized transformation coefficient by entropy decoding the bitstream regarding the current layer picture 797. Then, an inverse-transformer/inverse-quantizer 772 reconstructs the residual data by inverse quantizing and inverse transforming the quantized transformation coefficient.

An intra predictor 782 may predict the current layer picture 797 according to the residual data and the encoding information. A motion compensator 784 may predict the current layer picture 797 by referring to the residual data and a reference picture list stored in the storage 788. The motion compensator 784 may use the inter-layer motion prediction information 754 for the inter-prediction, the inter-layer motion prediction information 754 being generated by the motion compensator 734 of the reference layer decoder 710. The reference picture list includes current layer pictures reconstructed by the current layer decoder 760, and the expanded reference area 752 up-sampled by the sampling unit 750.

When the current layer picture 797 is predicted according to an inter prediction mode, an encoding error of the reconstructed current layer picture 797 may be compensated for by an in-loop filter 774. The in-loop filter 774 may include at least one of a deblocking filter and a Sample Adaptive Offset (SAO) filter.

The reconstructed current layer picture 797 may be stored in the storage 788. Then, the reconstructed current layer picture 797 may be transmitted to the motion compensator 784 and may be used in prediction with respect to another reference layer picture.

According to the aforementioned scheme, a decoding operation with respect to current layer pictures may be repeated.

Through the decoding operations, the reference layer picture 795 may be output from the reference layer decoder 710, and the current layer picture 797 may be output from the current layer decoder 760.

With reference to FIGS. 6 and 7, scalable video encoding/decoding apparatuses including only two layers are described. However, the encoding/decoding principles provided with reference to FIGS. 6 and 7 may also be applied to scalable video encoding/decoding apparatuses including three or more layers. For example, when an input image is encoded into a first layer, a second layer, and a third layer, an expanded reference area for inter-layer prediction and inter-layer motion prediction information may be generated during encoding procedures by a first layer encoder and a second layer encoder. Equally, an expanded reference area for inter-layer prediction and inter-layer motion prediction information may be generated during encoding procedures by the second layer encoder and a third layer encoder.

Encoding/decoding methods according to a tree structure performed in a block unit, which are described with reference to FIGS. 6 and 7, are described in detail with reference to FIGS. 8 and 18.

Therefore, for convenience of description, since a video encoding process and a video decoding process based on a coding unit according to a tree structure, which will be described with reference to FIGS. 8A through 18, are performed on a single-layer video, only inter prediction and motion compensation will be described. However, as described with reference to FIGS. 6A through 7B, inter-layer prediction and compensation between reference layer pictures and current layer pictures are performed to encode/decode a video stream.

Therefore, in order for the encoder 110 of the scalable video encoding apparatus 100 according to an embodiment to encode a multilayer video, based on coding units of a tree structure, the scalable video encoding apparatus 100 may include video encoding apparatuses 800 of FIG. 8 corresponding to the number of layers of the multilayer video so as to perform video encoding on each of single layer videos, and may control the video encoding apparatuses 800 to encode the single layer videos, respectively. Also, the scalable video encoding apparatus 100 may perform inter-view prediction by using encoding results with respect to discrete single views obtained by the video encoding apparatuses 800. Accordingly, the encoder 110 of the scalable video encoding apparatus 100 may generate a base layer video stream and a current layer video stream that include an encoding result of each layer.

Figure 8A:
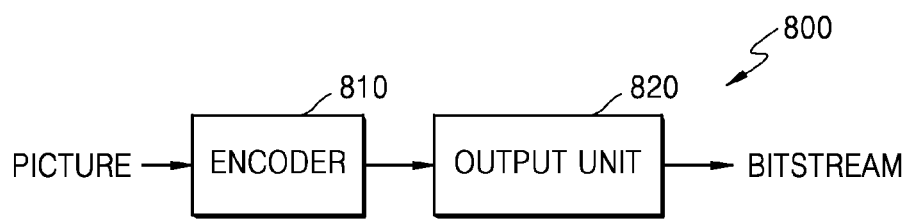
FIG. 8A illustrates a block diagram of a video encoding apparatus based on a coding unit having a tree structure, according to an embodiment.
Figure 8B:
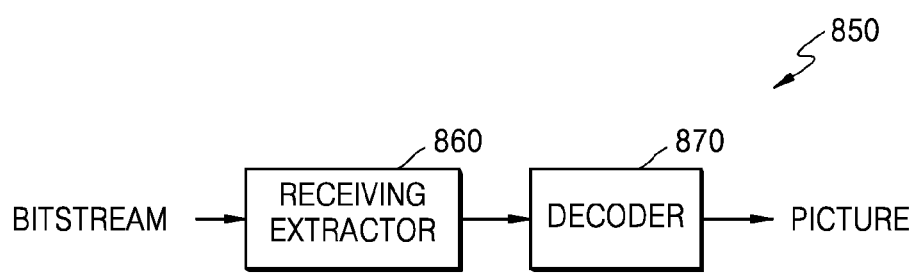
FIG. 8B illustrates a block diagram of a video decoding apparatus based on a coding unit having a tree structure, according to an embodiment.

Similarly, in order for a decoder of the scalable video decoding apparatus 200 to decode a multilayer video, based on coding units of a tree structure, the scalable video decoding apparatus 200 may include video decoding apparatuses 850 of FIG. 8B corresponding to the number of layers of a multilayer video so as to perform video decoding on each of layers of a received reference layer videostream and a received current layer videostream, and may control the video decoding apparatuses 850 to decode single layer videos, respectively. Then, the scalable video decoding apparatus 200 may perform inter-layer compensation by using decoding results with respect to discrete single layers obtained by the video decoding apparatuses 850. Accordingly, the scalable video decoding apparatus 200 may generate reference layer images and current layer images that are reconstructed for each of the layers.

FIG. 8A illustrates a block diagram of a video encoding apparatus based on coding units of a tree structure 800, according to various embodiments.

The video encoding apparatus involving video prediction based on coding units of the tree structure 800 includes an encoder 810 and an output unit 820. Hereinafter, for convenience of description, the video encoding apparatus involving video prediction based on coding units of the tree structure 800 is referred to as the 'video encoding apparatus 800'.

The encoder 810 may split a current picture based on a largest coding unit that is a coding unit having a maximum size for a current picture of an image. If the current picture is larger than the largest coding unit, image data of the current picture may be split into the at least one largest coding unit. The largest coding unit according to an embodiment may be a data unit having a size of 32×32, 64×64, 128×128, 256×256, etc., wherein a shape of the data unit is a square having a width and length in squares of 2.

A coding unit according to an embodiment may be characterized by a maximum size and a depth. The depth denotes the number of times the coding unit is spatially split from the largest coding unit, and as the depth deepens, deeper coding units according to depths may be split from the largest coding unit to a smallest coding unit. A depth of the largest coding unit may be defined as an uppermost depth and a depth of the smallest coding unit may be defined as a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to an embodiment is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The encoder 810 encodes at least one split region obtained by splitting a region of the largest coding unit according to depths, and determines a depth to output a final encoding result according to the at least one split region. That is, the encoder 810 determines a coded depth by encoding the image data in the deeper coding units according to depths, according to the largest coding unit of the current picture, and selecting a depth having the least encoding error. The determined coded depth and image data according to largest coding units are output to the output unit 820.

The image data in the largest coding unit is encoded based on the deeper coding units corresponding to at least one depth equal to or below the maximum depth, and results of encoding the image data based on each of the deeper coding units are compared. A depth having the least encoding error may be selected after comparing encoding errors of the deeper coding units. At least one coded depth may be selected for each largest coding unit.

The size of the largest coding unit is split as a coding unit is hierarchically split according to depths, and as the number of coding units increases. Also, even if coding units correspond to the same depth in one largest coding unit, it is determined whether to split each of the coding units corresponding to the same depth to a lower depth by measuring an encoding error of the image data of the each coding unit, separately. Accordingly, even when image data is included in one largest coding unit, the encoding errors may differ according to regions in the one largest coding unit, and thus the coded depths may differ according to regions in the image data. Thus, one or more coded depths may be determined in one largest coding unit, and the image data of the largest coding unit may be divided according to coding units of at least one coded depth.

Accordingly, the encoder 810 according to an embodiment may determine coding units having a tree structure included in a current largest coding unit. The 'coding units having a tree structure' according to an embodiment include coding units corresponding to a depth determined to be the coded depth, from among all deeper coding units included in the current largest coding unit. A coding unit of a coded depth may be hierarchically determined according to depths in the same region of the largest coding unit, and may be independently determined in different regions. Equally, a coded depth in a current region may be independently determined from a coded depth in another region.

A maximum depth according to an embodiment is an index related to the number of splitting times from a largest coding unit to a smallest coding unit. A maximum depth according to an embodiment may denote the total number of splitting times from the largest coding unit to the smallest coding unit. For example, when a depth of the largest coding unit is 0, a depth of a coding unit, in which the largest coding unit is split once, may be set to 1, and a depth of a coding unit, in which the largest coding unit is split twice, may be set to 2. Here, if the smallest coding unit is a coding unit in which the largest coding unit is split four times, depth levels of depths 0, 1, 2, 3, and 4 exist, and thus the maximum depth may be set to 4.

Prediction encoding and transformation may be performed according to the largest coding unit. The prediction encoding and the transformation are also performed based on the deeper coding units according to a depth equal to or depths less than the maximum depth, according to the largest coding unit.

Since the number of deeper coding units increases whenever the largest coding unit is split according to depths, encoding, including the prediction encoding and the transformation, is performed on all of the deeper coding units generated as the depth deepens. Hereinafter, for convenience of description, the prediction encoding and the transformation will be described based on a coding unit of a current depth in at least one largest coding unit.

The video encoding apparatus 800 according to an embodiment may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 800 may select not only a coding unit for encoding the image data, but may also select a data unit different from the coding unit so as to perform the prediction encoding on the image data in the coding unit.

In order to perform prediction encoding in the largest coding unit, the prediction encoding may be performed based on a coding unit of a coded depth, i.e., based on the coding unit that is no longer split. Hereinafter, the coding unit that is no longer split and becomes a basis unit for prediction encoding will now be referred to as a 'prediction unit'. A partition obtained by splitting the prediction unit may include a prediction unit and a data unit obtained by splitting at least one selected from a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type may selectively include symmetrical partitions obtained by symmetrically splitting a height or width of the prediction unit, partitions obtained by asymmetrically splitting the height or width of the prediction unit, such as 1:n or n:1, partitions obtained by geometrically splitting the prediction unit, or partitions having arbitrary shapes.

A prediction mode of the prediction unit may be at least one of an intra mode, an inter mode, and a skip mode. For example, the intra mode and the inter mode may be performed on the partition of 2N×2N, 2N×N, N×2N, or N×N.

Also, the skip mode may be performed only on the partition of 2N×2N. The encoding may be independently performed on one prediction unit in a coding unit, thereby selecting a prediction mode having a least encoding error.

The video encoding apparatus 800 according to an embodiment may also perform the transformation on the image data in a coding unit based not only on the coding unit for encoding the image data, but also based on a data unit that is different from the coding unit. In order to perform the transformation in the coding unit, the transformation may be performed based on a data unit having a size smaller than or equal to the coding unit. For example, the transformation unit may include a data unit for an intra mode and a transformation unit for an inter mode.

The transformation unit in the coding unit may be recursively split into smaller sized regions in the similar manner as the coding unit according to the tree structure, thus, residual data of the coding unit may be divided according to the transformation unit having the tree structure according to a transformation depth.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. That is, with respect to the transformation unit, the transformation unit having the tree structure may be set according to the transformation depths.

Encoding information according to coded depths requires not only information about a coded depth but also requires information related to prediction and transformation. Accordingly, the encoder 810 may determine not only a coded depth generating a least encoding error but may also determine a partition type in which a prediction unit is split to partitions, a prediction mode according to prediction units, and a size of a transformation unit for transformation.

Coding units according to a tree structure in a largest coding unit and methods of determining a prediction unit/partition, and a transformation unit, according to embodiments, will be described in detail later with reference to FIGS. 15 through 24.

The encoder 810 may measure an encoding error of deeper coding units according to depths by using Rate-Distortion Optimization based on Lagrangian multipliers.

The output unit 820 outputs, in bitstreams, the image data of the largest coding unit, which is encoded based on the at least one coded depth determined by the encoder 810, and encoding mode information according to depths.

The encoded image data may correspond to a result obtained by encoding residual data of an image.

The encoding mode information according to depths may include coded depth information, partition type information of the prediction unit, prediction mode information, and the size information of the transformation unit.

Coded depth information may be defined by using split information according to depths, which specifies whether encoding is performed on coding units of a lower depth instead of a current depth. If the current depth of the current coding unit is a coded depth, the current coding unit is encoded by using the coding unit of the current depth, and thus split information of the current depth may be defined not to split the current coding unit to a lower depth. On the contrary, if the current depth of the current coding unit is not the coded depth, the encoding has to be performed on the coding unit of the lower depth, and thus the split information of the current depth may be defined to split the current coding unit to the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one largest coding unit, and at least one piece of encoding mode information has to be determined for a coding unit of a coded depth, at least one piece of encoding mode information may be determined for one largest coding unit. Also, a coded depth of data of the largest coding unit may vary according to locations since the data is hierarchically split according to depths, and thus a coded depth and encoding mode information may be set for the data.

Accordingly, the output unit 820 according to an embodiment may assign encoding information about a corresponding coded depth and an encoding mode to at least one of the coding unit, the prediction unit, and a minimum unit included in the largest coding unit.

The minimum unit according to an embodiment is a square data unit obtained by splitting the smallest coding unit constituting the lowermost coded depth by 4. Alternatively, the minimum unit according to an embodiment may be a maximum square data unit that may be included in all of the coding units, prediction units, partition units, and transformation units included in the largest coding unit.

For example, the encoding information output by the output unit 820 may be classified into encoding information according to deeper coding units, and encoding information according to prediction units. The encoding information according to the deeper coding units may include the information about the prediction mode and about the size of the partitions. The encoding information according to the prediction units may include information about an estimated direction during an inter mode, about a reference image index of the inter mode, about a motion vector, about a chroma component of an intra mode, and about an interpolation method during the intra mode.

Information about a maximum size of the coding unit defined according to pictures, slice segments, or GOPs, and information about a maximum depth may be inserted into a header of a bitstream, a sequence parameter set, or a picture parameter set.

Information about a maximum size of the transformation unit allowed with respect to a current video, and information about a minimum size of the transformation unit may also be output through a header of a bitstream, a sequence parameter set, or a picture parameter set. The output unit 820 may encode and output reference information, prediction information, and slice segment type information, which are related to prediction.

According to the simplest embodiment for the video encoding apparatus 800, the deeper coding unit may be a coding unit obtained by dividing a height or width of a coding unit of an upper depth, which is one layer above, by two. That is, when the size of the coding unit of the current depth is 2N×2N, the size of the coding unit of the lower depth is N×N. Also, a current coding unit having a size of 2N×2N may maximally include four lower-depth coding units having a size of N×N.

Accordingly, the video encoding apparatus 800 may form the coding units having the tree structure by determining coding units having an optimum shape and an optimum size for each largest coding unit, based on the size of the largest coding unit and the maximum depth determined considering characteristics of the current picture. Also, since encoding may be performed on each largest coding unit by using any one of various prediction modes and transformations, an optimal encoding mode may be determined by taking into account characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus according to the embodiment, image compression efficiency may be increased since a coding unit is adjusted while considering characteristics of an image while increasing a maximum size of a coding unit while considering a size of the image.

The scalable video encoding apparatus 600 described above with reference to FIG. 6A may include the video encoding apparatuses 800 corresponding to the number of layers so as to encode single layer images in each of the layers of a multilayer video. For example, the reference layer encoder 610 may include one video encoding apparatus 800, and the current layer encoder 660 may include the video encoding apparatuses 800 corresponding to the number of current layers.

When the video encoding apparatus 800 encodes reference layer images, the encoder 810 may determine a prediction unit for inter-image prediction according to each of coding units of a tree structure in each largest coding unit, and may perform the inter-image prediction on each prediction unit.

When the video encoding apparatus 800 encodes the current layer images, the encoder 810 may determine prediction units and coding units of a tree structure in each largest coding unit, and may perform inter-prediction on each of the prediction units.

The video encoding apparatus 800 may encode an inter layer prediction error for predicting a current layer image by using an SAO. Thus, a prediction error of the current layer image may be encoded by using information regarding an SAO type and an offset based on a sample value distribution of the prediction error without having to encoding the prediction error for each pixel position.

The encoder 810 may perform functions of the encoder 110 and the encoding information determiner 120 of FIG. 1. The output unit 820 may perform a function of the bitstream transmitter 130.

FIG. 8B illustrates a block diagram of a video decoding apparatus based on a coding unit having a tree structure 850, according to various embodiments.

The video decoding apparatus based on the coding unit according to the tree structure 850 includes a receiver 210, an image data and encoding information receiving and extracting unit 860, and a decoder 870. Hereinafter, for convenience of description, the video decoding apparatus using video prediction based on a coding unit according to a tree structure 850 will be referred to as the 'video decoding apparatus 850'.

Definitions of various terms, such as a coding unit, a depth, a prediction unit, a transformation unit, and information about various encoding modes, for decoding operations of the video decoding apparatus 850 are identical to those described with reference to FIG. 8 and the video encoding apparatus 800.

The receiving and extracting unit 860 receives and parses a bitstream of an encoded video. The image data and encoding information receiving and extracting unit 860 extracts encoded image data for each coding unit from the parsed bitstream, wherein the coding units have a tree structure according to each largest coding unit, and outputs the extracted image data to the decoder 870. The image data and encoding information receiving and extracting unit 860 may extract information about a maximum size of a coding unit of a current picture, from a header about the current picture, a sequence parameter set, or a picture parameter set.

Also, the image data and encoding information receiving and extracting unit 860 extracts, from the parsed bitstream, information about a coded depth and an encoding mode for the coding units having a tree structure according to each largest coding unit. The extracted information about the coded depth and the encoding mode is output to the decoder 870. That is, the image data in a bitstream is split into the largest coding unit so that the decoder 870 decodes the image data for each largest coding unit.

The information about the coded depth and the encoding mode according to the largest coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each largest coding unit extracted by the image data and encoding information receiving and extracting unit 860 is information about a coded depth and an encoding mode determined to generate a minimum encoding error when an encoder, such as the video encoding apparatus 800 according to an embodiment, repeatedly performs encoding for each deeper coding unit according to depths according to each largest coding unit. Accordingly, the video decoding apparatus 850 may reconstruct an image by decoding data according to an encoding method that generates the minimum encoding error.

Since encoding information about the coded depth and the encoding mode according to an embodiment may be assigned to a predetermined data unit from among a corresponding coding unit, a prediction unit, and a minimum unit, the image data and encoding information receiving and extracting unit 860 may extract the information about the coded depth and the encoding mode according to the predetermined data units. The predetermined data units to which the same information about the coded depth and the encoding mode is assigned may be inferred to be the data units included in the same largest coding unit.

The decoder 870 reconstructs the current picture by decoding the image data in each largest coding unit based on the coded depth and the encoding mode information according to each of the largest coding units. That is, the decoder 870 may decode the encoded image data, based on a read partition type, a prediction mode, and a transformation unit for each coding unit from among the coding units having the tree structure included in each largest coding unit. A decoding process may include a prediction process including intra prediction and motion compensation, and an inverse transformation process.

The decoder 870 may perform intra prediction or motion compensation according to a partition and a prediction mode of each coding unit, based on the information about the partition type and the prediction mode of the prediction unit of the coding unit according to coded depths.

In addition, for inverse transformation for each largest coding unit, the decoder 870 may read information about a transformation unit according to a tree structure for each coding unit so as to perform inverse transformation based on transformation units for each coding unit. Due to the inverse transformation, a pixel value of a spatial domain of the coding unit may be reconstructed.

The decoder 870 may determine a coded depth of a current largest coding unit by using split information according to depths. If the split information specifies that image data is no longer split in the current depth, the current depth is the coded depth. Accordingly, the decoder 870 may decode the image data of the current largest coding unit by using the information about the partition type of the prediction unit, the prediction mode, and the size of the transformation unit for each coding unit corresponding to the current depth.

That is, data units containing the encoding information including the same split information may be gathered by observing the encoding information set assigned for the predetermined data unit from among the coding unit, the prediction unit, and the minimum unit, and the gathered data units may be considered to be one data unit to be decoded by the decoder 870 in the same encoding mode. As such, the current coding unit may be decoded by obtaining the information about the encoding mode for each coding unit.

The scalable video decoding apparatus 700 described with reference to FIG. 7B may include the video decoding apparatuses 850 corresponding to the number of views, so as to reconstruct reference layer images and current layer images by decoding a received reference layer imagestream and a received current layer imagestream.

When the reference layer imagestream is received, the decoder 870 of the video decoding apparatus 850 may split samples of the reference layer images, which are extracted from the reference layer imagestream by the receiving and extracting unit 860, into coding units according to a tree structure of a largest coding unit. The decoder 870 may perform motion compensation, based on prediction units for the inter-image prediction, on each of the coding units according to the tree structure of the samples of the reference layer images, and may reconstruct the reference layer images.

When the current layer imagestream is received, the decoder 870 of the video decoding apparatus 850 may split samples of the current layer images, which are extracted from the current layer imagestream by the receiving and extracting unit 860, into coding units according to a tree structure of a largest coding unit. The decoder 870 may perform motion compensation, based on prediction units for the inter-image prediction, on each of the coding units according to the tree structure of the samples of the current layer images, and may reconstruct the current layer images.

The receiving and extracting unit 860 may obtain an SAO type and an offset from the received current layer bitstream and may determine an SAO category according to a distribution of sample values for each pixel of a current layer prediction image, thereby obtaining an offset for each SAO category by using the SAO type and the offset. Thus, the decoder 870 may compensate for an offset of a corresponding category for each pixel of the current layer prediction image without receiving a prediction error for each pixel, and may determine a reconstructed current layer image by referring to the compensated current layer prediction image.

Thus, the video decoding apparatus 850 may obtain information about at least one coding unit that generates the minimum encoding error when encoding is recursively performed for each largest coding unit, and may use the information to decode the current picture. That is, the coding units having the tree structure determined to be the optimum coding units in each largest coding unit may be decoded.

Accordingly, even if an image has high resolution or has an excessively large data amount, the image may be efficiently decoded and reconstructed by using a size of a coding unit and an encoding mode, which are adaptively determined according to characteristics of the image, by using optimal encoding mode information received from an encoding terminal.

The receiving and extracting unit 860 may perform a function of the encoding information obtainer 210 of FIG. 2. The decoder 870 may perform functions of the scale ratio determiner 220 and the up-sampling unit 230.

Figure 9:
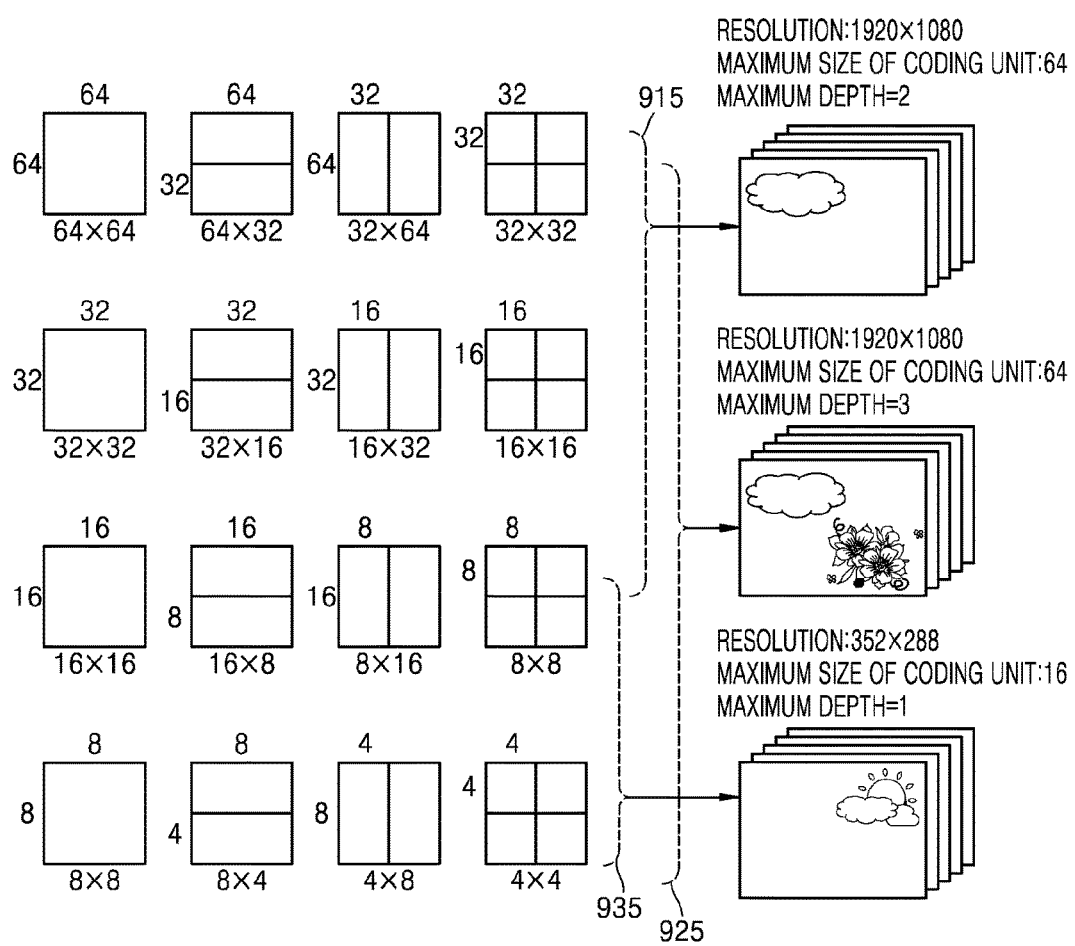
FIG. 9 illustrates a diagram for describing a concept of coding units, according to an embodiment.

FIG. 9 illustrates a concept of coding units, according to various embodiments.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 910, a resolution is 1920×1080, a maximum size of a coding unit is 64, and a maximum depth is 2. In video data 920, a resolution is 1920×1080, a maximum size of a coding unit is 64, and a maximum depth is 3. In video data 930, a resolution is 352×288, a maximum size of a coding unit is 16, and a maximum depth is 1. The maximum depth shown in FIG. 15 denotes the total number of splits from a largest coding unit to a smallest coding unit.

If a resolution is high or a data amount is large, it is preferable that a maximum size of a coding unit is large so as to not only increase encoding efficiency but also to accurately reflect characteristics of an image. Accordingly, the maximum size of the coding unit of the video data 910 and 920 having a higher resolution than the video data 930 may be selected to 64.

Since the maximum depth of the video data 910 is 2, coding units 915 of the vide data 910 may include a largest coding unit having a long axis size of 64, and coding units having long axis sizes of 32 and 16 since depths are deepened to two layers by splitting the largest coding unit twice. On the other hand, since the maximum depth of the video data 930 is 1, coding units 935 of the video data 930 may include a largest coding unit having a long axis size of 16, and coding units having a long axis size of 8 since depths are deepened to one layer by splitting the largest coding unit once.

Since the maximum depth of the video data 920 is 3, coding units 925 of the video data 920 may include a largest coding unit having a long axis size of 64, and coding units having long axis sizes of 32, 16, and 8 since the depths are deepened to 3 layers by splitting the largest coding unit three times. As a depth deepens, an expression capability with respect to detailed information may be improved.

Figure 10A:
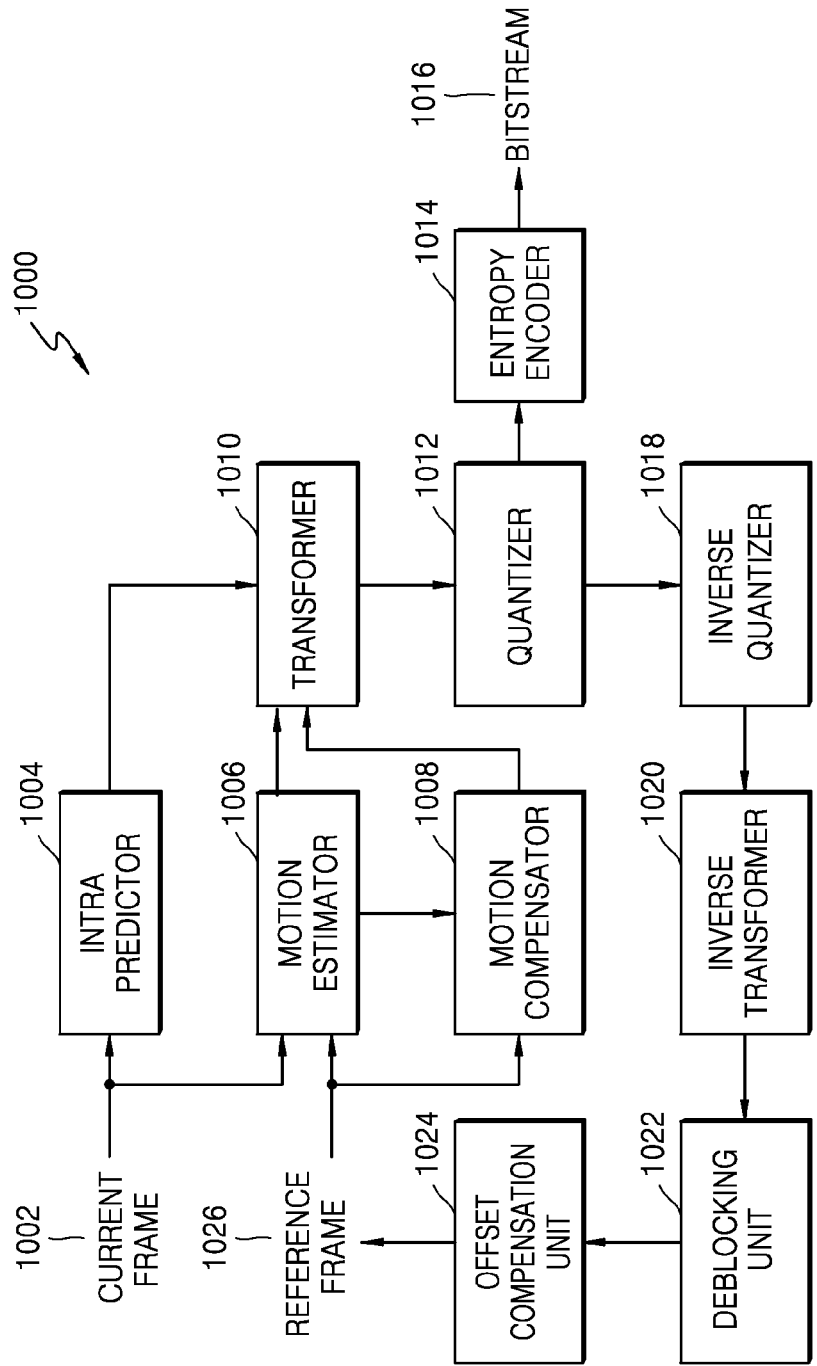
FIG. 10A illustrates a block diagram of an image encoder based on coding units, according to an embodiment.

FIG. 10A illustrates a block diagram of an image encoder 1000 based on coding units, according to various embodiments.

The image encoder 1000 according to an embodiment includes operations that are performed by the encoder 910 of the video encoding apparatus 900 to encode image data. That is, an intra predictor 1004 performs intra prediction on coding units in an intra mode, from among a current frame 1002, and a motion estimator 1006 and a motion compensator 1008 perform inter estimation and motion compensation on coding units in an inter mode from among the current frame 1002 by using the current frame 1002 and a reference frame 1026.

Data output from the intra predictor 1004, the motion estimator 1006, and the motion compensator 1008 is output as quantized transformation coefficients through a transformer 1010 and a quantizer 1012. The quantized transformation coefficients are restored as data in a spatial domain through an inverse quantizer 1018 and an inverse transformer 1020, and the restored data in the spatial domain is output as the reference frame 1026 after being post-processed through a deblocking unit 1022 and an offset compensation unit 1024. The quantized transformation coefficients may be output as a bitstream 1016 through an entropy encoder 1014.

In order for the image encoder 1000 to be applied in the video encoding apparatus 900, all elements of the image encoder 1000, i.e., the intra predictor 1004, the motion estimator 1006, the motion compensator 1008, the transformer 1010, the quantizer 1012, the entropy encoder 1014, the inverse quantizer 1018, the inverse transformer 1020, the deblocking unit 1022, and the offset compensation unit 1024 perform operations based on each coding unit from among coding units having a tree structure while considering the maximum depth of each largest coding unit.

In particular, the intra predictor 1004, the motion estimator 1006, and the motion compensator 1008 determine partitions and a prediction mode of each coding unit from among the coding units having a tree structure while considering the maximum size and the maximum depth of a current largest coding unit, and the transformer 1010 determines the size of the transformation unit in each coding unit from among the coding units having a tree structure.

Figure 10B:
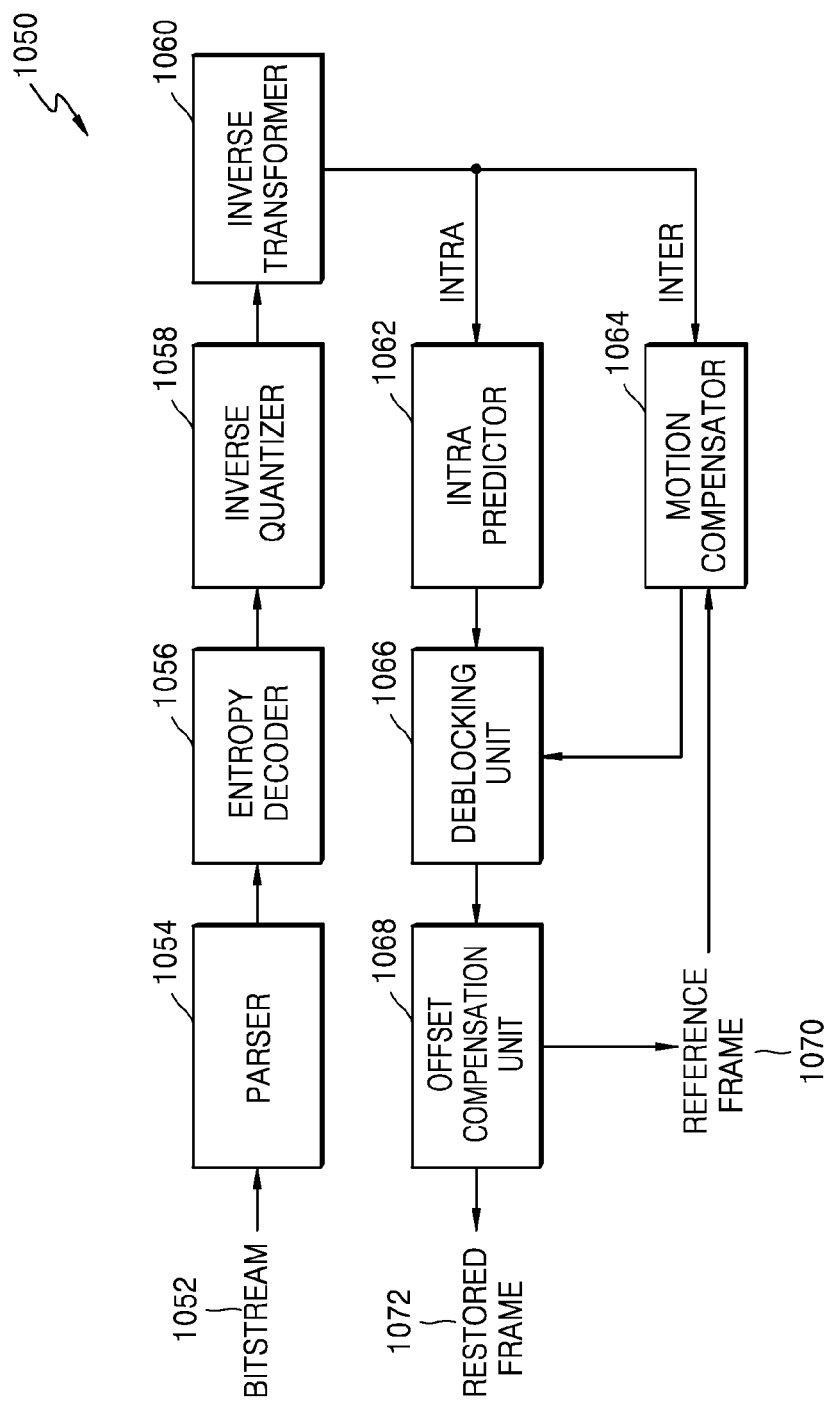
FIG. 10B illustrates a block diagram of an image decoder based on coding units, according to an embodiment.

FIG. 10B illustrates a block diagram of an image decoder 1050 based on coding units, according to various embodiments.

A parser 1054 parses encoded image data to be decoded and information about encoding required for decoding from a bitstream 1052. The encoded image data is output as inverse quantized data through an entropy decoder 1056 and an inverse quantizer 1058, and the inverse quantized data is restored to image data in a spatial domain through an inverse transformer 1060.

An intra predictor 1062 performs intra prediction on coding units in an intra mode with respect to the image data in the spatial domain, and a motion compensator 1064 performs motion compensation on coding units in an inter mode by using a reference frame 1070.

The image data in the spatial domain, which passed through the intra predictor 1062 and the motion compensator 1064, may be output as a restored frame 1072 after being post-processed through a deblocking unit 1066 and an offset compensation unit 1068. Also, the image data that is post-processed through the deblocking unit 1066 and the offset compensation unit 1068 may be output as the reference frame 1070.

In order to decode the image data in the decoder 970 of the video decoding apparatus 1050, the image decoder 1050 according to an embodiment may perform operations that are performed after the parser 1054 performs an operation.

In order for the image decoder 1050 to be applied in the video decoding apparatus 950, all elements of the image decoder 1050, i.e., the parser 1054, the entropy decoder 1056, the inverse quantizer 1058, the inverse transformer 1060, the intra predictor 1062, the motion compensator 1064, the deblocking unit 1066, and the offset compensation unit 1068 perform operations based on coding units having a tree structure for each largest coding unit.

Specifically, the intra predictor 1062 and the motion compensator 1064 perform operations based on partitions and a prediction mode for each of the coding units having a tree structure, and the inverse transformer 1060 perform operations based on a size of a transformation unit for each coding unit.

The encoding operation of FIG. 10A and the decoding operation of FIG. 10B describe in detail a video stream encoding operation and a video stream decoding operation in a single layer, respectively. Thus, if the scalable video encoding apparatus 600 of FIG. 6A encodes a video stream of two or more layers, the image encoder 1000 may be provided for each layer. Similarly, if the scalable video decoding apparatus 700 of FIG. 7A decodes a video stream of two or more layers, the image decoder 1050 may be provided for each layer.

Figure 11:
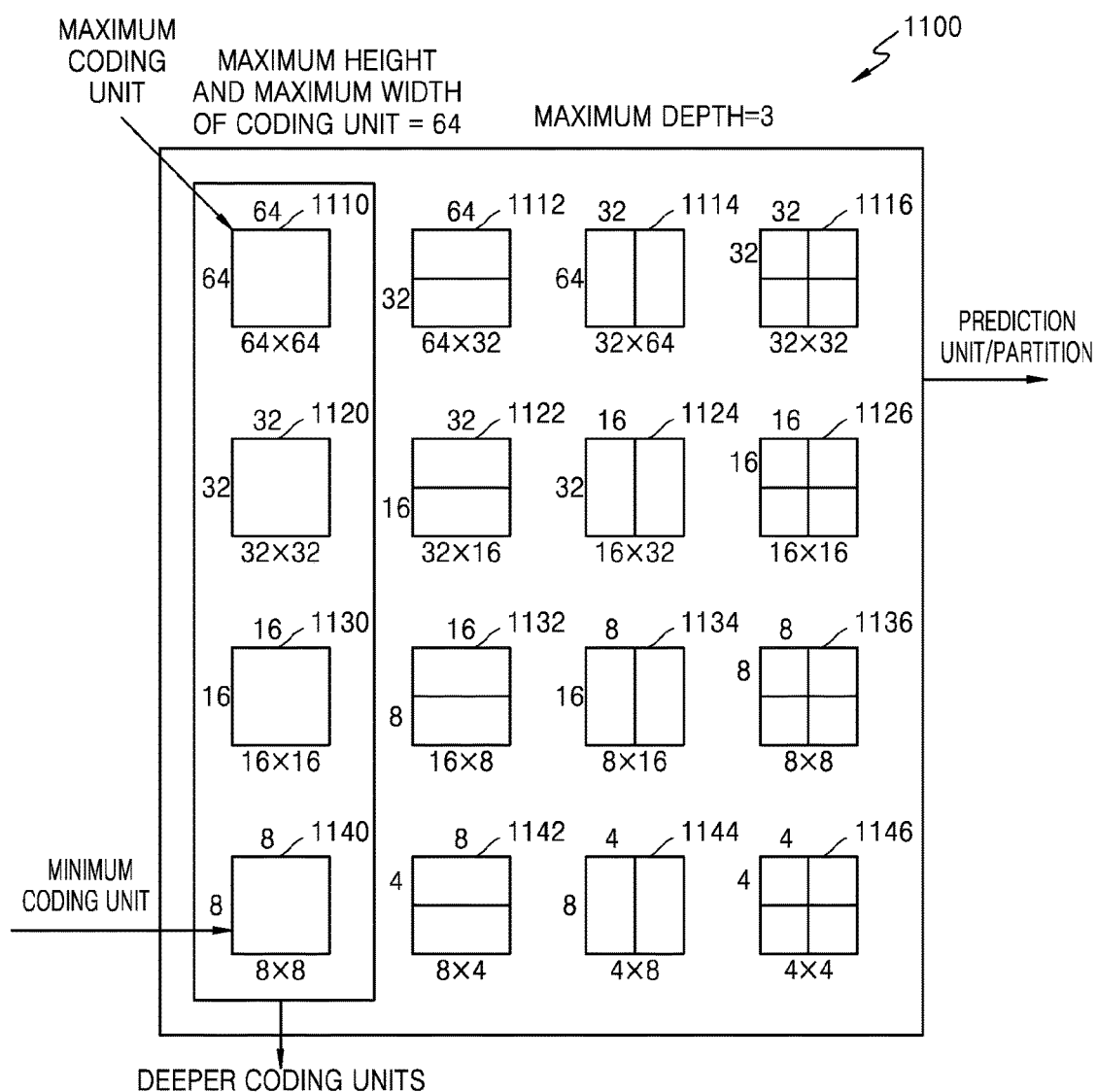
FIG. 11 illustrates a diagram illustrating deeper coding units according to depths, and partitions, according to an embodiment.

FIG. 11 illustrates a diagram illustrating deeper coding units according to depths, and partitions, according to various embodiments.

The video encoding apparatus 800 according to an embodiment and the video decoding apparatus 850 according to an embodiment use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 1100 of coding units, according to an embodiment, the maximum height and the maximum width of the coding units are each 64, and the maximum depth is 4. In this case, the maximum depth denotes the total number of times the coding unit is split from the largest coding unit to the smallest coding unit. Since a depth deepens along a vertical axis of the hierarchical structure 1100, a height and a width of the deeper coding unit are each split. Also, a prediction unit and partitions, which are bases for prediction encoding of each deeper coding unit, are shown along a horizontal axis of the hierarchical structure 1100.

That is, a coding unit 1110 is a largest coding unit in the hierarchical structure 1100, wherein a depth is 0 and a size, i.e., a height by width, is 64×64. The depth deepens along the vertical axis, and a coding unit 1120 having a size of 32×32 and a depth of 1, a coding unit 1130 having a size of 16×16 and a depth of 2, and a coding unit 1140 having a size of 8×8 and a depth of 3. The coding unit 1140 having the size of 8×8 and the depth of 3 is a smallest coding unit.

The prediction unit and the partitions of a coding unit are arranged along the horizontal axis according to each depth. That is, if the coding unit 1110 having the size of 64×64 and the depth of 0 is a prediction unit, the prediction unit may be split into partitions included in the coding unit 1110 having the size of 64×64, i.e. a partition 1110 having a size of 64×64, partitions 1112 having the size of 64×32, partitions 1114 having the size of 32×64, or partitions 1116 having the size of 32×32.

Equally, a prediction unit of the coding unit 1120 having the size of 32×32 and the depth of 1 may be split into partitions included in the coding unit 1120 having the size of 32×32, i.e. a partition 1120 having a size of 32×32, partitions 1122 having a size of 32×16, partitions 1124 having a size of 16×32, and partitions 1126 having a size of 16×16.

Equally, a prediction unit of the coding unit 1130 having the size of 16×16 and the depth of 2 may be split into partitions included in the coding unit 1130 having the size of 16×16, i.e. a partition 1130 having a size of 16×16, partitions 1132 having a size of 16×8, partitions 1134 having a size of 8×16, and partitions 1136 having a size of 8×8.

Equally, a prediction unit of the coding unit 1140 having the size of 8×8 and the depth of 3 may be split into partitions included in the coding unit 1140 having the size of 8×8, i.e. a partition 1140 having a size of 8×8, partitions 1142 having a size of 8×4, partitions 1144 having a size of 4×8, and partitions 1146 having a size of 4×4.

In order to determine a coded depth of the largest coding unit 1110, the encoder 810 of the video encoding apparatus 100 has to perform encoding on coding units respectively corresponding to depths included in the largest coding unit 1110.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare results of encoding the same data according to depths, the data has to be encoded by using each of the coding unit corresponding to the depth of 1 and four coding units corresponding to the depth of 2.

In order to perform encoding according to each of the depths, a least encoding error that is a representative encoding error of a corresponding depth may be selected by performing encoding on each of prediction units of the coding units according to depths, along the horizontal axis of the hierarchical structure of coding units 1100. Also, the minimum encoding error may be searched for by comparing representative encoding errors according to depths, by performing encoding for each depth as the depth deepens along the vertical axis of the hierarchical structure of coding units 1100. A depth and a partition generating the minimum encoding error in the largest coding unit 1110 may be selected as a coded depth and a partition type of the largest coding unit 1110.

Figure 12:
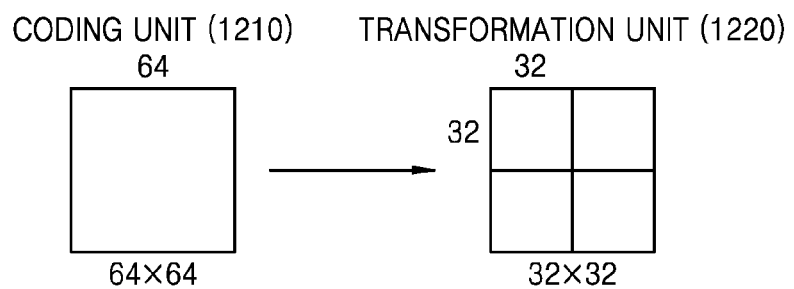
FIG. 12 illustrates a diagram for describing a relationship between a coding unit and transformation units, according to an embodiment.

FIG. 12 illustrates a diagram for describing a relationship between a coding unit and transformation units, according to various embodiments.

The video encoding apparatus 800 according to an embodiment or the video decoding apparatus 850 according to an embodiment encodes or decodes an image according to coding units having sizes smaller than or equal to a largest coding unit for each largest coding unit. Sizes of transformation units for transformation during an encoding process may be selected based on data units that are not larger than a corresponding coding unit.

For example, in the video encoding apparatus 800 or the video decoding apparatus 850, when a size of the coding unit 1210 is 64×64, transformation may be performed by using the transformation units 1220 having a size of 32×32.

Also, data of the coding unit 1210 having the size of 64×64 may be encoded by performing the transformation on each of the transformation units having the size of 32×32, 16×16, 8×8, and 4×4, which are smaller than 64×64, and then a transformation unit having the least coding error with respect to an original image may be selected.

FIG. 13 illustrates a plurality of pieces of encoding information according to depths, according to various embodiments.

The output unit 820 of the video encoding apparatus 100 according to an embodiment may encode and transmit, as encoding mode information, partition type information 1300, prediction mode information 1310, and transformation unit size information 1320 for each coding unit corresponding to a coded depth.

The partition type information 1300 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 1302 having a size of 2N×2N, a partition 1304 having a size of 2N×N, a partition 1306 having a size of N×2N, and a partition 1308 having a size of N×N. In this case, the partition type information 1300 about a current coding unit is set to indicate one of the partition 1302 having a size of 2N×2N, the partition 1304 having a size of 2N×N, the partition 1306 having a size of N×2N, and the partition 1308 having a size of N×N.

The prediction mode information 1310 indicates a prediction mode of each partition. For example, the prediction mode information 1310 may indicate a mode of prediction encoding performed on a partition indicated by the partition type information 1300, i.e., an intra mode 1312, an inter mode 1314, or a skip mode 1316.

The transformation unit size information 1320 represents a transformation unit to be based on when transformation is performed on a current coding unit. For example, the transformation unit may be one of a first intra transformation unit 1322, a second intra transformation unit 1324, a first inter transformation unit 1326, and a second inter transformation unit 1328.

The receiving and extracting unit 810 of the video decoding apparatus 850 may extract and use the partition type information 1300, the prediction mode information 1310, and the transformation unit size information 1320 for decoding, according to each deeper coding unit.

Figure 14:
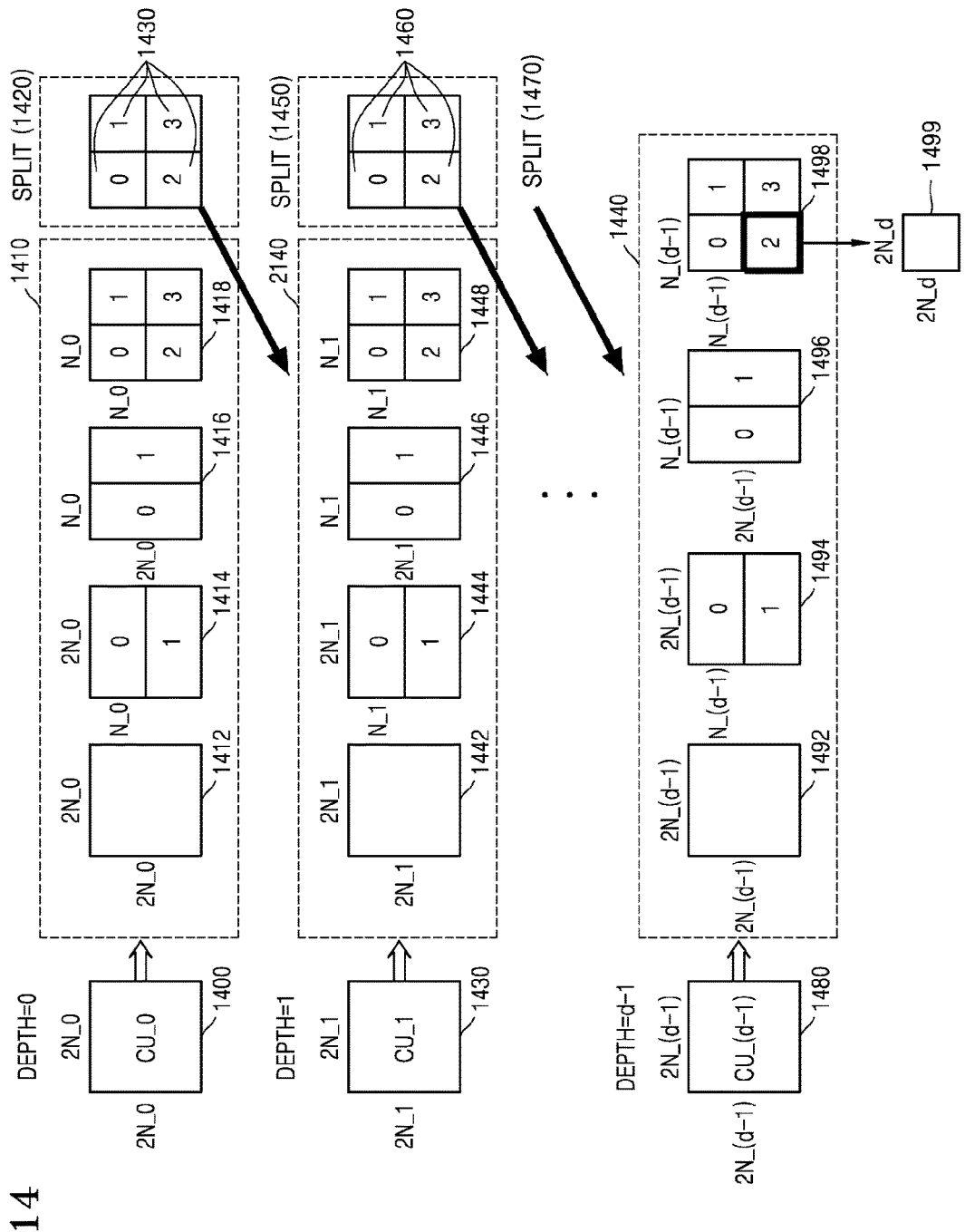
FIG. 14 illustrates deeper coding units according to depths, according to an embodiment.

FIG. 14 illustrates deeper coding units according to depths, according to various embodiments.

Split information may be used to represent a change in a depth. The spilt information specifies whether a coding unit of a current depth is split into coding units of a lower depth. A prediction unit 1410 for prediction encoding a coding unit 1400 having a depth of 0 and a size of 2N_0x2N_0 may include partitions of a partition type 1412 having a size of 2N_0x2N_0, a partition type 1414 having a size of 2N_0xN_0, a partition type 1416 having a size of N_0x2N_0, and a partition type 1418 having a size of N_0xN_0. Only the partition types 1412, 1414, 1416, and 1418 which are obtained by symmetrically splitting the prediction unit are illustrated, but as described above, a partition type is not limited thereto and may include asymmetrical partitions, partitions having a predetermined shape, and partitions having a geometrical shape.

According to each partition type, prediction encoding has to be repeatedly performed on one partition having a size of 2N_0x2N_0, two partitions having a size of 2N_0xN_0, two partitions having a size of N_0x2N_0, and four partitions having a size of N_0xN_0. The prediction encoding in an intra mode and an inter mode may be performed on the partitions having the sizes of 2N_0x2N_0, N_0x2N_0, 2N_0xN_0, and N_0xN_0. The prediction encoding in a skip mode may be performed only on the partition having the size of 2N_0x2N_0.

If an encoding error is smallest in one of the partition types 1412, 1414, and 1416 having the sizes of 2N_0x2N_0, 2N_0xN_0 and N_0x2N_0, the prediction unit 1410 may not be split into a lower depth.

If the encoding error is the smallest in the partition type 1418 having the size of N_0xN_0, a depth is changed from 0 to 1 and split is performed (operation 1420), and encoding may be repeatedly performed on coding units 1430 of a partition type having a depth of 2 and a size of N_0xN_0 so as to search for a minimum encoding error.

A prediction unit 1430 for prediction encoding the coding unit 1430 having a depth of 1 and a size of 2N_1x2N_1 (=N_0xN_0) may include a partition type 1442 having a size of 2N_1x2N_1, a partition type 1444 having a size of 2N_1xN_1, a partition type 1446 having a size of N_1x2N_1, and a partition type 1448 having a size of N_1xN_1.

If an encoding error is the smallest in the partition type 1448 having the size of N_1xN_1, a depth is changed from 1 to 2 and split is performed (in operation 1450), and encoding is repeatedly performed on coding units 1460 having a depth of 2 and a size of N_2xN_2 so as to search for a minimum encoding error.

When a maximum depth is d, deeper coding units according to depths may be set until when a depth corresponds to d−1, and split information may be set until when a depth corresponds to d−2. That is, when encoding is performed up to when the depth is d−1 after a coding unit corresponding to a depth of d−2 is split (in operation 1470), a prediction unit 1490 for prediction encoding a coding unit 1480 having a depth of d−1 and a size of 2N_(d−1)×2N_(d−1) may include partitions of a partition type 1492 having a size of 2N_(d−1)×2N_(d−1), a partition type 1494 having a size of 2N_(d−1)×N_(d−1), a partition type 1496 having a size of N_(d−1)×2N_(d−1), and a partition type 1498 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types so as to search for a partition type generating a minimum encoding error.

Even when the partition type 1498 having the size of N_(d−1)×N_(d−1) has the minimum encoding error, since a maximum depth is d, a coding unit CU_(d−1) having a depth of d−1 is no longer split into a lower depth, and a coded depth for the coding units constituting a current largest coding unit 1400 is determined to be d−1 and a partition type of the current largest coding unit 1400 may be determined to be N_(d−1)×N_(d−1). Also, since the maximum depth is d, split information for a coding unit 1452 having a depth of d−1 is not set.

A data unit 1499 may be a 'minimum unit' for the current largest coding unit. A minimum unit according to the embodiment may be a square data unit obtained by splitting a smallest coding unit having a lowermost coded depth by 4. By performing the encoding repeatedly, the video encoding apparatus 100 according to the embodiment may select a depth having the least encoding error by comparing encoding errors according to depths of the coding unit 1400 to determine a coded depth, and set a corresponding partition type and a prediction mode as an encoding mode of the coded depth.

As such, the minimum encoding errors according to depths are compared in all of the depths of 0, 1, . . . , d−1, d, and a coded depth having the least encoding error may be determined as a depth. The coded depth, the partition type of the prediction unit, and the prediction mode may be encoded and transmitted as encoding mode information. Also, since a coding unit has to be split from a depth of 0 to the coded depth, only split information of the coded depth is set to '0', and split information of depths excluding the coded depth is set to '1'.

The image data and encoding information receiving and extracting unit 860 of the video decoding apparatus 850 according to the embodiment may extract and use coded depth and prediction unit information about the coding unit 1400 so as to decode the coding unit 1412. The video decoding apparatus 850 according to the embodiment may determine a coded depth, in which split information is '0', as a depth by using split information according to depths, and may use, for decoding, encoding mode information about the corresponding depth.

Figure 15:
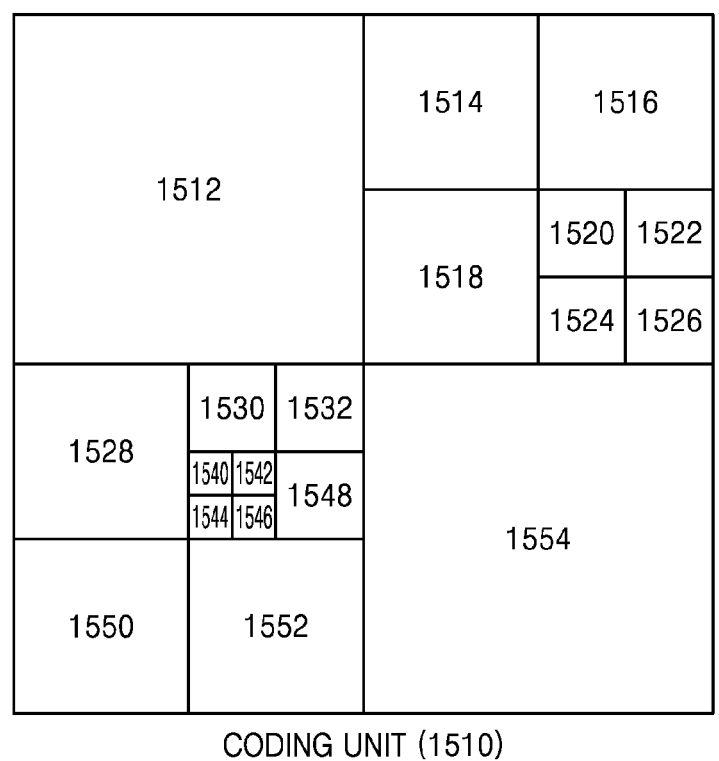
FIGS. 15, 16, and 17 illustrate relationships between coding units, prediction units, and transformation units, according to an embodiment.
Figure 16:
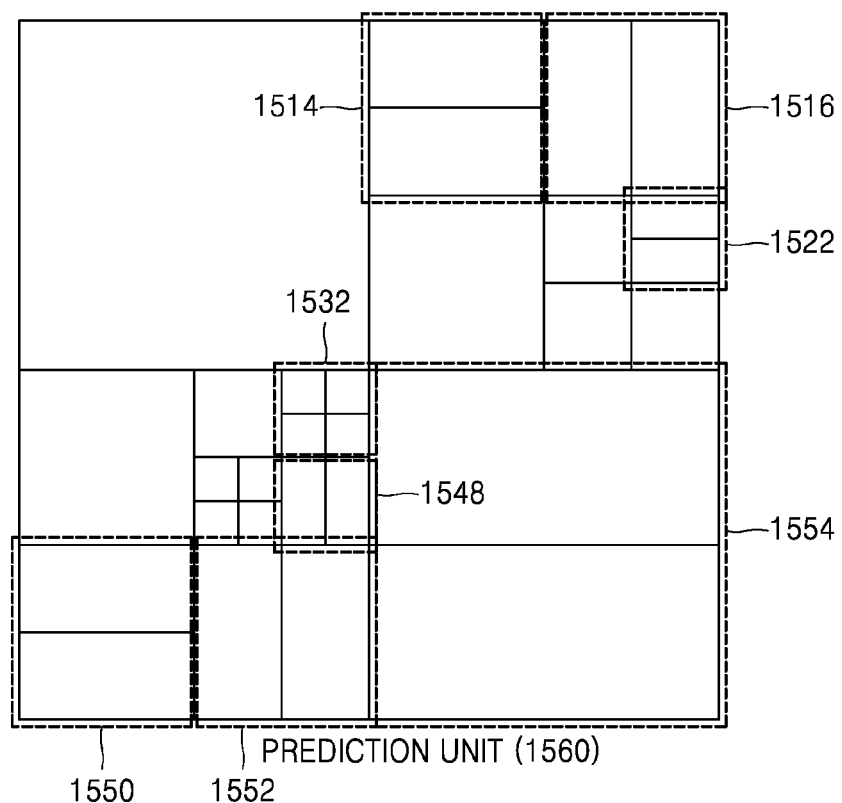
Figure 17:
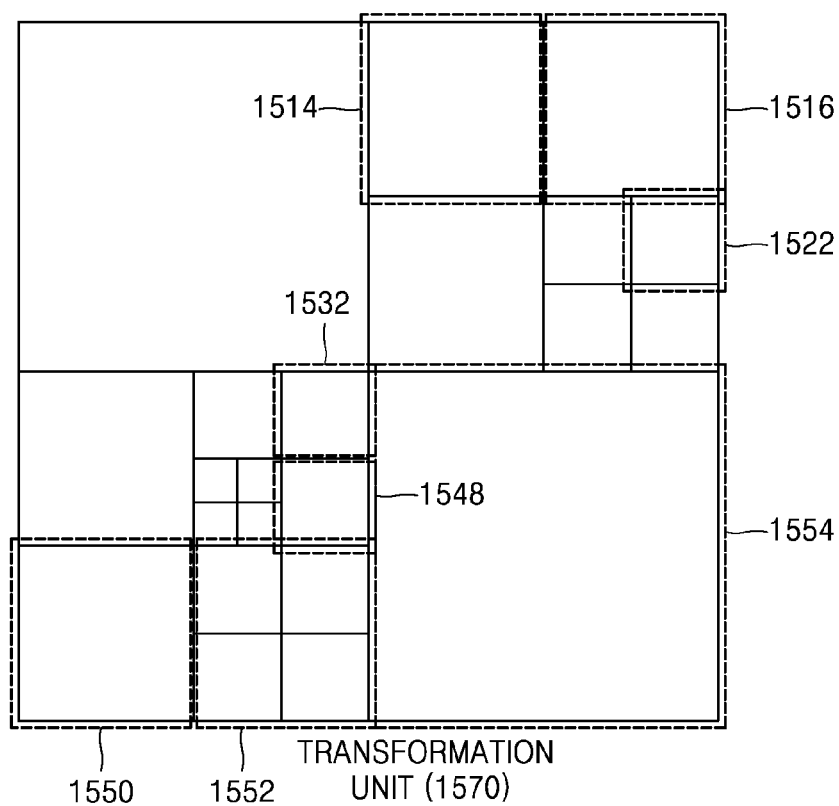

FIGS. 15, 16, and 17 illustrate a relationship between coding units, prediction units, and transformation units, according to various embodiments.

Coding units 1510 are deeper coding units according to coded depths determined by the video encoding apparatus 100, in a largest coding unit. Prediction units 1560 are partitions of prediction units of each of the coding units 1510 according to coded depths, and transformation units 1570 are transformation units of each of the coding units according to coded depths.

When a depth of a largest coding unit is 0 in the deeper coding units 1510, depths of coding units 1512 are 1, depths of coding units 1514, 1516, 1518, 1528, 1550, and 1552 are 2, depths of coding units 1520, 1522, 1524, 1526, 1530, 1532, and 1548 are 3, and depths of coding units 1540, 1542, 1544, and 1546 are 4.

Some partitions 1514, 1516, 1522, 1532, 1548, 1550, 1552, and 1554 from among the prediction units 1560 are obtained by splitting the coding unit. That is, partitions 1514, 1522, 1550, and 1554 are a partition type having a size of 2N×N, partitions 1516, 1548, and 1552 are a partition type having a size of N×2N, and a partition 1532 is a partition type having a size of N×N. Prediction units and partitions of the deeper coding units 1510 are smaller than or equal to each coding unit.

Transformation or inverse transformation is performed on image data of the coding unit 1552 in the transformation units 1570 in a data unit that is smaller than the coding unit 1552. Also, the coding units 1514, 1516, 1522, 1532, 1548, 1550, 1552, and 1554 in the transformation units 1560 are data units different from those in the prediction units 1560 in terms of sizes and shapes. That is, the video encoding apparatus 800 and the video decoding apparatus 850 according to the embodiments may perform intra prediction/motion estimation/motion compensation/and transformation/inverse transformation on an individual data unit in the same coding unit.

Accordingly, encoding is recursively performed on each of coding units having a hierarchical structure in each region of a largest coding unit so as to determine an optimum coding unit, and thus coding units according to a recursive tree structure may be obtained. Encoding information may include split information about a coding unit, partition type information, prediction type information, and transformation unit size information. Table 1 below shows the encoding information that may be set by the video encoding apparatus 800 and the video decoding apparatus 850 according to the embodiments.

TABLE 1

| Split Information 0 (Encoding on Coding Unit having Size of 2N × 2N and Current Depth of d) | | | | | Split Information 1 |
|---|---|---|---|---|---|
| Prediction Mode | Partition Type | | Size of Transformation Unit | | Repeatedly Encode Coding Units having Lower Depth of d + 1 |
| Intra Inter Skip (Only 2N × 2N) | Symmetrical Partition Type | Asymmetrical Partition Type | Split Information 0 of Transformation Unit | Split Information 1 of Transformation Unit | |
| | 2N × 2N 2N × N N × 2N N × N | 2N × nU 2N × nD nL × 2N nR × 2N | 2N × 2N | N × N (Symmetrical Partition Type) N/2 × N/2 (Asymmetrical Partition Type) | |

The output unit 820 of the video encoding apparatus 800 according to the embodiment may output the encoding information about the coding units having a tree structure, and the receiving and extracting unit 860 of the video decoding apparatus 850 according to the embodiment may extract the encoding information about the coding units having a tree structure from a received bitstream.

Split information specifies whether a current coding unit is split into coding units of a lower depth. If split information of a current depth d is 0, a depth, in which a current coding unit is no longer split into a lower depth, is a coded depth, and thus partition type information, prediction mode information, and transformation unit size information may be defined for the coded depth. If the current coding unit has to be further split according to the split information, encoding has to be independently performed on each of four split coding units of a lower depth.

A prediction mode may be one of an intra mode, an inter mode, and a skip mode. The intra mode and the inter mode may be defined in all partition types, and the skip mode may be defined only in a partition type having a size of 2N×2N.

The partition type information may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1.

The size of the transformation unit may be set to be two types in the intra mode and two types in the inter mode. That is, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure according to the embodiment may be assigned to at least one of a coding unit of a coded depth, a prediction unit, and a minimum unit. The coding unit of the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth may be determined by using encoding information of a data unit, and thus a distribution of coded depths in a largest coding unit may be inferred.

Accordingly, if a current coding unit is predicted based on encoding information of adjacent data units, encoding information of data units in deeper coding units adjacent to the current coding unit may be directly referred to and used.

In another embodiment, if a current coding unit is predicted based on encoding information of adjacent data units, data units adjacent to the current coding unit may be searched by using encoded information of the data units, and the searched adjacent coding units may be referred for predicting the current coding unit.

Figure 18:
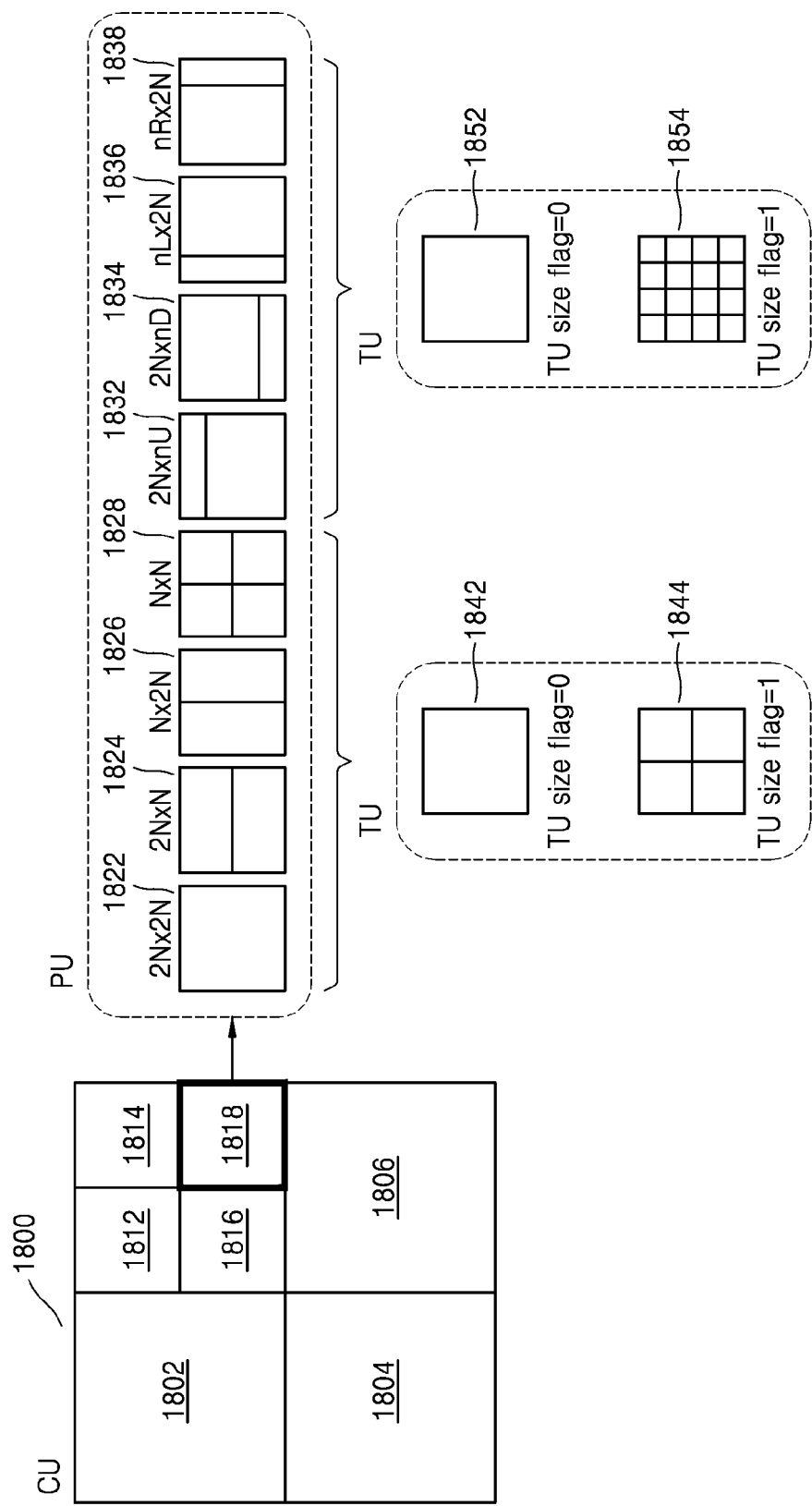
FIG. 18 illustrates a relationship between a coding unit, a prediction unit, and a transformation unit, according to encoding mode information of Table 1.

FIG. 18 illustrates a relationship between a coding unit, a prediction unit, and a transformation unit, according to the encoding mode information of Table 1.

A largest coding unit 1800 includes coding units 1802, 1804, 1806, 1812, 1814, 1816, and 1818 of coded depths. Here, since the coding unit 1818 is a coding unit of a coded depth, split information may be set to 0. Partition type information of the coding unit 1818 having a size of 2N×2N may be set to be one of partition types including 2N×2N 1822, 2N×N 1824, N×2N 1826, N×N 1828, 2N×nU 1832, 2N×nD 1834, nL×2N 1836, and nR×2N 1838.

Transformation unit split information (TU size flag) is a type of a transformation index, and a size of a transformation unit corresponding to the transformation index may be changed according to a prediction unit type or partition type of the coding unit.

For example, when the partition type information is set to be one of symmetrical partition types 2N×2N 1822, 2N×N 1824, N×2N 1826, and N×N 1828, if the transformation unit split information is 0, a transformation unit 1842 having a size of 2N×2N is set, and if the transformation unit split information is 1, a transformation unit 1844 having a size of N×N may be set.

When the partition type information is set to be one of asymmetrical partition types 2N×nU 1832, 2N×nD 1834, nL×2N 1836, and nR×2N 1838, if the transformation unit split information (TU size flag) is 0, a transformation unit

1852 having a size of 2N×2N may be set, and if the transformation unit split information is 1, a transformation unit 1854 having a size of N/2×N/2 may be set.

The transformation unit split information (TU size flag) described above with reference to FIG. 12 is a flag having a value or 0 or 1, but the transformation unit split information according to an embodiment is not limited to a flag having 1 bit, and the transformation unit may be hierarchically split while the transformation unit split information increases in a manner of 0, 1, 2, 3 . . . etc., according to setting. The transformation unit split information may be an example of the transformation index.

In this case, the size of a transformation unit that has been actually used may be expressed by using the transformation unit split information according to the embodiment, together with a maximum size of the transformation unit and a minimum size of the transformation unit. The video encoding apparatus 100 according to the embodiment may encode maximum transformation unit size information, minimum transformation unit size information, and maximum transformation unit split information. The result of encoding the maximum transformation unit size information, the minimum transformation unit size information, and the maximum transformation unit split information may be inserted into an SPS. The video decoding apparatus 850 according to the embodiment may decode video by using the maximum transformation unit size information, the minimum transformation unit size information, and the maximum transformation unit split information.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be smaller than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit may be defined by Equation (1):

$$\text{CurrMinTuSize} = \max(\text{MinTransformSize}, \text{RootTuSize}/(2^{\text{MaxTransformSizeIndex}})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. That is, in Equation (1), 'RootTuSize/(2^MaxTransformSizeIndex)' denotes a transformation unit size when the transformation unit size 'RootTuSize', when the TU size flag is 0, is split by the number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize} = \min(\text{MaxTransformSize}, \text{PUSize}) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{RootTuSize} = \min(\text{MaxTransformSize}, \text{PartitionSize}) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an embodiment, and a factor for determining the current maximum transformation unit size is not limited thereto.

According to the video encoding method based on coding units of a tree structure described above with reference to FIGS. 15 through 18, image data of a spatial domain is encoded in each of the coding units of the tree structure, and the image data of the spatial domain is reconstructed in a manner that decoding is performed on each largest coding unit according to the video decoding method based on the coding units of the tree structure, so that a video that is formed of pictures and picture sequences may be reconstructed. The reconstructed video may be reproduced by a reproducing apparatus, may be stored in a storage medium, or may be transmitted via a network.

The aforementioned embodiments may be written as computer programs and may be implemented in general-use digital computers that execute the programs by using a computer-readable recording medium. Examples of the computer-readable recording medium include magnetic storage media (e.g., ROM, floppy disks, hard disks, etc.), optical recording media (e.g., CD-ROMs, or DVDs), etc.

For convenience of description, the scalable video encoding methods and/or the video encoding method, which are described with reference to FIGS. 6A through 18, will be collectively referred to as 'the scalable video encoding method of the present invention'. Also, the video decoding methods and/or the video decoding method, which are described with reference to FIGS. 6A through 18, will be collectively referred to as 'the video decoding method of the present invention'.

Also, a video encoding apparatus including the scalable video encoding apparatus 600, the video encoding apparatus 800 or the image encoder 1000 which are described with reference to FIGS. 6A through 18 will be collectively referred to as a 'video encoding apparatus of the present invention'. Also, a video decoding apparatus including the scalable video decoding apparatus 700, the video decoding apparatus 850, or the image decoder 1050 which are described with reference to FIGS. 6A through 18 will be collectively referred to as a 'video decoding apparatus of the present invention'.

The computer-readable recording medium such as a disc 26000 that stores the programs according to an embodiment will now be described in detail.

Figure 19:
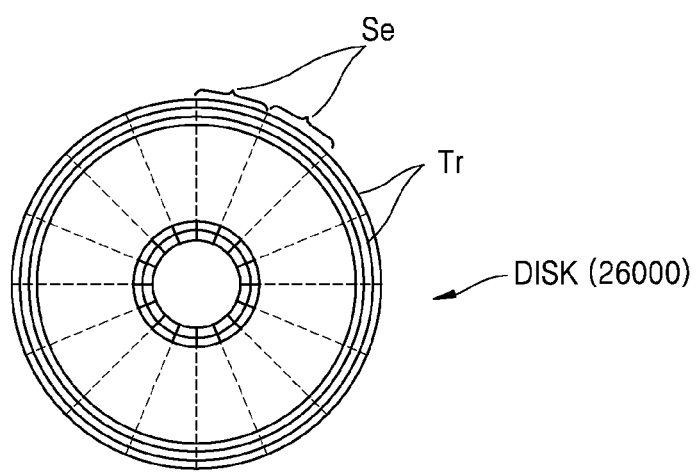
FIG. 19 illustrates a physical structure of a disc that stores a program, according to an embodiment.

FIG. 19 illustrates a physical structure of the disc 26000 in which a program is stored, according to various embodiments. The disc 26000 described as the storage medium may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the quantized parameter determining method, the video encoding method, and the video decoding method described above may be assigned and stored.

A computer system embodied using the storage medium that stores the program for executing the video encoding method and the video decoding method as described above will now be described with reference to FIG. 21.

Figure 20:
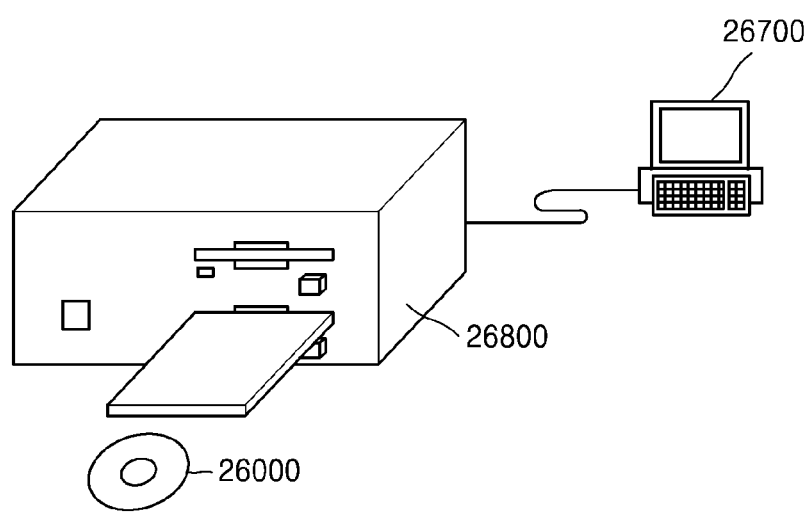
FIG. 20 illustrates a disc drive that records and reads a program by using a disc.

FIG. 20 illustrates a disc drive 26800 for recording and reading a program by using the disc 26000. A computer system 26700 may store a program that executes at least one of the video encoding method and the video decoding method of the present invention, in the disc 26000 via the disc drive 26800. In order to run the program stored in the disc 26000 in the computer system 26700, the program may be read from the disc 26000 and may be transmitted to the computer system 26700 by using the disc drive 26800.

Figure 21:
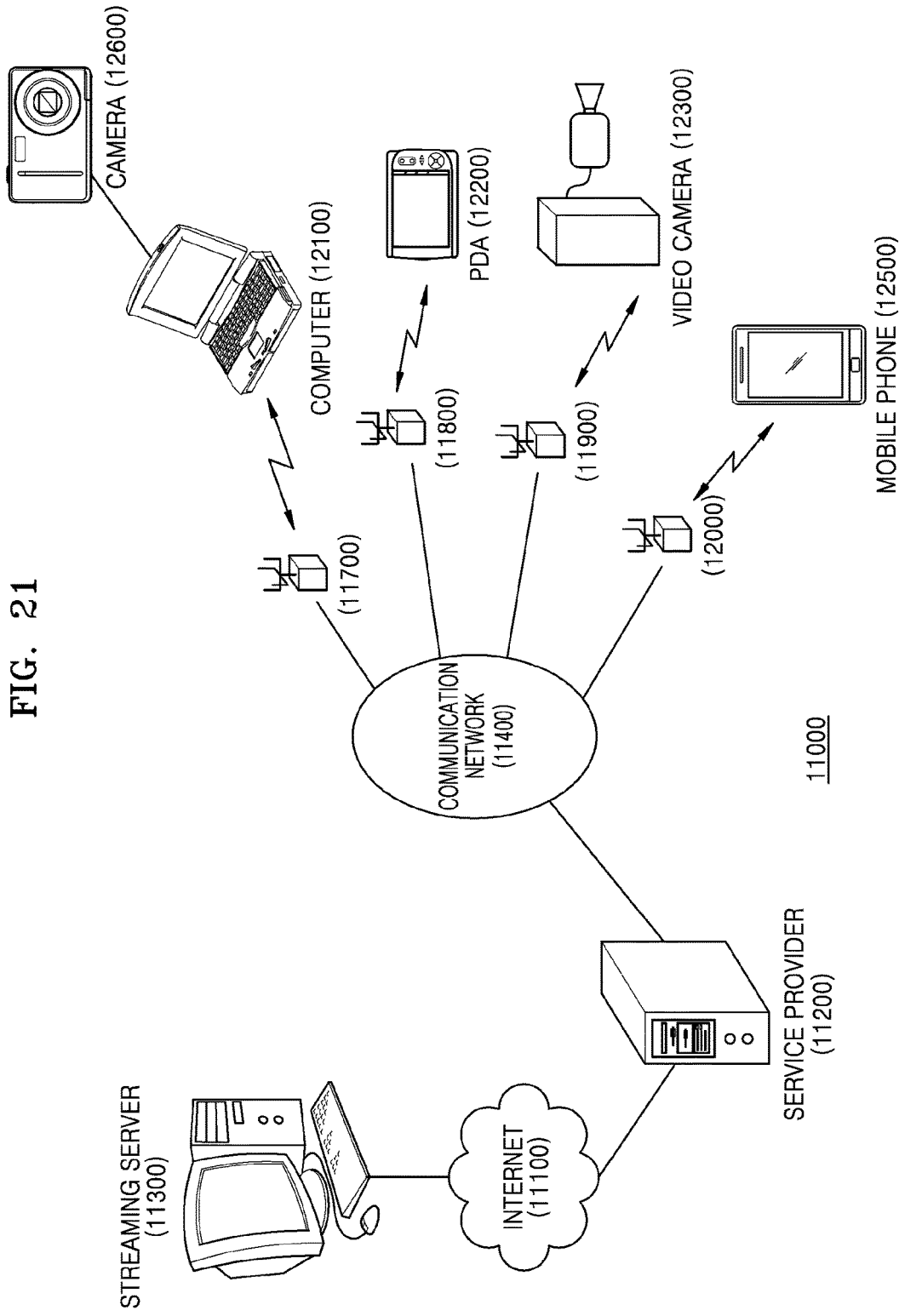
FIG. 21 illustrates an entire structure of a content supply system that provides a content distribution service.

The program that executes at least one of the video encoding method and the video decoding method of the present invention may be stored not only in the disc 26000 illustrated in FIGS. 19 and 21 but may also be stored in a memory card, a ROM cassette, or a solid state drive (SSD).

A system to which the video encoding method and the video decoding method according to the embodiments described above are applied will be described below.

FIG. 21 illustrates an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

However, the content supply system 11000 is not limited to as illustrated in FIG. 21, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded by the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessed by the computer 12100.

If video is captured by a camera mounted in the mobile phone 12500, video data may be received from the mobile phone 12500.

The video data may be encoded by a large scale integrated circuit (LSI) system installed in the video camera 12300, the mobile phone 12500, or the camera 12600.

The content supply system 11000 may encode content data recorded by a user using the video camera 12300, the camera 12600, the mobile phone 12500, or another imaging device, e.g., content recorded during a concert, and may transmit the encoded content data to the streaming server 11300. The streaming server 11300 may transmit the encoded content data in a type of streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

The video encoding apparatus and the video decoding apparatus of the present invention may be applied to encoding and decoding operations of the plurality of independent devices included in the content supply system 11000.

Figure 22:
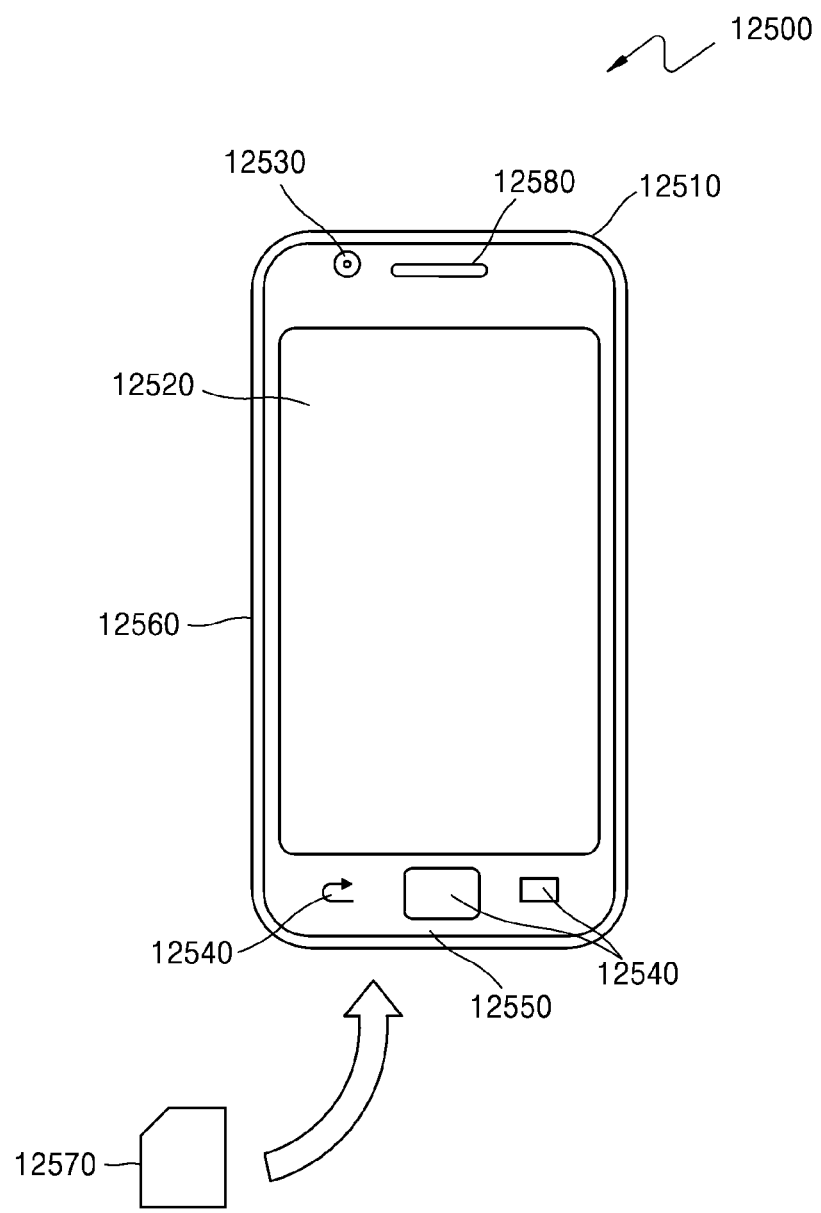
FIGS. 22 and 23 illustrate external and internal structures of a mobile phone to which a video encoding method and a video decoding method are applied, according to an embodiment.
Figure 24:
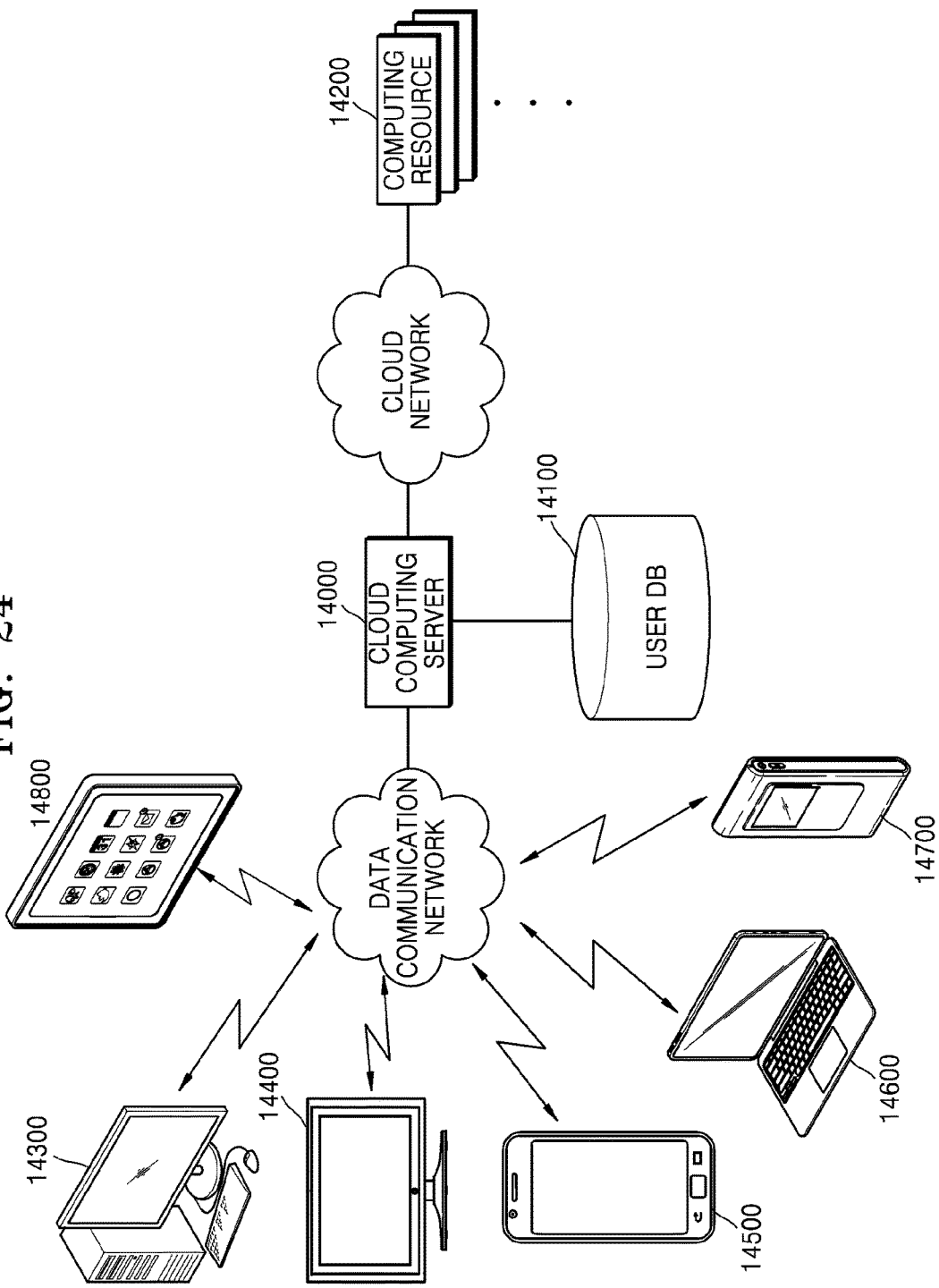
FIG. 24 illustrates a digital broadcasting system employing a communication system, according to an embodiment.

With reference to FIGS. 22 and 24, the mobile phone 12500 included in the content supply system 11000 according to an embodiment will now be described in detail.

FIG. 22 illustrates an external structure of the mobile phone 12500 to which the video encoding apparatus and the video decoding apparatus of the present invention are applied, according to various embodiments. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of a sound output unit, and a microphone 12550 for inputting voice and sound or another type of a sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

Figure 23:
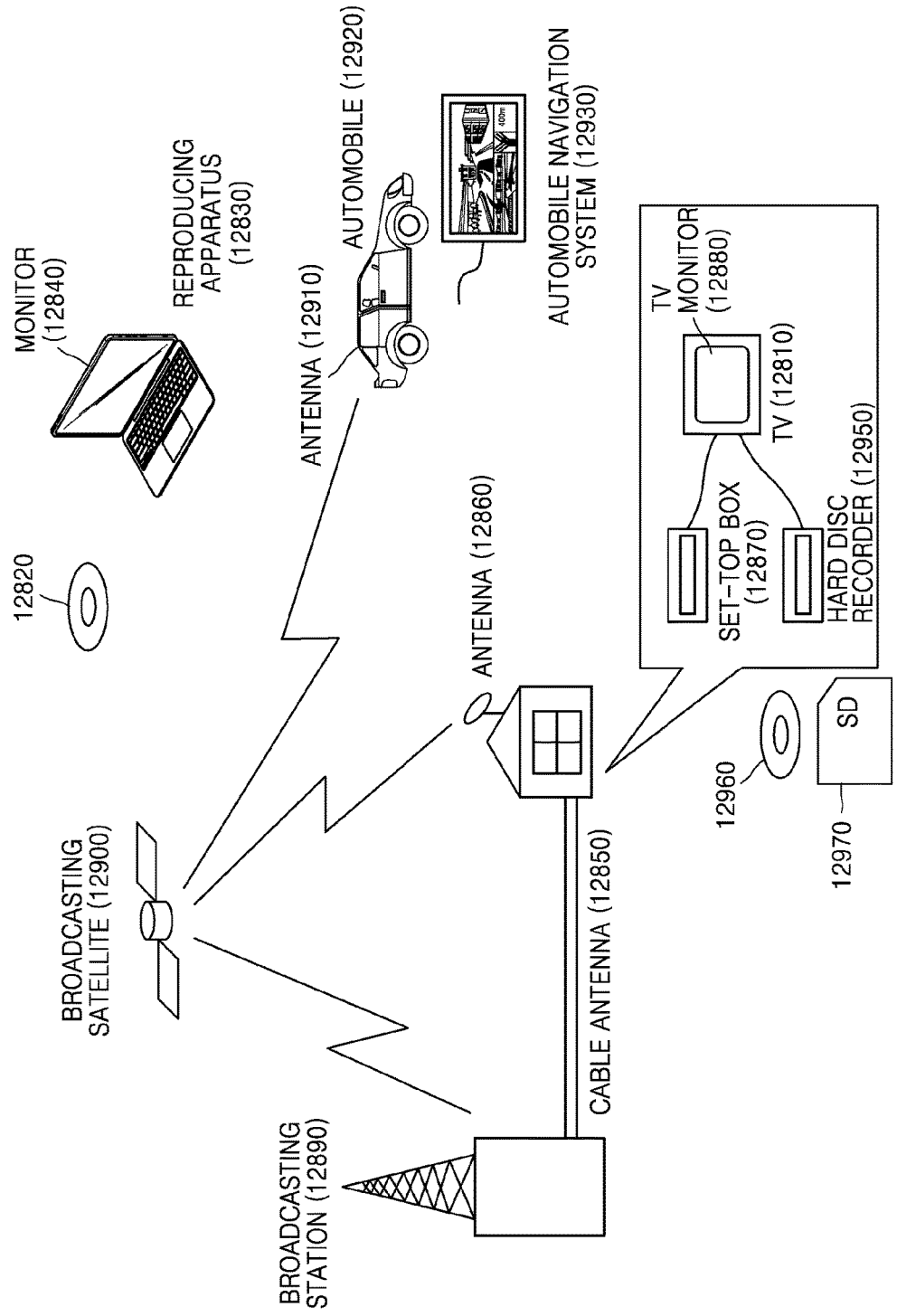

FIG. 23 illustrates an internal structure of the mobile phone 12500. In order to systemically control each of parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recorder/reader 12670, a modulator/demodulator 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 to an operation mode.

The central controller 12710 includes a CPU, a read-only memory (ROM), and a random access memory (RAM).

While the mobile phone 12500 transmits communication data to the outside, a digital signal is generated by the mobile phone 12500 under control of the central controller 12710. For example, the sound processor 12650 may generate a digital sound signal, the image encoder 12720 may generate a digital image signal, and text data of a message may be generated via the operation panel 12540 and the operation input controller 12640. When a digital signal is transmitted to the modulator/demodulator 12660 by control of the central controller 12710, the modulator/demodulator 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650 under control of the central controller 12710. The digital sound signal may be transformed into a transformation signal via the modulator/demodulator 12660 and the communication circuit 12610, and may be transmitted via the antenna 12510.

When a text message, e.g., email, is transmitted during a data communication mode, text data of the text message is input via the operation panel 12540 and is transmitted to the central controller 12610 via the operation input controller 12640. By control of the central controller 12610, the text data is transformed into a transmission signal via the modulator/demodulator 12660 and the communication circuit 12610 and is transmitted to the wireless base station 12000 via the antenna 12510.

In order to transmit image data during the data communication mode, image data captured by the camera 12530 is provided to the image encoder 12720 via the camera interface 12630. The captured image data may be directly displayed on the display screen 12520 via the camera interface 12630 and the LCD controller 12620.

A structure of the image encoder 12720 may correspond to that of the video encoding apparatus described above. The image encoder 12720 may transform the image data received from the camera 12530 into compressed and encoded image data according to the aforementioned video encoding method, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulator/demodulator 12660 and the communication circuit 12610, and may then be transmitted via the antenna 12510.

While the mobile phone 12500 receives communication data from the outside, frequency recovery and analog-to-digital conversion (A/D) are performed on a signal received via the antenna 12510 to transform the signal into a digital signal. The modulator/demodulator 12660 modulates a frequency band of the digital signal. The frequency-band modulated digital signal is transmitted to the image decoder 12690, the sound processor 12650, or the LCD controller 12620, according to the type of the digital signal.

During the conversation mode in which communication data is received from the outside, the mobile phone 12500 amplifies a signal received via the antenna 12510, and obtains a digital sound signal by performing frequency conversion and A/D on the amplified signal. A received digital sound signal is transformed into an analog sound signal via the modulator/demodulator 12660 and the sound processor 12650, and the analog sound signal is output via the speaker 12580, by control of the central controller 12710.

When during the data communication mode, data of a video file accessed at an Internet website is received, a signal received from the wireless base station 12000 via the antenna 12510 is output as multiplexed data via the modulator/demodulator 12660, and the multiplexed data is transmitted to the multiplexer/demultiplexer 12680.

In order to decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the image decoder 12690 and the sound processor 12650, respectively.

A structure of the image decoder 12690 may correspond to that of the video decoding apparatus described above. The image decoder 12690 may decode the encoded video data to obtain reconstructed video data and provide the reconstructed video data to the display screen 12520 via the LCD controller 12620, by using the aforementioned video decoding method of the present invention.

Thus, the video data of the video file accessed at the Internet website may be displayed on the display screen 12520. At the same time, the sound processor 12650 may transform audio data into an analog sound signal, and may provide the analog sound signal to the speaker 12580. Thus, audio data contained in the video file accessed at the Internet website may also be reproduced via the speaker 12580.

The mobile phone 12500 or another type of communication terminal may be a transceiving terminal including both the video encoding apparatus and the video decoding apparatus of the present invention, may be a transmitting terminal including only the video encoding apparatus of the present invention, or may be a receiving terminal including only the video decoding apparatus of the present invention.

A communication system of the present invention is not limited to the communication system described above with reference to FIG. 21. For example, FIG. 24 illustrates a digital broadcasting system employing a communication system, according to various embodiments. The digital broadcasting system of FIG. 24 may receive a digital broadcast transmitted via a satellite or a terrestrial network by using the video encoding apparatus and the video decoding apparatus of the present invention.

In more detail, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When the video decoding apparatus of the present invention is implemented in a reproducing apparatus 12830, the reproducing apparatus 12830 may parse and decode an encoded video stream recorded on a storage medium 12820 such as a disc or a memory card so as to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, the video decoding apparatus of the present invention may be installed. Data output from the set-top box 12870 may also be reproduced on a TV monitor 12880.

As another example, the video decoding apparatus of the present invention may be installed in the TV receiver 12810 instead of the set-top box 12870.

An automobile 12920 that has an appropriate antenna 12910 may receive a signal transmitted from the satellite 12900 or the wireless base station 11700. A decoded video may be reproduced on a display screen of an automobile navigation system 12930 installed in the automobile 12920.

A video signal may be encoded by the video encoding apparatus of the present invention and may then be recorded to and stored in a storage medium. In more detail, an image signal may be stored in a DVD disc 12960 by a DVD recorder or may be stored in a hard disc by a hard disc recorder 12950. As another example, the video signal may be stored in an SD card 12970. If the hard disc recorder 12950 includes the video decoding apparatus according to the exemplary embodiment, a video signal recorded on the DVD disc 12960, the SD card 12970, or another storage medium may be reproduced on the TV monitor 12880.

The automobile navigation system 12930 may not include the camera 12530, the camera interface 12630, and the image coding unit 12720 of FIG. 23. For example, the computer 12100 and the TV receiver 12810 may not include the camera 12530, the camera interface 12630, or the image coding unit 12720 of FIG. 23.

In this regard, the user terminal may include the video decoding apparatus of the present invention as described above with reference to FIGS. 1A through 18. As another example, the user terminal may include the video encoding apparatus of the present invention as described above with reference to FIGS. 1A through 18. Alternatively, the user terminal may include both the video decoding apparatus of the present invention and the video encoding apparatus of the present invention as described above with reference to FIGS. 1A through 18.

Various applications of the video encoding method, the video decoding method, the video encoding apparatus, and the video decoding apparatus according to the aforementioned embodiments have been described above with reference to FIGS. 1A through 18. However, various applications of the video encoding method, the video decoding method, the video encoding apparatus, and the video decoding apparatus according to the aforementioned embodiments are not limited to the embodiments described above with reference FIGS. 1A through 18.

While this invention has been particularly shown and described with reference to embodiments thereof, it will be understood by one of ordinary skill in the art that various changes in form and details may be made therein without departing from the spirit and scope of the invention as defined by the appended claims. The disclosed embodiments should be considered in a descriptive sense only and not for purposes of limitation. Therefore, the scope of the invention is defined not by the detailed description of the invention but by the appended claims, and all differences within the scope will be construed as being included in the present invention.

The invention claimed is:

1. A video decoding apparatus comprising:
a memory storing instructions; and
one or more processors configured to execute the stored instructions to:
obtain, from a bitstream, reference layer size information indicating a height and width of a reference layer picture, reference layer offset information to define a reference area used in inter-layer prediction from the reference layer picture, current layer size information indicating a height and width of a current layer picture, and current layer offset information to define, from the current layer picture, an expanded reference area corresponding to the reference area,
modify reference layer offset information and current layer offset information according to a color index of the reference layer picture and the current layer picture,
determine a scale ratio indicating a ratio of a size of the reference area to a size of the expanded reference area, according to the size of the reference area which is determined from the reference layer size information and the reference layer offset information, and the size of the expanded reference area which is determined from the current layer size information and the current layer offset information, and
determine the expanded reference area by up-sampling the reference area according to the reference layer offset information, the current layer offset information, and the scale ratio.

2. The video decoding apparatus of claim 1, wherein the reference layer offset information comprises a reference layer left offset, a reference layer right offset, a reference layer top offset, and a reference layer bottom offset.

3. The video decoding apparatus of claim 2, wherein
the reference layer left offset is a horizontal offset between a sample in an upper left area of the reference layer picture and a sample in an upper left area of the reference area,
the reference layer top offset is a vertical offset between the sample in the upper left area of the reference layer picture and the sample in the upper left area of the reference area,
the reference layer right offset is a horizontal offset between a sample in a lower right area of the reference layer picture and a sample in a lower right area of the reference area, and
the reference layer bottom offset is a vertical offset between the sample in the lower right area of the reference layer picture and the sample in the lower right area of the reference area.

4. The video decoding apparatus of claim 2, one or more processors configured to execute further instructions to: determine a height of the reference area by subtracting the reference layer top offset and the reference layer bottom offset from the height of the reference layer picture, and
determine a width of the reference area by subtracting the reference layer right offset and the reference layer left offset from the width of the reference layer picture.

5. The video decoding apparatus of claim 1, wherein the one or more processors generate a prediction image with respect to the current layer picture based on the expanded reference area.

6. A video decoding method performed by a processor comprising:
obtaining, by the processor, from a bitstream, reference layer size information indicating a height and width of a reference layer picture, reference layer offset information to define a reference area used in inter-layer prediction from the reference layer picture, current layer size information indicating a height and width of a current layer picture, and current layer offset information to define, from the current layer picture, an expanded reference area corresponding to the reference area;
modifying, by the processor, reference layer offset information and current layer offset information according to a color index of the reference layer picture and the current layer picture;
determining, by the processor, a scale ratio indicating a ratio of a size of the reference area to a size of the expanded reference area, according to the size of the reference area which is determined from the reference layer size information and the reference layer offset information, and the size of the expanded reference area which is determined from the current layer size information and the current layer offset information; and
determining, by the processor, the expanded reference area by up-sampling the reference area according to the reference layer offset information, the current layer offset information, and the scale ratio.

7. The video decoding method of claim 6, wherein the reference layer offset information comprises a reference layer left offset, a reference layer right offset, a reference layer top offset, and a reference layer bottom offset.

8. The video decoding method of claim 6, wherein
the reference layer left offset is a horizontal offset between a sample in an upper left area of the reference layer picture and a sample in an upper left area of the reference area,
the reference layer top offset is a vertical offset between the sample in the upper left area of the reference layer picture and the sample in the upper left area of the reference area,
the reference layer right offset is a horizontal offset between a sample in a lower right area of the reference layer picture and a sample in a lower right area of the reference area, and
the reference layer bottom offset is a vertical offset between the sample in the lower right area of the reference layer picture and the sample in the lower right area of the reference area.

9. The video decoding method of claim 6, wherein the determining of the size of the reference area comprises determining a height of the reference area by subtracting the reference layer top offset and the reference layer bottom offset from the height of the reference layer picture, and determining a width of the reference area by subtracting the reference layer right offset and the reference layer left offset from the width of the reference layer picture.

10. The video decoding method of claim 6, further comprising generating, by the processor, a prediction image with respect to the current layer picture based on the expanded reference area.

11. A non-transitory computer-readable recording medium having recorded thereon a program for executing, by a processor, the video decoding method of claim 6.

* * * * *